United States Patent
MolavianJazi et al.

(10) Patent No.: US 12,284,689 B2
(45) Date of Patent: Apr. 22, 2025

(54) METHOD AND APPARATUS FOR RANDOM ACCESS IN WIRELESS COMMUNICATION SYSTEMS

(71) Applicant: Samsung Electronics Co., Ltd., Suwon-si (KR)

(72) Inventors: Ebrahim MolavianJazi, San Jose, CA (US); Aristides Papasakellariou, Houston, TX (US); Emad N. Farag, Flanders, NJ (US); Jeongho Jeon, San Jose, CA (US); Joonyoung Cho, Portland, OR (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/468,660

(22) Filed: Sep. 15, 2023

(65) Prior Publication Data

US 2024/0129959 A1  Apr. 18, 2024

Related U.S. Application Data

(63) Continuation of application No. 17/646,624, filed on Dec. 30, 2021, now abandoned.

(Continued)

(51) Int. Cl.
*H04W 74/0833* (2024.01)
*H04W 24/08* (2009.01)
(Continued)

(52) U.S. Cl.
CPC ....... *H04W 74/0841* (2013.01); *H04W 24/08* (2013.01); *H04W 72/0446* (2013.01); *H04W 74/002* (2013.01); *H04W 74/0866* (2013.01)

(58) Field of Classification Search
CPC ............. H04W 74/0841; H04W 24/08; H04W 72/0446; H04W 72/008; H04W 72/0866; H04W 74/008; H04W 74/002
See application file for complete search history.

(56) References Cited

U.S. PATENT DOCUMENTS 10,785,802 B2   9/2020  Basu Mallick
2010/0296451 A1  11/2010  Li
(Continued)

FOREIGN PATENT DOCUMENTS

KR   10-2019-0002443 A   1/2019
KR   10-2020-0003804 A   1/2020
(Continued)

OTHER PUBLICATIONS

"5G; NR; Physical channels and modulation (3GPP TS 38.211 version 16.3.0 Release 16)", ETSI TS 138 211 V16.3.0, Nov. 2020, 136 pages.

(Continued)

*Primary Examiner* — Stephen J Clawson

(57) ABSTRACT

Apparatuses and methods for random access procedures with multiple transmission reception points or cells in a wireless communication system. A method for performing random access (RA) procedures by a user equipment includes receiving a first configuration for RA. The method further includes initiating a first RA procedure with a first transmission-reception point (TRP) based on the first configuration and initiating a second RA procedure with a second TRP prior to completion of the first RA procedure. A method for operating a base station includes transmitting a first configuration for RA corresponding to a first TRP and transmitting a second configuration for RA corresponding to a second TRP. The first TRP and the second TRP are associated with a same cell.

20 Claims, 23 Drawing Sheets

Related U.S. Application Data

(60) Provisional application No. 63/171,668, filed on Apr. 7, 2021, provisional application No. 63/152,398, filed on Feb. 23, 2021, provisional application No. 63/133,016, filed on Dec. 31, 2020.

(51) Int. Cl.
*H04W 72/0446* (2023.01)
*H04W 74/00* (2009.01)
*H04W 74/08* (2009.01)

(56) References Cited

U.S. PATENT DOCUMENTS

| | | | |
|---|---|---|---|
| 2013/0039347 A1 | 2/2013 | Moqvist | |
| 2016/0044666 A1* | 2/2016 | Shin | H04W 72/20 370/336 |
| 2018/0324867 A1 | 11/2018 | Basu Mallick | |
| 2019/0075598 A1 | 3/2019 | Li | |
| 2020/0053752 A1* | 2/2020 | Huang | H04W 56/0045 |
| 2020/0100201 A1* | 3/2020 | Farmanbar | H04W 56/0005 |
| 2020/0107356 A1 | 4/2020 | Rico Alvarino | |
| 2020/0305038 A1 | 9/2020 | Tooher | |
| 2020/0351730 A1* | 11/2020 | Park | H04W 56/0045 |
| 2021/0076445 A1* | 3/2021 | Tsai | H04L 5/003 |
| 2021/0289525 A1* | 9/2021 | Khoshnevisan | H04L 5/0042 |
| 2021/0315004 A1 | 10/2021 | Zhang | |
| 2021/0329700 A1* | 10/2021 | Taherzadeh Boroujeni | H04W 76/27 |
| 2021/0352654 A1* | 11/2021 | Al | H04W 72/0453 |
| 2022/0225419 A1 | 7/2022 | Lee | |
| 2023/0022602 A1 | 1/2023 | Zhu | |
| 2023/0107490 A1 | 4/2023 | Abdelghaffar | |

FOREIGN PATENT DOCUMENTS

| | | |
|---|---|---|
| WO | 2020215108 A2 | 10/2020 |
| WO | 2020249548 A1 | 12/2020 |
| WO | 2022131814 A1 | 6/2022 |

OTHER PUBLICATIONS

"5G; NR; Multiplexing and channel coding (3GPP TS 38.212 version 16.3.0 Release 16)", ETSI TS 138 212 V16.3.0, Nov. 2020, 155 pages.
"5G; NR; Physical layer procedures for control (3GPP TS 38.213 version 16.3.0 Release 16)", ETSI TS 138 213 V16.3.0, Nov. 2020, 181 pages.
"5G; NR; Physical layer procedures for data (3GPP TS 38.214 version 16.3.0 Release 16)", ETSI TS 138 214 V16.3.0, Nov. 2020, 169 pages.
"5G; NR; Medium Access Control (MAC) protocol specification (3GPP TS 38.321 version 16.2.1 Release 16)", ETSI TS 138 321 V16.2.1, Nov. 2020, 156 pages.
"5G; NR; Radio Resource Control (RRC); Protocol specification (3GPP TS 38.331 version 16.2.0 Release 16)", ETSI TS 138 331 V16.2.0, Nov. 2020, 908 pages.
"5G; NR; NR and NG-RAN Overall description; Stage-2 (3GPP TS 38.300 version 16.3.0 Release 16)", ETSI TS 138 300 V16.3.0, Nov. 2020, 151 pages.
"5G; NR; Physical channels and modulation (3GPP TS 38.211 version 16.4.0 Release 16)", ETSI TS 138 211 V16.4.0, Jan. 2021, 137 pages.
"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
"5G; NR; Radio Resource Control (RRC); Protocol specification (3GPP TS 38.331 version 16.3.1 Release 16)", ETSI TS 138 331 V16.3.1, Jan. 2021, 916 pages.
"5G; NR; NR and NG-RAN Overall description; Stage-2 (3GPP TS 38.300 version 16.4.0 Release 16)", ETSI TS 138 300 V16.4.0, Jan. 2021, 151 pages.
International Search Report and Written Opinion issued Apr. 7, 2022 regarding Application No. PCT/KR2021/020355, 8 pages.
Nokia, "Description of Multi-TRP operation", 3GPP TSG-RAN WG2 Meeting #112 Electronic, R2-2009170, Oct. 2020, 6 pages.
Extended European Search Report issued Nov. 13, 2024 regarding Application No. 21915899.5, 9 pages.

* cited by examiner

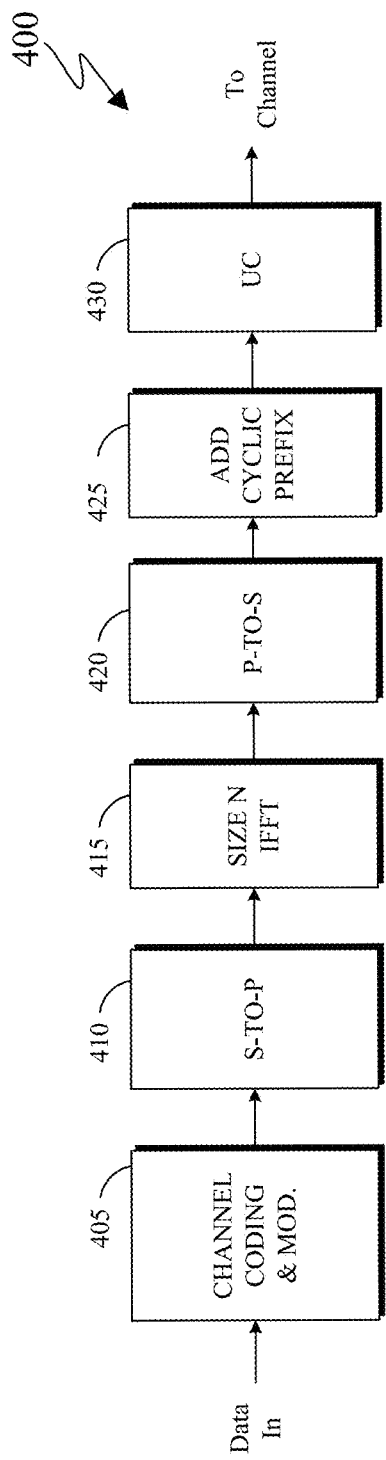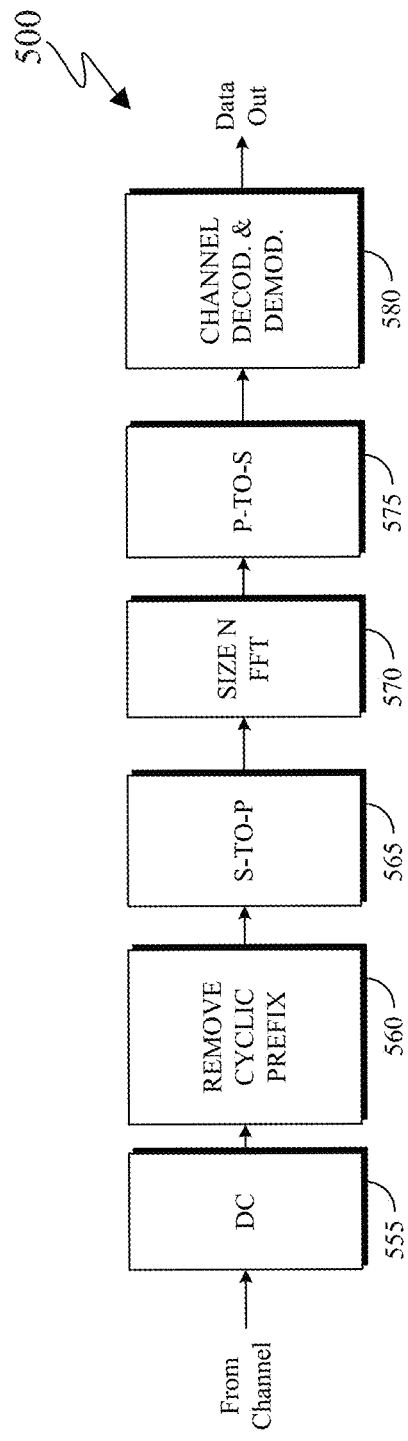

METHOD AND APPARATUS FOR RANDOM
ACCESS IN WIRELESS COMMUNICATION
SYSTEMS

CROSS-REFERENCE TO RELATED APPLICATION AND CLAIM OF PRIORITY

This application is a continuation of U.S. patent application Ser. No. 17/646,624, filed on Dec. 30, 2021, which claims priority under 35 U.S.C. § 119(e) to (i) U.S. Provisional Patent Application No. 63/133,016 filed on Dec. 31, 2020; (ii) U.S. Provisional Patent Application No. 63/152,398 filed on Feb. 23, 2021; and (iii) U.S. Provisional Patent Application No. 63/171,668 filed on Apr. 7, 2021. The above-identified provisional patent applications are hereby incorporated by reference in their entirety.

TECHNICAL FIELD

The present disclosure relates generally to wireless communication systems and, more specifically, the present disclosure relates to multiple concurrent random access procedures with multiple transmission reception points or multiple cells. The present disclosure also relates to channel state information (CSI) reporting for a random access procedure, including on a physical random access channel (PRACH) transmission.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to multiple concurrent random access procedures with multiple transmission reception points or multiple cells. The disclosure also relates to CSI reporting on a PRACH transmission or during a random access procedure.

In one embodiment, a method for performing random access (RA) procedures is provided. The method includes receiving a first configuration for RA; initiating a first RA procedure with a first transmission-reception point (TRP) based on the first configuration; and initiating a second RA procedure with a second TRP prior to completion of the first RA procedure.

In another embodiment, a UE is provided. The UE includes a transceiver configured to receive a first configuration for RA and a processor operably coupled to the transceiver. The processor is configured to initiate a first RA procedure with a first TRP based on the first configuration and a second RA procedure with a second TRP prior to completion of the first RA procedure.

In yet another embodiment, a base station is provided. The base station includes a processor and a transceiver operably coupled to the processor. The transceiver configured to transmit a first configuration for RA corresponding to a first TRP and a second configuration for RA corresponding to a second TRP. The first TRP and the second TRP are associated with a same cell.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate example wireless transmit and receive paths according to embodiments of present disclosure;

DETAILED DESCRIPTION

Figure 1:
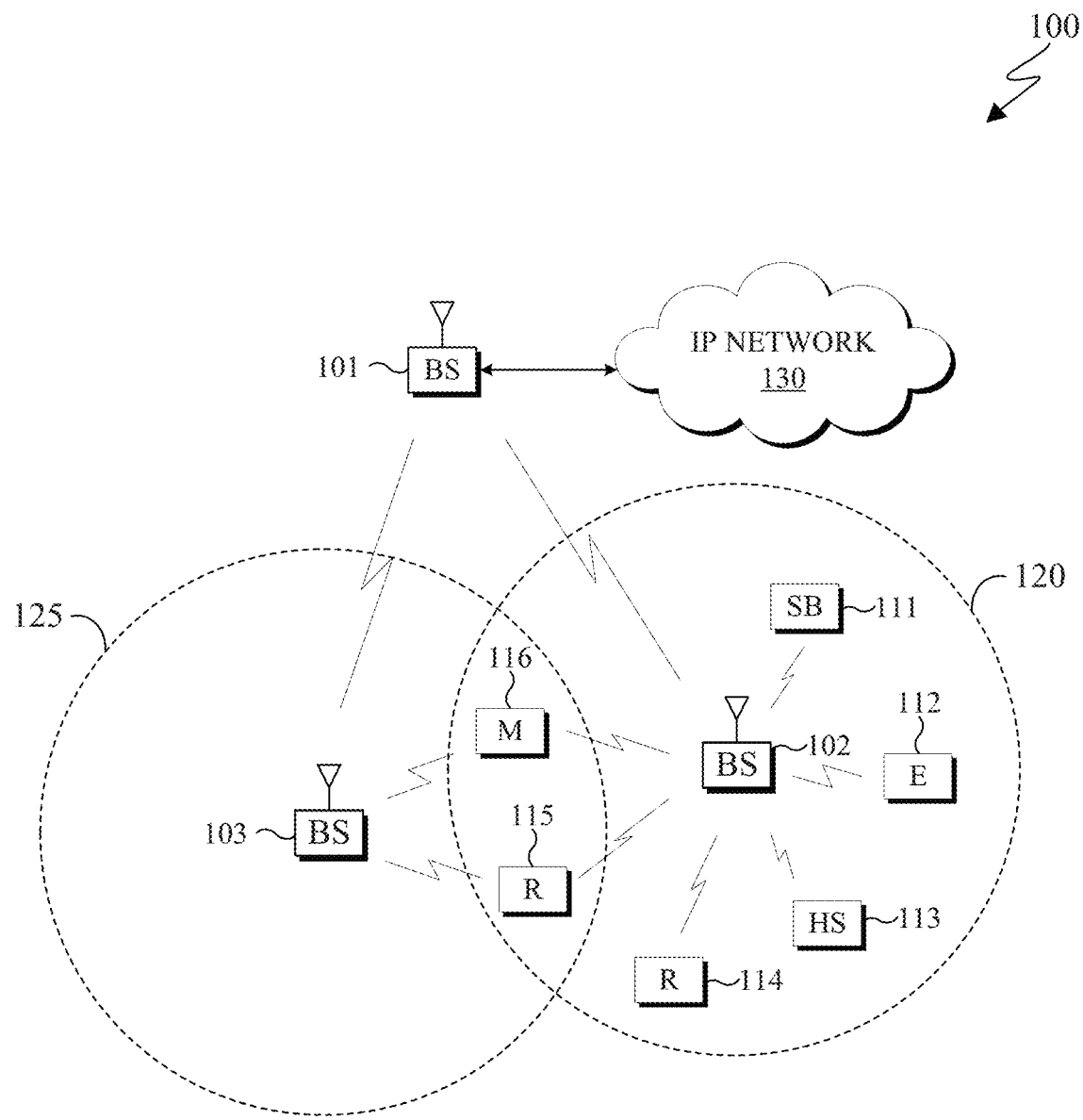
FIG. 1 illustrates an example wireless network according to embodiments of the present disclosure.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 Rel-16 v16.3.0, "NR; Physical channels and modulation," September 2020 (REF. 1); 3GPP TS 38.212 Rel-16 v16.3.0, "NR; Multiplexing and channel coding," September 2020 (REF. 2); 3GPP TS 38.213 Rel-16 v16.3.0, "NR; Physical layer procedures for control," September 2020 (REF. 3); 3GPP TS 38.214 Rel-16 v16.3.0, "NR; Physical layer procedures for data," September 2020 (REF. 4); 3GPP TS 38.321 Rel-16 v16.2.1, "NR; Medium Access Control (MAC) protocol specification," September 2020 (REF. 5); 3GPP TS 38.331 Rel-16 v16.2.0, "NR; Radio Resource Control (RRC) protocol specification," September 2020 (REF. 6); 3GPP TS 38.300 Rel-16 v16.3.0, "NR; NR and NG-RAN Overall Description; Stage 2," September 2020 (REF. 7); 3GPP TS 38.211 Rel-16 v16.4.0, "NR; Physical channels and modulation," December 2020 (REF. 8); 3GPP TS 38.212 Rel-16 v16.4.0, "NR; Multiplexing and channel coding," December 2020 (REF. 9); 3GPP TS 38.213 Rel-16 v16.4.0, "NR; Physical layer procedures for control," December 2020 (REF. 10); 3GPP TS 38.214 Rel-16 v16.4.0, "NR; Physical layer procedures for data," December 2020 (REF. 11); 3GPP TS 38.321 Rel-16 v16.3.0, "NR; Medium Access Control (MAC) protocol specification," December 2020 (REF. 12); 3GPP TS 38.331 Rel-16 v16.3.1, "NR; Radio Resource Control (RRC) protocol specification," December 2020 (REF. 13); and 3GPP TS 38.300 Rel-16 v16.4.0, "NR; NR and NG-RAN Overall Description; Stage 2," December 2020 (REF. 14).

To meet the demand for wireless data traffic having increased since deployment of the fourth generation (4G)

communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
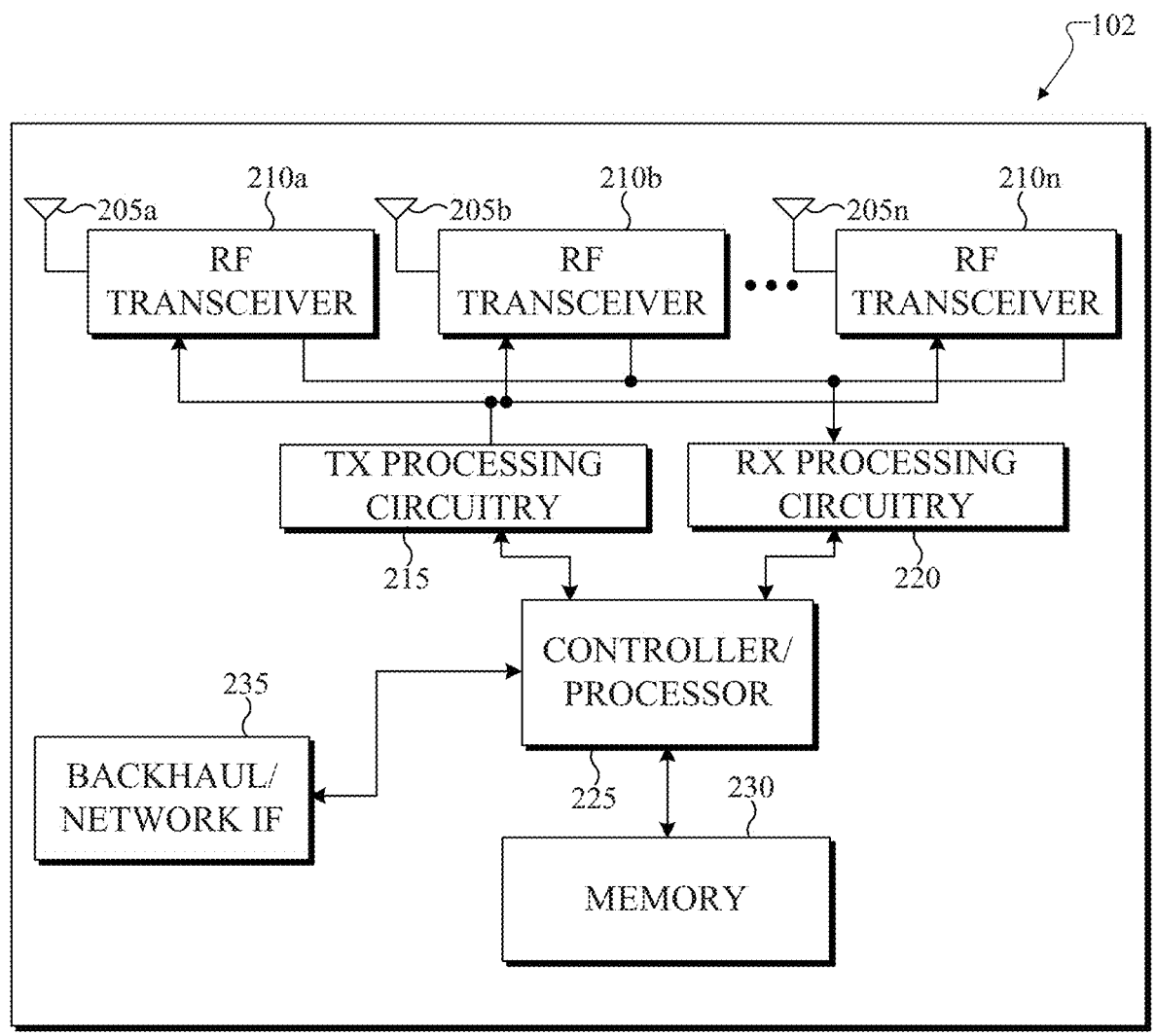
FIG. 2 illustrates an example base station (BS) according to embodiments of the present disclosure.
Figure 3:
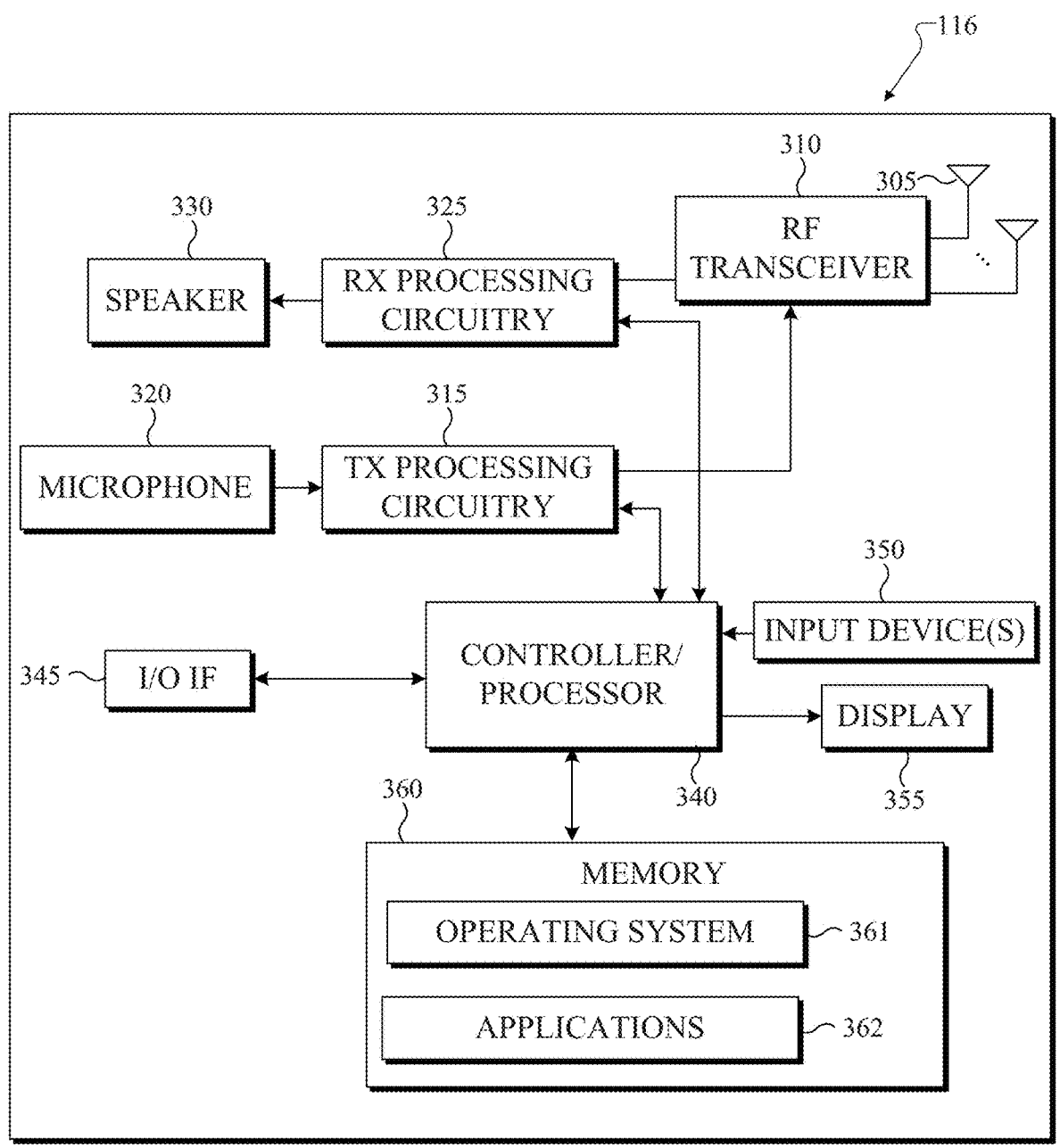
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for multiple concurrent random access procedures with multiple transmission reception points or multiple cells and channel state information (CSI) reporting on physical random access channel (PRACH). In certain embodiments, and one or more of the BSs 101-103 includes circuitry, programing, or a combination thereof for multiple concurrent random access procedures with multiple transmission reception points or multiple cells and CSI reporting on PRACH.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support multiple concurrent random access procedures with multiple transmission reception points or multiple cells and CSI reporting on PRACH. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports multiple concurrent random access procedures with multiple transmission reception points or multiple cells and CSI reporting on PRACH. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support multiple concurrent random access procedures with multiple transmission reception points or multiple cells and CSI reporting on PRACH as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

As discussed above, embodiments of this disclosure provide enhancements for initial and random access procedure for a UE communicating with multiple TRPs or multiple cells.

A UE can currently perform only one random access (RA) procedure at a given time. Therefore, a UE with multiple antenna panels that detects more than one synchronization signal (SS) physical broadcast channel block (PBCH) (SSB), or channel state information reference signal (CSI-RS) can transmit only one PRACH associated with one SSB or CSI-RS and wait until the end of the random access response (RAR) monitoring window before the UE can transmit another PRACH associated with a same or a different SSB or CSI-RS. Such operation increases the latency for the random access procedure and reduces the random access success probability.

In addition, especially in higher frequency bands, such as the millimeter wave bands also referred to as frequency range 2 (FR2), electromagnetic exposure is a critical factor in determination of UL transmission power control. Therefore, even if a SSB or CSI-RS has a good signal quality such as a high reference signal received power (RSRP) for downlink (DL) reception, the UE may have restrictions in using that SSB or CSI-RS for PRACH transmission, due to maximum permissible exposure (MPE) issues. When a UE can perform only one RA procedure at a time, the UE is forced to either transmit a reduced-power PRACH associated with a SSB with higher RSRP or transmit a high-power PRACH associated with a SSB with lower RSRP. Such operation reduces the likelihood of correct PRACH detection at a serving gNB and may also degrade beam management between UE and gNB leading, for example, to low quality beams (or beam pair) that also adversely affects future transmissions and receptions.

Accordingly, embodiments of the present disclosure take into consideration that there is a need to reduce a latency for a random access procedure and increase a likelihood of successful completion.

Embodiments of the present disclosure also take into consideration that there is a need to mitigate an impact of electromagnetic exposure on PRACH power control.

Embodiments of the present disclosure further take into consideration that there is another need to improve a selection of a DL RS associated with a PRACH transmission in order to increase a PRACH detection probability at a serving gNB and improve beam management and robustness for transmissions and receptions after completion of the random access procedure.

Additionally, embodiments of the present disclosure take into consideration that there is a further need to enhance the RA procedure to take into account an association with different TRPs or different cells, such as for terms of RA initiation, PRACH transmission, and handling of multiple Msg2/3/4s or multiple MsgA/Bs corresponding to multiple TRPs of a single cell or multiple cells.

The present disclosure provides means for supporting multiple, such as two, concurrent RA procedures. The two concurrent RA procedures can correspond to a same PRACH trigger or to different PRACH triggers. For example, UEs that can simultaneously transmit from multiple panels can perform multiple concurrent RA procedures. The embodiments can also apply for single-panel UEs with some modifications or restrictions as they are subsequently described. A network can indicate whether to not concurrent RA procedures are enabled through corresponding information in a system information block (SIB). The concurrent RA procedures can be overlapping in time and can be initiated by a UE at a same time or at different times. In addition, the concurrent RA procedures can continue until successful completion of at least one of the RA procedures, or at least until successful reception of one RAR. Configuration of RA procedure parameters including for PRACH transmission and RAR monitoring can be UE-panel-specific, including panel-specific power control that considers MPE issues or can be TRP-specific. In addition, multiple concurrent RA procedures can provide panel-specific or TRP-specific timing advance (TA) values for the UE to use for subsequent UL transmissions. Further, multiple concurrent RA procedures can enable spatial domain diversity for transmission of multiple Msg3/MsgA physical uplink shared channel (PUSCH) and for physical downlink control channel (PDCCH) monitoring for scheduling Msg4 PDSCH receptions that increases a likelihood of successful contention resolution for the UE. A UE needs to also consider "intra-UE" contention resolution aspects so that the gNB can identify and link the multiple RA procedures to the UE. In some cases, the UE (such as the UE 116) provides assistance information to help coordination of TRPs involved in two concurrent RA procedures.

Additionally, the present disclosure presents methods for multiple concurrent RA procedures, including for initial access, to multiple TRPs or cells, wherein the multiple concurrent RA procedures can be associated with multiple UE antenna panels. In particular, a UE can perform two concurrent initial access procedures to make RRC connection to two cells. Various embodiments consider TRP-specific PRACH configuration based on TRP-specific system information or TRP-specific RRC configuration. Several embodiments consider TRP-specific configurations for other UE operations, in addition to the RA procedure. Some embodiments propose TRP-specific power control as well as methods for power scaling or dropping of overlapping UL transmissions to multiple TRPs, such as when two PRACH transmissions to two TRPs overlap in time, or when a PRACH transmission to one TRP overlaps with a PUSCH/physical uplink control channel (PUCCH)/SRS transmission to another TRP. Methods are presented to enhance PDCCH order to include TRP-specific information such as TRP indication, UE panel indication, TCI state indication for RAR PDCCH/PDSCH reception or for Msg3/MsgA PUSCH transmission corresponding to different TRPs or panels. In addition, an "extended" PDCCH order is considered to initiate two concurrent RA procedures using a single DCI format. Enhancements are presented for a back-off indication (BI) provided in a RAR, so that the UE is provided with assistance information about the PRACH congestion level at different TRPs to assist with load distribution among TRPs.

One motivation for focusing on enhanced schemes is enhanced operation of multi-panel UEs, especially in higher frequency bands such as the ones above 6 GHz. In addition, the embodiments can apply to various use cases and settings, such as for single-panel UEs, frequency bands below 6 GHz, eMBB, URLLC and IIoT and XR, mMTC and IoT, sidelink/V2X, operation in unlicensed/shared spectrum (NR-U), non-terrestrial networks (NTN), operation with reduced capability (RedCap) UEs, private or non-public networks (NPN), and the like.

Embodiments of the disclosure describe supporting multiple concurrent random access procedures elaborated further below. For brevity, two TRPs, or two cells, and two UE transmitter antenna panels for two RA procedures are considered but the embodiments are directly applicable to more than two TRPs or cells and more than two UE transmitter antenna panels for more than two RA procedures.

Embodiments, described in greater detail below, denoted as E-1, describe multiple concurrent random access (RA) procedures towards multiple TRPs/cells (including RA procedures for initial access). For example, a UE (such as the UE 116) can perform two concurrent RA procedures towards two TRPs or two cells. A first RA procedure is targeted to a first TRP/cell and a second RA procedure is targeted to a second TRP/cell while the UE operates the two RA procedures concurrently.

Embodiments, described in greater detail below, denoted as E-2, describe TRP-specific configuration of RA procedure parameters and TRP-specific system information. For example, a UE (such as the UE 116) can be provided with a RA configuration that is partially or fully TRP-specific. In one realization, the UE can be provided with two RA configurations, each corresponding to one TRP of two TRPs. In another realization, the UE can be provided with a set of cell-specific RA parameters that are common to both TRPs, and a set of TRP-specific RA parameters that are only applicable to each TRP. Such TRP-specific RA parameters as well as any other TRP-specific configuration parameters can be provided by TRP-specific higher layer configuration including TRP-specific system information. The signaling of the system information can be from one or both TRP(s) and include RA parameters for one or both TRP(s). Here, RA configuration includes configuration parameters for Msg1/MsgA PRACH transmission, PDCCH monitoring for RAR/Msg2/MsgB PDSCH reception, Msg3/MsgA PUSCH transmission, or PDCCH monitoring for Msg4 PDSCH reception. TRP-specific system information can include information elements and configuration parameters in addition to or other than RA configuration parameters.

Embodiments, described in greater detail below, denoted as E-3, describe TRP-specific configuration of RA procedure parameters and TRP-specific system information. For example, when a UE (such as the UE 116) performs two concurrent RA procedures for two respective TRPs, the UE can determine different PRACH transmission power levels for the corresponding RA procedures, for example due to TRPs-specific configuration values for target PRACH preamble received power, or for power ramping of PRACH transmissions. In one realization, TRP-specific power control can also apply for Msg3/MsgA PUSCH transmission, for example due to TRP-specific configuration of corresponding target power levels, pathloss compensation factors, or power offset values. In another realization, TRP-specific power control can also apply to Msg1/MsgA PRACH transmission(s) or Msg3/MsgA PUSCH transmission(s) of a single RA procedure for a first TRP, including when such transmissions overlap with a PUSCH/PUCCH/SRS transmission for a second TRP.

Embodiments, described in greater detail below, denoted as E-4, describes monitoring and reception of two RARs/MsgBs and handling two Msg3s/Msg4s (or two MsgA PUSCH(s)) corresponding to two concurrent RA procedures towards two TRPs/cells. For example, for a UE (such as the UE 116) performing two or multiple concurrent RA procedures towards two TRPs/cells, the UE can monitor PDCCH for scheduling two RAR/Msg2/MsgB PDSCH receptions corresponding to the RA procedures, each possibly including a TA value, a TC-RNTI, and a RAR UL grant for Msg3 PUSCH transmission. The UE can transmit one or two Msg3/MsgA PUSCHs and can monitor PDCCH for scheduling one or two Msg4 PDSCH receptions for contention resolution, each with a corresponding contention resolution time window.

Embodiments, described in greater detail below, denoted as E-4-1, describe a Reception of one or two RARs including RAPID only corresponding to cell-specific or TRP-specific other system information (OSI). For example, when a UE (such as the UE 116) performs two concurrent RA procedures to request for some (on-demand) other system information "OSI" or SIB>1, and the UE receives a first RAR with an indication of a matching random access preamble identity (RAPID) corresponding to a first RA procedure for a first TRP, the UE considers the first RA procedure for OSI request to be successfully completed. The UE can determine whether to stop or continue the second RA procedure for a second TRP based on whether the OSI is cell-specific or TRP-specific.

Embodiments, described in greater detail below, denoted as E-4-2, describe a Reception of two RARs from two TRPs and transmission of two Msg3s for "intra-UE" contention resolution for a UE before RRC connection. For example, for a UE (such as the UE 116) that does not have an RRC connection with a gNB (UE does not have C-RNTI) and performs two concurrent RA procedures for two TRPs and receives two RARs from the two TRPs for the two concurrent RA procedures, the UE can transmit two Msg3 PUSCHs with modified content to enable the gNB to link the two concurrent RA procedures initiated by the UE and resolve an "intra-UE" contention resolution. This is because the gNB has no knowledge before Msg3/MsgA PUSCH reception that the concurrent RA procedures are from a same UE, rather than from multiple corresponding UEs. For example, the two RARs include two TC-RNTIs for the same UE and the gNB needs to resolve such "double TC-RNTI" that was issued for the UE. In another example, the two TRPs may provide the UE with two conflicting RRC configurations and then a UE behavior needs to be defined to avoid or resolve such "double/conflicting RRC configuration" issue. Such modification of Msg3/MsgA PUSCHs transmission, compared to the contents of Msg3 PUSCH for a UE performing a single RA procedure at a given time, and corresponding gNB and UE behaviors depend, among other factors, on the backhaul assumptions between the two TRPs/cells. For example, the UE may need to provide assistance information to the two TRPs/cells so that the two TRPs/cells can link the two concurrent RA procedures to the UE and resolve the intra-UE contention resolution.

Embodiments, described in greater detail below, denoted as E-4-3, describe receptions of two RARs from two TRPs and transmission of two (modified) Msg3s for "intra-UE" contention resolution for a UE after RRC connection. when a UE is in the RRC_CONNECTED state, has been provided a C-RNTI, and performs two concurrent RA procedures towards two TRPs/cells, the UE can monitor PDCCH for scheduling of two RAR PDSCH receptions corresponding to two concurrent RA procedures, each with a corresponding RAR time window, and then transmit two Msg3 PUSCHs, and then monitor PDCCH for scheduling two Msg4 PDSCH receptions, each with a corresponding contention resolution time window. The UE can transmit the two Msg3 PUSCHs independently for the two RA procedures or the two Msg3 PUSCHs can have some dependence and linkage. PDCCH monitoring for Msg4 PDSCH reception can be based on the UE's C-RNTI.

Embodiments, described in greater detail below, denoted as E-5, describe enhancements for PDCCH order for two concurrent RA procedures, including "extended" PDCCH order. For example, a PDCCH order can be enhanced to provide information for two concurrent RA procedures (possibly from a two-panel UE) for two TRPs. Such enhancements can include, for example, TRP indication, UE panel indication, TCI state indication for RAR, TCI state indication for Msg3/MsgA PUSCH, and the like. In another realization, a single "extended" PDCCH order can be used to indicate two concurrent RA procedures using a single DCI format.

Embodiments, described in greater detail below, denoted as E-6, describe modified BI in RAR for load distribution among TRPs. For example, a UE (such as the UE 116) is capable of performing (or is performing) two concurrent RA procedures can interpret a BI provided in a RAR/Msg2/MsgB PDSCH differently from other UEs. For example, for TRP-specific PRACH operation, the BI can be used to provide assistance information about the PRACH congestion level at different TRPs and assist with load distribution among TRPs.

In addition to the above, embodiments of the present disclosure considers link adaptation, reliability, and coverage for transmissions and receptions by a UE during a random access procedure.

For example, a gNB (such as the BS 102) does not have channel state information (CSI) available for a UE (such as the EU 116) that is attempting random access for example when the UE performs initial access to establish RRC connection with the gNB, or when the UE resumes RRC connection from an RRC Inactive state, or when a UE re-establishes RRC connection after a radio link failure (RLF). In addition, even for a UE in RRC Connected state the gNB may have outdated or no CSI available for the UE. For example, when a UE transmits a PRACH as part of a link recovery procedure (also referred to as beam failure recovery (BFR)), the gNB may not have available CSI for receptions by the UE using a new candidate beam that the UE determined.

For DL reception or uplink (UL) transmission following a Msg1/A PRACH preamble transmission until the UE is provided with dedicated RRC configuration for CSI measurement and reporting, link adaptation is mainly based on information that the gNB can determine from the PRACH preamble reception. Such determination can include a PRACH received power or a received cyclic shift for a PRACH preamble. For example, the gNB may be able to estimate a propagation delay or a round-trip delay between the UE and the gNB, and a corresponding distance to the UE that can then be used to determine a pathloss. The gNB can also determine a DL RS, such as an SSB or a CSI-RS, associated with the PRACH, based on a corresponding linkage with a random access channel (RACH) occasions (RO) that the UE has used for PRACH transmission.

However, a channel quality determination based on gNB measurements of a PRACH reception may be of insufficient accuracy or may provide only partial information. A UE that is not in RRC Connected state transmits a PRACH based on a cell-specific configuration and with a narrow frequency-domain resource allocation. The PRACH transmission is associated with an SSB that typically has a wide beam/spatial filter. Such misalignment between a SSB and a PRACH spatial filter can impact DL receptions or UL transmissions including Msg2 PDCCH or PDSCH, Msg3 PUSCH, Msg4 PDCCH or PDSCH, MsgB PDSCH, or any PDCCH/PDSCH/PUSCH/PUCCH corresponding to a repetition or retransmission of such messages, or any other DL receptions or UL transmissions prior to dedicated RRC configuration. Link adaptation for MsgA PUSCH can be also challenging since a single MCS value is (pre-) configured for MsgA PUSCH without dependence on any prior CSI measurement and reporting.

The impact of inaccurate channel estimation is more pronounced for Msg2/B PDCCH or PDSCH, wherein a same PDCCH and PDSCH needs to be broadcast to multiple UEs, such as all UEs with a same RA-RNTI or MsgB-RNTI that transmitted a corresponding PRACH at a same time. In such cases, the gNB needs to allocate control channel elements (CCEs) for Msg2/B PDCCH that schedules Msg2/B PDSCH and transmit the Msg2/B PDSCH based on the worst case channel quality among all such UEs, thereby increasing an effect from an inaccuracy in estimated CSIs for the UEs.

In such cases, a CSI report prior to Msg2/B scheduling and transmission can be beneficial when a UE does not have dedicated RRC configuration for CSI measurement reference signals (RSs) or for CSI reporting resources. Based on an early CSI report, a gNB can perform more accurate link adaptation such as for CCE allocation or MCS selection or possibly for coverage enhancement by indicating a number of repetitions for a Msg2/B transmission. An early CSI report can be based on measurements of an SSB, such as an SSB associated with the PRACH, or based on measurements of a non-zero-power (NZP) CSI-RS that is configured for example by a system information block (SIB) to provide link adaptation or beam management. For example, such DL RS can have a large frequency allocation and correspond to a narrower beam/spatial filter.

For early CSI reporting, one method can be based on providing a CSI report on a Msg3 PUSCH. However, such a solution cannot be used for link adaptation and coverage enhancements of previous messages, including reception of Msg2 PDCCH/PDSCH or repetitions or re-transmissions thereof, or for initial transmission of Msg3 PUSCH.

Therefore, embodiments of the present disclosure take into consideration that there is a need to facilitate early channel state information (CSI) reporting from a UE to a serving gNB to improve link adaptation during an initial random access procedure.

Embodiments of the present disclosure also take into consideration that there is a need to enable early CSI reporting to be used for link adaptation of broadcast messages such as a PDCCH scheduling a Msg2/B or the Msg2/B transmission.

Embodiments of the present further disclosure also take into consideration that there is a need to enhance MCS selection for initial transmission of Msg3/A PUSCH.

Accordingly, the present disclosure provides methods and apparatus for improved link adaptation for a random access procedure based on CSI reporting by a UE using a PRACH transmission. Such an approach can improve the reliability and coverage of all transmissions and receptions following the PRACH transmission, including for broadcast Msg2 PDCCH/PDSCH and Msg3 PUSCH.

Various methods are disclosed for CSI reporting using PRACH including: (i) use of one from multiple time/frequency resource groups for PRACH transmission, such as one from multiple BWPs for PRACH transmission (depending on the CSI report value); (ii) use one from multiple PRACH preamble groups; (iii) use of one from multiple new/additional cyclic shifts; (iv) use of a (phase) modulation on the PRACH preamble; and (v) explicit indication of CSI in a MsgA PUSCH payload for a 2-step RACH procedure.

One motivation for CSI reporting on PRACH is to enable coverage enhancements in higher frequency bands, such as the ones above 6 GHz. In addition, the embodiments can also apply to various use cases and settings, such as frequency bands below 6 GHz, eMBB, URLLC and IIoT and XR, mMTC and IoT, sidelink/V2X, operation in NR-U, NTN, aerial systems such as drones, operation with RedCap UEs, private or NPN, and the like.

Embodiments of the disclosure describe supporting CSI reporting on PRACH are elaborated further below.

Embodiments, described in greater detail below, denoted as E-7, describe CSI report on PRACH. For example, a UE includes a channel state information (CSI) report in a PRACH transmission, wherein a PRACH transmission can refer to a Msg1 PRACH for a 4-step RACH (Type-1 random access) or MsgA PRACH for a 2-step RACH (Type-2 random access). Such reporting can be beneficial for link adaptation, MCS selection, coverage enhancement, or beam management during initial access, such as for a selection of a number of control channel elements (CCEs) for Msg2/B PDCCH, or MCS selection for Msg2/B PDSCH, or MCS selection for Msg3/A PUSCH, and the like.

Embodiments, described in greater detail below, denoted as E-8, describe CSI report on PRACH using time/frequency resource groups for PRACH (including different BWPs). For example, a UE can indicate a CSI value range by a PRACH transmission based on a selection of time/frequency resources for the PRACH transmission. The UE can be configured with a number of groups of time/frequency resources for PRACH transmission, wherein a CSI value range is mapped to one of the time/frequency resource groups. A higher layer configuration such as a SIB can indicate a mapping between CSI values and PRACH time/frequency resource groups and a mapping between CSI values and parameters such as a MCS value or an RSRP range. MCS values used for the mapping to CSI values can be non-consecutive MCS entries from a predetermined MCS table in order to reduce a required number of bits for the CSI report. Therefore, when the UE transmits a PRACH in a RACH occasion (RO) from a first time/frequency resource group, the UE indicates a first value range for CSI report, and when the UE transmits a PRACH in an RO from a second time/frequency resource group, the UE indicates a second value range for CSI report. The multiple frequency resource groups can be in a same BWP or in different BWPs. A similar procedure can be used to determine or indicate a number of repetitions for DL receptions or UL transmissions following the PRACH transmission.

Embodiments, described in greater detail below, denoted as E-9, describe CSI reports on PRACH using PRACH preamble groups. For example, a UE can indicate a CSI value in a PRACH transmission by selecting a PRACH preamble from multiple PRACH preamble groups (a higher layer configuration such as a SIB indicates a mapping between CSI values and PRACH preamble groups). Accordingly, the UE can indicate a first CSI report value by transmitting a PRACH preamble from a first PRACH preamble group or indicate a second CSI report value by transmitting a PRACH preamble from a second PRACH preamble group.

Embodiments, described in greater detail below, denoted as E-10, describe CSI reports on PRACH using PRACH cyclic shifts or root sequences. For example, a UE can indicate a CSI value in a PRACH transmission by applying a new/additional cyclic shift or root sequence to the PRACH preamble sequence. For example, the UE can be provided by a SIB with a set of new cyclic shifts or root sequences for the PRACH preamble, separate from a baseline cyclic shift or root sequence configured for PRACH sequence generation. The UE can indicate a first CSI report value by not applying a new/additional cyclic shift or by applying a first new/additional cyclic shift to the PRACH preamble sequence or indicate a second CSI report value by applying a second new/additional cyclic shift to the PRACH preamble sequence.

Embodiments, described in greater detail below, denoted as E-11, describe CSI reports on PRACH using (phase) modulation applied to PRACH sequence/preamble. For example, a UE can indicate a CSI value in a PRACH transmission by phase modulation of the CSI report on the PRACH preamble sequence. The UE can be configured, for example by a SIB, with a set of modulation parameter values, such as phase rotation values, to apply to some part(s) or the entire PRACH preamble sequence. Accordingly, the UE can indicate a first CSI report value by not applying a modulation or by applying a first value of the modulation parameter, such as a first phase rotation value, to the PRACH preamble sequence, or indicate a second CSI report value by applying a second value of the modulation parameter, such as a second phase rotation value.

Embodiments, described in greater detail below, denoted as E-12, describe CSI reports using MsgA PUSCH or MsgA PRACH. For example, a UE can indicate a CSI value in a first step of a random access procedure by explicit indication of CSI report value in a "header" PUSCH transmission, such as in a payload of MsgA PUSCH in a 2-step RACH (Type-2 RA) or using a MAC control element. In an alternative method, the UE can indicate the CSI report value on the MsgA PRACH (using any of the methods presented in the previous embodiments). In such a case, the UE can be configured with multiple MCS values (or multiple repetition values) for MsgA PUSCH, and the UE can transmit the MsgA PUSCH with an MCS that is mapped to the reported CSI value.

As used herein, the terms "SSB" and "SS/PBCH block" may be used interchangeably.

Additionally, as used herein, the terms "configuration" or "higher layer configuration" and variations thereof (such as "configured" and the like) are used to refer to one or more of: a system information signaling such as by a MIB or a SIB (such as SIB1), a common or cell-specific higher layer/RRC signaling, and a dedicated or UE-specific or BWP-specific higher layer/RRC signaling.

Further, as used herein, the term signal quality is used to refer to RSRP, reference signal received quality (RSRQ), received signal strength indicator (RSSI), signal to interference & noise ratio (SINR), or the like with or without filtering such as L1 or L3 filtering, of a channel or a signal such as a reference signal (RS) including SSB, CSI-RS, or SRS.

Moreover, as used herein, the term dynamic PUSCH transmission is used to refer to a PUSCH transmission that is scheduled by a DCI format.

The terms "(UE) panel(s)" and "(UE) antenna port group(s)" are used interchangeably to refer to one or multiple UE panels, wherein a panel can refer to e.g. an antenna panel, an antenna array, or an antenna sub-array and the like, consisting of a number of antenna elements. In one example, a panel can be a physical panel, or a virtual panel based on a virtualization of a set of physical antenna elements to virtual transmission entities, wherein the virtualization details and schemes can be left to UE implementation and not disclosed to the gNB. In one realization, a UE panel can be a set of antennas that can generate an independent (or partially independent) spatial transmission/reception filter or beam. In one example, a panel can be a receiver "Rx" panel or a transmission "Tx" panel. In one example, the set of Rx panels and the set of Tx panels can have full or partial overlap or can be mutually exclusive. For example, the set of UE Tx panels can be a (strict) subset of the set of Rx panels. In one example, a UE panel can be identified and indicated by the network with an explicit or implicit identifier. For example, a Tx panel can be indicated by an uplink transmission entity (UTE) identifier, or an Rx panel can be indicated by a downlink transmission entity (DTE) identifier. In one example, a panel can be associated with a reference signal (RS), or an RS resource, or an RS resource set, or an RS resource group, wherein an RS can be a DL RS such as SSB or CSI-RS or an UL RS such as SRS. For example, at least for a UE in connected mode, a UE panel can be associated with an SRS resource set. In one example, a panel can be associated with a set or group of UE antenna ports. In one example, different UE panels can have same or different features, such as same or different number of antenna ports, same or different number of RF chains or power amplifiers (PAs) or LNAs connected to them, same or different baseband chains connected to them, same or different output power levels such as peak/average/min/max effective isotropic radiated power (EIRP) or TRP, and the like. In one example, UE panels can be associated with different capabilities such as different (beam) switching delays, different beam width, or different processing capabilities or timelines, and the like. A UE can have one or multiple Rx panels and one or more Tx panels. The UE can have one or multiple activated Tx panels for transmission (e.g., with an associated PA being already "warmed up") at any point in time. In one realization, the UE can transmit with a single Tx panel at any point in time, wherein the single Tx panel is the only activated Tx panel at that time (referred to as slow panel selection) or is one out of multiple activated Tx panels at that time (referred to as fast panel selection), wherein a panel selection can be based on UE determination or gNB signaling. In another realization, the UE can transmit with two or multiple Tx panels at any point in time (referred to as simultaneous transmission on multiple panels "STxMP" or as simultaneous multi-panel transmission "SMPTx"). In yet another realization, the UE can both transmit and receive with two or multiple Tx/Rx panels at any point in time (referred to as simultaneous transmission and reception on multiple panels "STRxMP" or as simultaneous multi-panel transmission and reception "SMPTRx").

The term Xn interface refers to a network interface between NG-RAN nodes. F1 interface refers to a network interface between a gNB central unit (CU) and a gNB distributed unite (DU).

The term antenna port is defined such that the channel over which a symbol on the antenna port is conveyed can be inferred from the channel over which another symbol on the same antenna port is conveyed.

For demodulation reference signal (DM-RS) associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are quasi co-location (QCL) with QCL Type A, Type D (when applicable) and average gain. The UE may further assume that no DM-RS collides with the SS/PBCH block.

A UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DMRS ports of the PDSCH, the DMRS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA, QCL-TypeB, QCL-TypeC, or QCL-TypeD. It is noted that QCL-TypeA corresponds to {Doppler shift, Doppler spread, average delay, delay spread}, QCL-TypeB corresponds to {Doppler shift, Doppler spread}, QCL-TypeC corresponds to {Doppler shift, average delay}, and QCL-TypeD corresponds to {Spatial Rx parameter}.

The UE (such as the UE 116) can receive a MAC-CE activation command to map up to N, e.g., N=8 TCI states to the codepoints of the DCI field 'Transmission Configuration Indication'. When the hybrid automatic repeat request acknowledgement (HARQ-ACK) information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot $n+3N_{slot}^{subframe,\mu}$ where $N_{slot}^{subframe,\mu}$ is a number of slot per subframe for subcarrier spacing (SCS) configuration $\mu$.

In certain embodiments, a gNB can transmit multiple SSBs within a cell bandwidth or within the frequency span of a carrier. The PCIs of SSBs transmitted in different frequency locations can have different PCIs. When an SSB is associated with a SIB such as a remaining minimum system information (RMSI), the SSB is referred to as a Cell-Defining SSB (CD-SSB). A primary cell (PCell) is usually associated to a CD-SSB located on the synchronization raster. From a UE perspective, each serving cell is associated with at most a single SSB.

The configured UE maximum output power $P_{CMAX,f,c}$ for carrier f of a serving cell c shall be set such that the corresponding measured peak EIRP $P_{UMAX,f,c}$ is within the bounds as described in Equation (1), below.

$$P\text{Powerclass}-\text{MAX}(\text{MAX}(MPRf,c,A-MPRf,c,)+ \Delta MBP,n,P-MPRf,c)-\text{MAX}\{T(\text{MAX}(MPRf,c,A-MPRf,c,)),T(P-MPRf,c)\} \leq PU\ \text{MAX},f,c \leq EIRP\text{-max} \quad (1)$$

Additionally, the corresponding measured total radiated power $P_{TMAX,f,c}$ is bounded, as described in Equation (2), below.

$$P_{TMAX,f,c} < TRP\ \text{max} \quad (2)$$

In certain embodiments, within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with an RMSI, the SSB is referred to as a Cell-Defining SSB (CD-SSB). A PCell is usually associated to a CD-SSB located on the synchronization raster.

For a UE in RRC_CONNECTED state, the BWPs configured to the UE by a serving cell may overlap in frequency with BWPs configured to other UEs by other cells within a carrier. Multiple SSBs may also be transmitted within the frequency span of a carrier used by the serving cell. However, from the UE perspective, each serving cell is associated with at most a single SSB.

The term CORESET #0 refers to a control resource set for at least SIB1 scheduling. Additionally CORESET #0 can be configured either via MIB or via dedicated RRC signaling.

System Information (SI) consists of a MIB and a number of SIBs Minimum SI includes information required for initial access and information for acquiring any other SI Minimum SI consists of MIB and a first SIB (SIB1). MIB can includes cell barred status information and essential physical layer information of the cell required to receive further system information, e.g. CORESET #0 configuration. MIB is periodically broadcast on BCH. SIB1 defines the scheduling of other system information blocks and contains information required for initial access. SIB1 is also referred to as Remaining Minimum SI (RMSI) and is periodically broadcasted on DL-SCH or transmitted in a UE-dedicated manner on DL-SCH to a UE in RRC_CONNECTED state.

In certain embodiments, other SI encompasses all SIBs not broadcasted in the Minimum SI. Other SIBs can either be periodically broadcasted on DL-SCH, broadcasted on-demand on DL-SCH (i.e. upon request from UEs in RRC_IDLE, RRC_INACTIVE, or RRC_CONNECTED), or provided in a dedicated manner on DL-SCH to a UE in RRC_CONNECTED state (i.e., upon request, if configured by the network, from UEs in RRC_CONNECTED or when the UE has an active BWP with no common search space configured).

Other SI include: (i) SIB2 contains cell re-selection information, mainly related to the serving cell; (ii) SIB3 contains information about the serving frequency and intra-frequency neighboring cells relevant for cell re-selection (including cell re-selection parameters common for a frequency as well as cell specific re-selection parameters); (iii) SIB4 contains information about other NR frequencies and inter-frequency neighboring cells relevant for cell re-selection (including cell re-selection parameters common for a frequency as well as cell specific re-selection parameters), which can also be used for NR idle/inactive measurements; (iv) SIB5 contains information about E-UTRA frequencies and E-UTRA neighboring cells relevant for cell re-selection (including cell re-selection parameters common for a frequency as well as cell specific re-selection parameters); (v) SIB6 contains an ETWS primary notification; (vi) SIB7 contains an ETWS secondary notification; (vii) SIB8 contains a CMAS warning notification; (viii) SIB9 contains information related to GPS time and Coordinated Universal Time (UTC); (ix) SIB10 contains the Human-Readable Network Names (HRNN) of the NPNs listed in SIB1; (x) SIB11 contains information related to idle/inactive measurements; and (xi) SIBpos contains positioning assistance data as defined in TS 37.355 and TS 38.331.

For a cell/frequency that is considered for camping by the UE, the UE is not required to acquire the contents of the minimum SI (such as the MIB/SIB1) of that cell/frequency from another cell/frequency layer. This does not preclude the case that the UE applies stored SI from previously visited cell(s).

If the UE cannot determine the full contents of the minimum SI (such as the MIB/SIB1) of a cell by receiving from that cell, the UE shall consider that cell as barred.

In case of bandwidth adaptation and BWP operation, the UE can acquire SI on the active BWP. For example, an initial BWP can be 24, 48, or 96 RBs in the frequency domain.

The MIB is mapped on the broadcast control channel (BCCH) and carried on BCH while all other SI messages are mapped on the BCCH, where they are dynamically carried on DL-SCH. In certain embodiments, the scheduling of SI messages part of Other SI is indicated by SIB1.

In certain embodiments, for UEs in RRC_IDLE and RRC_INACTIVE, a request for Other SI triggers a random access procedure where MSG3 includes the SI request message unless the requested SI is associated to a subset of the PRACH resources, in which case MSG1 is used for indication of the requested Other SI. When MSG1 is used, the minimum granularity of the request is one SI message (i.e. a set of SIBs), one RACH preamble and/or PRACH resource can be used to request multiple SI messages and the gNB acknowledges the request in MSG2. When MSG3 is used, the gNB acknowledges the request in MSG4.

In certain embodiments, for UEs in RRC_CONNECTED, a request for Other SI may be sent to the network, if configured by the network, in a dedicated manner (i.e., via UL-DCCH) and the granularity of the request is one SIB. The gNB may respond with an RRCReconfiguration including the requested SIB(s). It is a network choice to decide which requested SIBs are delivered in a dedicated or broadcasted manner. The Other SI may be broadcast at a configurable periodicity and for a certain duration. The Other SI may also be broadcast when it is requested by UE in RRC_IDLE or RRC_INACTIVE or RRC_CONNECTED.

For a UE to be allowed to camp on a cell, the UE should acquire the contents of the Minimum SI (such as the MIB/SIB1) from that cell. There may be cells in the system that do not broadcast a Minimum SI (such as the MIB/SIB1). Therefore a UE cannot camp on such cells.

Dual active protocol stack (DAPS) Handover refers to a handover procedure that maintains the source gNB connection after reception of RRC message for handover and until releasing the source cell after successful random access to the target gNB.

A MAC entity is defined per cell group, one for the MCG and one for the SCG. Two MAC entities can be considered for a UE when the UE is configured with DAPS handover: one for the source cell (source MAC entity) and one for the target cell (target MAC entity).

A UE can have at most one ongoing Random Access procedure at a given time in a MAC entity. It is up to UE implementation whether to continue with an ongoing procedure or start a new procedure (e.g., for SI request). PRACH initiation on a PCell can be by RRC (e.g., for SI request), MAC entity, or PDCCH order. PRACH initiation on a SCell can by a PDCCH order A random access procedure (for PCell) can be triggered by a number of events such as the following:
 a. Initial access from RRC_IDLE to establish RRC connection 4 contention based random access (CBRA).
 b. RRC Connection Re-establishment procedure (after radio link failure (RLF))→CBRA.
 c. Transition from RRC_INACTIVE to RRC_CONNECTED→CBRA.
 d. Request by RRC upon synchronous reconfiguration (e.g. handover)→CBRA or contention free random access (CFRA).
 e. Request for other (on-demand) system information (OSI)→CBRA or CFRA.
 f. DL data arrival during RRC_CONNECTED when UL synchronization status is "non-synchronized" i.e., Out-of-Sync→CBRA or CFRA.
 g. UL data arrival during RRC_CONNECTED when UL synchronization status is "non-synchronized" i.e., Out-of-Sync→CBRA.
 h. To establish time alignment for a secondary TAG→CBRA or CFRA.
 i. Scheduling request "SR" issues, such as UL data arrival during RRC_CONNECTED when there are no PUCCH resources for SR available, or failure of PUCCH-based SR→CBRA.
 j. Link recovery procedure—also known as beam failure recovery "BFR" →CBRA or CFRA.
 k. Consistent UL LBT failure on SpCell.

For PRACH on a SCell, some of the above triggers may not apply. For example, a PRACH trigger for SCell can include Out-of-sync and BFR.

Two types of random access procedure are supported: 4-step RA type with MSG1 and 2-step RA type with MSGA. Both types of RA procedure support CBRA and CFRA.

There can be a number of cases for selection of a RA procedure type (4-step RA or 2-step RA). For example, a UE can select a 2-step RA when only 2-step RA resources are provided, or when both 2-step and 4-step RA resources are provided and a RSRP that a UE measures is larger than a threshold, or when a PRACH transmission is triggered by reconfiguration with sync (for example, for handover purposes) and CFRA resources for a 2-step RA procedure are provided. Otherwise, the UE can select a 4-step RA procedure including when a PRACH transmission is triggered by PDCCH order, or by RRC for SI request with explicit RACH resources, or by BFR with explicit CFRA resources for 4-step RA procedure, or by reconfiguration with sync (e.g., handover) with explicit CFRA resources for 4-step RA procedure.

In one example, when CFRA resources are not configured, a UE uses an RSRP threshold to select between 2-step RA type and 4-step RA type. In another example, when CFRA resources for 4-step RA type are configured, the UE performs random access with 4-step RA type. In yet another example, when CFRA resources for 2-step RA type are configured, the UE performs random access with 2-step RA type. In a further example, CFRA with 2-step RA type is only supported for handover. In one example, the network does not configure CFRA resources for 4-step and 2-step RA types at the same time for a bandwidth part (BWP).

The UE can select the RA procedure type at the initiation of the RA procedure based on network configuration in a number of instances. For example, the UE can select the RA procedure type at the initiation of the RA procedure based on network configuration when CFRA resources are not configured, the UE uses an RSRP threshold to select between 2-step RA type and 4-step RA type, depending on whether or not an RSRP measurement is larger than the RSRP threshold, respectively. For another example, the UE can select the RA procedure type at the initiation of the RA procedure based on network configuration when CFRA resources for 4-step RA type are configured, the UE performs random access with 4-step RA type. For yet another example, the UE can select the RA procedure type at the initiation of the RA procedure based on network configuration when CFRA resources for 2-step RA type are configured, the UE performs random access with 2-step RA type.

The network does not configure CFRA resources for 4-step and 2-step RA types at the same time for a BWP. CFRA with 2-step RA type is only supported for handover.

Msg1 refers to PRACH preamble transmission of the RA procedure for 4-step RA type. MsgA refers to PRACH preamble and PUSCH transmissions of the RA procedure for 2-step RA type.

Msg3 refers to first scheduled transmission of the RA procedure. MsgB refers to response to MSGA in the 2-step RA procedure. MSGB may consist of response(s) for contention resolution, fallback indication(s), and backoff indication.

The MSG1 of the 4-step RA type consists of a preamble on PRACH. After MSG1 transmission, the UE monitors PDCCH for scheduling of a RAR reception within a configured window. For CFRA, the UE is assigned by the network a dedicated preamble for MSG1 transmission and, upon receiving random access response (RAR) from the network, the UE ends the RA procedure. For CBRA, upon RAR reception, the UE transmits a MSG3 PUSCH that is scheduled by an UL grant in the RAR response and monitors PDCCH for scheduling of a MSG4 PDSCH reception that provides contention resolution (can be a first PDSCH reception or a later PDSCH reception after MSG3 PUSCH transmission). If contention resolution is not successful after MSG3 (re)transmission(s), the UE goes back to MSG1 transmission and repeats the RA procedure.

The MSGA of the 2-step RA type includes a preamble on PRACH and a payload on PUSCH. After MSGA transmission, the UE monitors PDCCH for scheduling a PDSCH reception providing a RAR within a configured window. For CFRA, dedicated preamble and PUSCH resource are configured for MSGA transmission and, upon receiving a RAR from the network, the UE ends the RA procedure. For CBRA, if contention resolution is successful upon receiving the RAR, the UE ends the RA procedure; while if fallback indication is received in MSGB, the UE transmits a MSG3 PUSCH using the UL grant in the fallback indication and monitors PDCCH for scheduling of PDSCH receptions for contention resolution. If contention resolution is not successful after MSG3 (re)transmission(s), the UE goes back to MSGA transmission.

If the UE does not complete an RA procedure with 2-step RA type after a number of MSGA transmissions, the UE can be configured to switch to CBRA with 4-step RA type.

For random access on a cell configured with a SUL carrier, the network can indicate which carrier to use (UL or SUL). Otherwise, the UE selects the SUL carrier when the measured RSRP is smaller than a broadcast RSRP threshold. The UE performs carrier selection before selecting between a 2-step and a 4-step RA type. The RSRP threshold for selecting between a 2-step and a 4-step RA type can be configured separately for UL and SUL carriers. The UE performs all transmissions of a RA procedure on the selected carrier. In one example, the UE can perform some of the RA steps on a different UL carrier, based on gNB configuration or indication.

When a UE is configured with CA operation, the UE performs a 2-step RA type only on the PCell while a PDSCH reception for contention resolution can be cross-scheduled on a SCell by the PCell.

When a UE is configured for CA operation and for a 4-step RA type, the UE always performs the first three steps of CBRA on the PCell while PDSCH reception for contention resolution (step 4) can be cross-scheduled by the PCell. For a CFRA on PCell, the UE performs all RA steps on the PCell. CFRA on SCell can (only) be initiated by the gNB to establish timing advance for a secondary TAG; the gNB initiates the CFRA with a PDCCH order (step 0) on a scheduling cell of an activated SCell of the secondary TAG, the UE transmits a PRACH (step 1) on the SCell indicated by the PDCCH order and receives a PDSCH with RAR (step 2) on the PCell. In one example, for CFRA on PCell or SCell, the UE can receive a PDSCH reception with RAR on an SCell that is configured by the network or indicated in the PDCCH scheduling the RAR.

The PRACH preamble sequences can be of different lengths such as four lengths. For example, a sequence length 839 applies with subcarrier spacing (SCS) of 1.25 kHz or 5 kHz, a sequence length 139 applies with SCS of 15, 30, 60 or 120 kHz, and sequence lengths of 571 and 1151 apply with SCS of 30 kHz and 15 kHz, respectively. Sequence length 839 supports unrestricted sets and restricted sets of Type A and Type B, while sequence lengths 139, 571, and 1151 support unrestricted sets only. Sequence length 839 is only used for operation with licensed channel access while sequence length 139 can be used for operation with either licensed or shared spectrum channel access. Sequence lengths of 571 and 1151 can be used only for operation with shared spectrum channel access.

In certain embodiments, a long PRACH preamble with L=839 subcarriers and an SCS=1.25 kHz or SCS=5 kHZ can span a bandwidth of about 6 RBs or 24 RBs (w.r.t. a 15-kHz frequency grid), respectively. For FR2, a short PRACH preamble with L=139 subcarriers can span about 12 RBs in the numerology of the PRACH preamble.

Multiple PRACH preamble formats are defined with one or more symbols and different cyclic prefix and guard time. A UE (such as the UE 116) is indicated a PRACH preamble configuration to use by system information.

The UE calculates the PRACH transmit power for a PRACH retransmission based on a most recent pathloss estimate and a value of a power ramping counter. In certain embodiments, if prior to a PRACH retransmission, a UE (such as the UE 116) changes the spatial domain transmission filter, Layer 1 notifies higher layers to suspend the power ramping counter. If the UE transmits a PRACH with reduced power in a transmission occasion, or if the UE does not transmit a PRACH in a transmission occasion, due a CA/DC power allocation, Layer 1 may notify higher layers to suspend the corresponding power ramping counter.

System information provides to a UE information for an association between a corresponding SSB and resources for a RA procedure. The RSRP threshold for SSB selection for RACH resource association is configurable by the network.

During the RA procedure, the following identities are also used. For example, RA-RNTI, is used for identification of the DCI format scheduling a PDSCH reception with a RAR. Temporary C-RNTI is used for UE identification temporarily used for scheduling during the RA procedure. Random value for contention resolution (also known as a contention resolution identity) is used for UE identification temporarily used for contention resolution purposes during the RA procedure.

In certain embodiments, there can be number of cases for RAR/MsgB reception after PRACH transmission. In one example, when PRACH is based on CFRA for BFR and the UE receives, according to a recovery search space set, a PDCCH providing a DCI format having a CRC scrambled by a C-RNTI and scheduling a PDSCH with a RAR during time window, then the RA procedure is successfully completed.

In another example, for other RA cases (i.e., expect for CFRA for BFR and when the UE receives PDCCH providing a DCI format having a CRC scrambled by a RA-RNTI and scheduling a PDSCH with a RAR and the UE successfully decodes the RAR if the RAR includes a BI, the UE needs to back off from PRACH transmission for an indicated time duration.

In another example, for other RA cases (i.e., expect for CFRA for BFR) and when the UE receives PDCCH providing a DCI format having a CRC scrambled by a RA-RNTI and scheduling a PDSCH with a RAR and the UE successfully decodes the RAR if the RAR includes only the transmitted RA preamble ID (RAPID), the RA procedures is successfully completed. For instance, this applies to SI request when the gNB is confirming a UE request for SI.

In yet another example, for other RA cases (i.e., expect for CFRA for BFR) and when the UE receives PDCCH providing a DCI format having a CRC scrambled by a RA-RNTI and scheduling a PDSCH with a RAR and the UE successfully decodes the RAR if the RAR includes RAPID, a TA value, a RAR UL grant, and a TC-RNTI, and if RA preamble was for CBRA, the UE applies the TA for transmissions on the cell where the UE transmitted the PRACH, and transmits a Msg3 PUSCH (including C-RNTI MAC-CE or BFR MAC-CE).

When a RAR monitoring time window expires without the UE receiving a RAR and a maximum configured number of PRACH transmissions has not been reached for the UE, the UE backs-off for a time duration, if applicable, selects a new PRACH resource (including beam, RO, preamble, and power ramping if same beam), and transmits another PRACH. In one example, HARQ operation is not supported for RAR reception. When a maximum number of configured PRACH transmissions for a RA procedure has been reached for a UE, the RA procedure is unsuccessfully completed.

In certain embodiments, a UE transmits Msg3 PUSCH providing an UL-SCH containing a C-RNTI MAC CE or common control channel (CCCH) service data unit (SDU), submitted from upper layer and associated with the UE Contention Resolution Identity, as part of a RA procedure. In one example, CCCH SDU captures the UE contention resolution ID, for example by 6 octets/bytes.

There can be a number of cases for Msg4 PDSCH reception by a UE after Msg3 PUSCH transmission by the UE, or any possible number of HARQ retransmissions of Msg3 PUSCH, wherein the UE monitors PDCCH for scheduling a Msg4 PDSCH reception during the Contention Resolution time window. In one example, when the UE has a C-RNTI and receives a Msg4 PDSCH during a time window addressed to C-RNTI, then contention resolution is successfully completed. This can apply to a RA procedure triggered by, for example, SpCell BFR, or PDCCH order, or MAC, or RRC. In another example, when the UE does not have a C-RNTI, for example the UE only has a TC-RNTI received in RAR, and the UE transmitted a Msg3 PUSCH with a Contention Resolution ID and receives a Msg4 PDSCH addressed to TC-RNTI that includes a matching contention resolution ID, then contention resolution is successfully completed. Otherwise, the UE discards the TC-RNTI received in the RAR, and contention resolution is unsuccessful. In one example, when there is no match for the TC-RNTI, the contention resolution timer expires, and the configured maximum number of PRACH transmissions is not reached, the UE transmits a new PRACH based on a new PRACH resource selection (for preamble, RO, SSB). In one example, when the configured maximum number of PRACH transmissions is reached, the UE stops the RA procedure and indicates a random access failure to higher layers in case of a 4-step RA procedure while, for 2-step RA, the UE falls back to 4-step RA. A PDSCH scheduled after Msg3 transmission is referred to for brevity as Msg4 PDSCH, but it is understood that contention resolution can be provided by any PDSCH that the UE receives after transmission of a Msg3 PUSCH and not necessarily by the first such PDSCH.

Throughput the present disclosure, the terms "transmission reception point(s)" or "TRP(s)" are used interchangeably to refer to a set of geographically co-located antennas, e.g. antenna array with one or more antenna elements, supporting a transmission and/or reception functionality at the network/eNB/gNB side. A TRP can be a transmission-point (TP) only, or a reception-point (RP) only, or a combined transmission and reception point. In one realization, a TRP can be a set of one or more geographically co-located transmit and/or receive antennas, antenna arrays, sub-arrays, panels, each with one or more antenna elements. A TRP can include base station (eNB/gNB) antennas, remote radio heads, a remote antenna of a base station, or combinations or variations thereof.

A TRP can correspond to different logical functionality slices for a base station architecture deployment such as a radio unit (RU), an access unit (AU), a distributed unit (DU), a centralized unit (CU), or combinations and variations thereof. A TRP can provide various tasks and functionalities such as some or all of aspects related to digital front end, digital/analog/hybrid beamforming, PHY, RLC, MAC, RRC, or PDCP layers, or combinations or variations thereof.

In one example, a TRP can transmit or receive any/all signals and channels, while in another example, a TRP can transmit or receive only one or some, but not all, signal(s) or channel(s). For example, a TRP can transmit only positioning reference signal (PRS), referred to as a PRS-only TP.

A TRP is typically associated with a single cell but can also correspond to multiple cells.

One cell can include one or multiple TRPs. In one realization, a cell can include only a single TRP. In another realization, a cell can include two or more TRPs (referred to as multi-TRP operation). In one example, multi-TRP operation can also refer to operation with multiple TRPs corresponding to multiple cells. For a multi-TRP operation, different TRPs can be coordinated using wired or wireless backhaul connections to exchange information, such as scheduling or configuration information. Such backhaul, when available, can be slow or fast, corresponding to different latency levels for exchange of information between TRPs. Different TRPs may or may not synchronized, for example with a symbol-level or slot-level or frame-level timing difference, or with an absolute timing difference less than a threshold.

A UE may transmit to or receive from only one TRP on a cell at a given time (referred to as dynamic point selection "DPS"). A UE may also transmit to or receive from two or more TRPs on a cell at a given time (referred to as joint transmission/reception), wherein the two or more TRPs can be a subset of the multiple TRPs associated with the cell. The set of two or more TRPs that a UE is transmitting to or receiving from can be a set of TRPs provided by higher layers or indicated by L1/L2 signaling, such as a DCI format or a MAC-CE activation/deactivation command A transmission or reception by a TRP may or may not be coordinated with transmission or receptions by other TRPs on a same cell or on neighbor cells, for example in terms of coordinated scheduling or coordinated beamforming. A joint transmission or reception by two or more TRPs for a UE can be coordinated or not coordinated between those TRPs, referred to as coherent or non-coherent transmission or reception. A joint transmission or reception by two or more TRPs for a UE can be scheduled by a single PDCCH/DCI format or by multiple PDCCHs/DCI formats or can be based on a joint or multiple individual configured grant (CG) PUSCH or semi-persistent scheduling (SPS) PDSCH configuration(s), associated with the two or more TRPs.

Configuration, indication, scheduling, or activation mechanism(s) corresponding to multiple TRPs for PUSCH and PDSCH can be applicable to any DL/UL/SL signal or channel.

A linkage of such configuration, indication, scheduling, or activation mechanism(s) to TRPs may or may not be transparent to the UE. For example, a UE may monitor PDCCH in a number of CORESET pool(s) with different indices and corresponding time/frequency/spatial domain configurations, without any explicit linkage to or indication of a corresponding number of TRP(s). For example, a UE may be configured with a number of PUCCH resource set(s) or PUCCH resource group(s) without any explicit linkage to or indication of a corresponding number of TRP(s).

In one realization, a TRP may be identified by an explicit identity such as a TRP-ID. A TRP-ID can include a number of identities for a corresponding cell, such as a physical cell identity (PCI), or a cell global identity (CGI) such as an NR CGI (NCGI), as well as a number of identities for the TRP, such as an NR absolute radio frequency channel number (NRARFCN) of the TRP, or a dedicated TRP identity within the cell. Such a dedicated TRP identity within the cell can be an identity to directly refer to the TRP entity or to a reference signal or a set/group of reference signals, or a number of sets/groups of reference signals transmitted by the TRP. In one example, a dedicated TRP identity can be an index (or a set of indices) for one or more positioning reference signal (PRS) resource(s) or resource set(s) transmitted by the TRP. A TRP-ID may be known to a UE transmitting to or receiving from the TRP, or such TRP-ID may be transparent to the UE. A TRP-ID can be known or provided when two cells/gNBs, such as two neighbor cells/gNBs, exchange information such as configuration or scheduling information. A configuration, scheduling, activation, indication, of DL/UL/SL channels or signals can be mapped to a TRP-ID.

One or more TRP(s) corresponding to a first cell can exchange information with one or more TRP(s) corresponding to a second cell. Accordingly, a UE may receive, from a serving cell, configuration information corresponding to one or more TRP(s) of neighbor/non-serving cell(s), such as SSB information, location information, PRS information, or beam/RS/TCI state information. For example, a TCI state configured by a serving cell to a UE can be with respect to SSB(s) or TCI state(s) of a neighbor/non-serving cell. An information exchange between TRPs can be via an Xn interface or an F1 interface or any other network interfaces, or a combination or variation thereof.

A TRP can also be a stationary entity or can be a mobile entity, such as a vehicle, or a drone or a satellite, or a mobile IAB node mounted on top of a high-speed train, a vessel, or an aircraft. Such mobile TRPs may use wireless backhaul connections with other TRPs in the cell.

In one realization, two or multiple TRPs associated with a same cell, for example with same cell ID such as same PCI or same CGI, can transmit same PSS and SSS sequences, can use a same frame or half-frame for SSB transmission, and can transmit SSB on a same initial BWP. In one example, each TRP can transmit a different subset of SSB indices (from a set of actually transmitted SSBs, referred to as an SSB burst set), wherein each SSB index corresponds to a different transmission timing such as a different time slot or to a different spatial filter or beam. For example, TRP #1 transmits SSB #0 to #3, and TRP #2 transmits SSB #5 to #7. In addition, both/all TRPs associated with a same cell can transmit a same PBCH/MIB content in the corresponding SSBs (e.g., same CORESET #0 and search space set #0 indication).

In one example, different TRPs associated with a same cell can transmit a same subset of SSB indices using different spatial filters/beam, thereby enabling spatial multiplexing of SSB transmissions in same time and frequency resources. Such operation can be considered, for example, when some UEs can distinguish line-of-sight (LOS) transmissions from non-line-of-sight (NLOS) transmissions and can therefore distinguish multi-path reflections of a same SSB. In another example, a UE can distinguish SSBs corresponding to different TRPs of a same cell that are multiplexed in time in a same time slot by methods other than or in addition to spatial filters/beams, such as by different TRP-specific cyclic shifts for the PSS/SSS sequences, in addition to the cell-specific cyclic shift value, or the corresponding DMRS, or by using different TRP-specific scrambling of the PSS/SSS sequences or the corresponding DMRS in addition to any cell-specific scrambling.

In another realization, at least when TRPs are associated with different cells, the TRPs can transmit different PSS or SSS sequences, can use different frame or half-frame for SSB transmission, and can transmit SSB on different initial BWPs. In one example, a TRP can transmit a same subset of SSB indices (from a set of actually transmitted SSBs, referred to as an SSB burst set), wherein each SSB index corresponds to a transmission timing such as a time slot or to a different spatial filter or beam. For example, both TRP #1 and TRP #2 can transmit SSBs #0 to #3 using different sequences. In addition, TRPs associated with different cells can transmit different PBCH/MIB content in the corresponding SSBs (for example, different CORESET #0 and search space set #0 indications).

Throughout the present disclosure, the embodiments are described in terms of two or multiple RA procedures. The embodiments also apply to multiple repetitions of a single RA procedure (or multiple RA procedures), including multiple repetitions of one or more of Msg1/MsgA PRACH, Msg2/B PDCCH/PDSCH, Msg3/A PUSCH, Msg4 PDCCH/PDSCH, wherein the repetitions can be associated with same or different UE-Tx/UE-Rx beam(s) or same or different DL/UL reference signals, such as same/different SSB(s), or CSI-RS(s), or SRS(s).

The following embodiments of the present disclosure, denoted as E-1, describe multiple concurrent RA procedures towards multiple TRPs/cells (including RA procedures for initial access). This is described in following examples and embodiments such as those of FIGS. 6-10.

Figure 6:
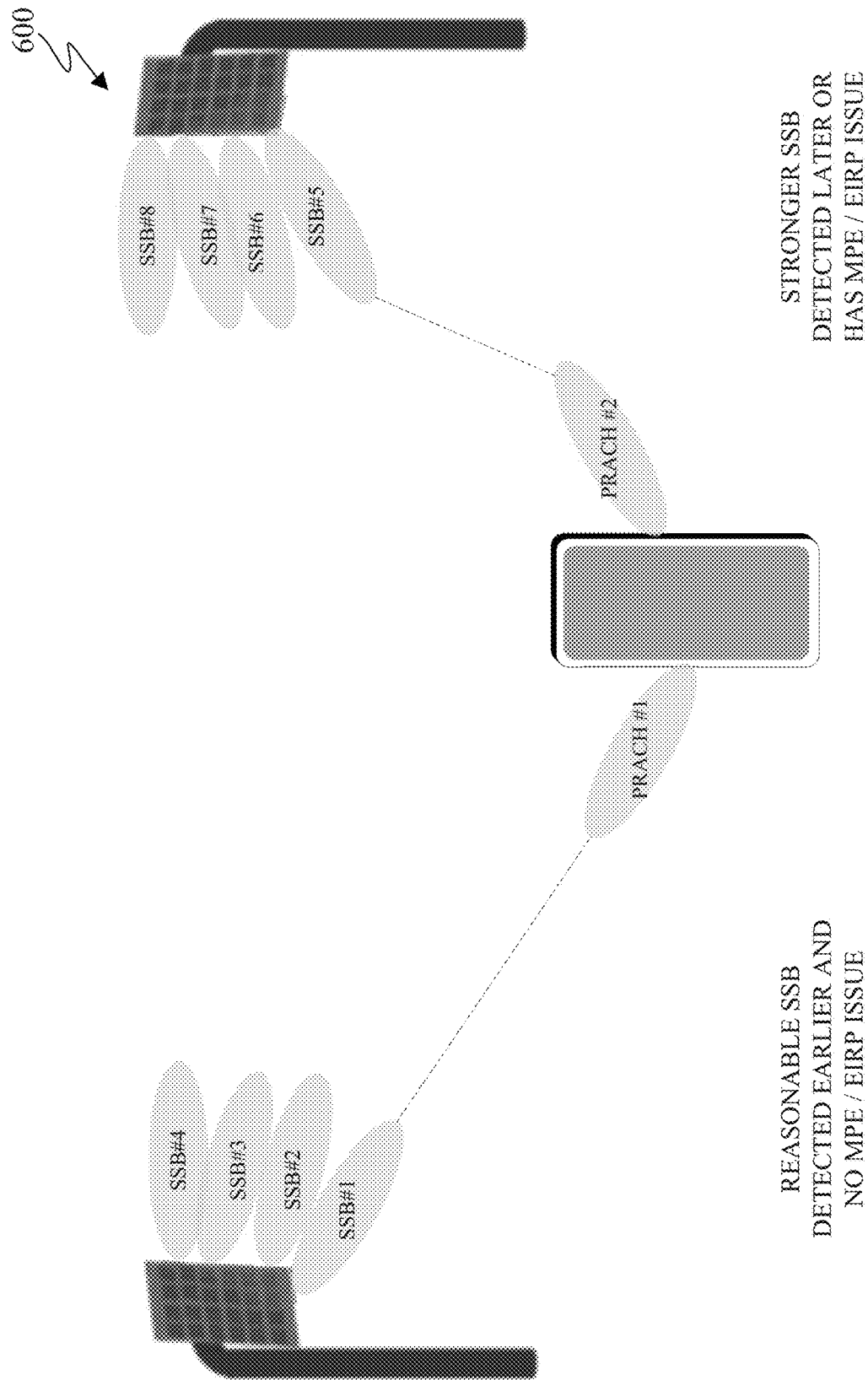
FIG. 6 illustrates a diagram of two concurrent RA procedures towards two TRPs according to embodiments of present disclosure.
Figure 7:
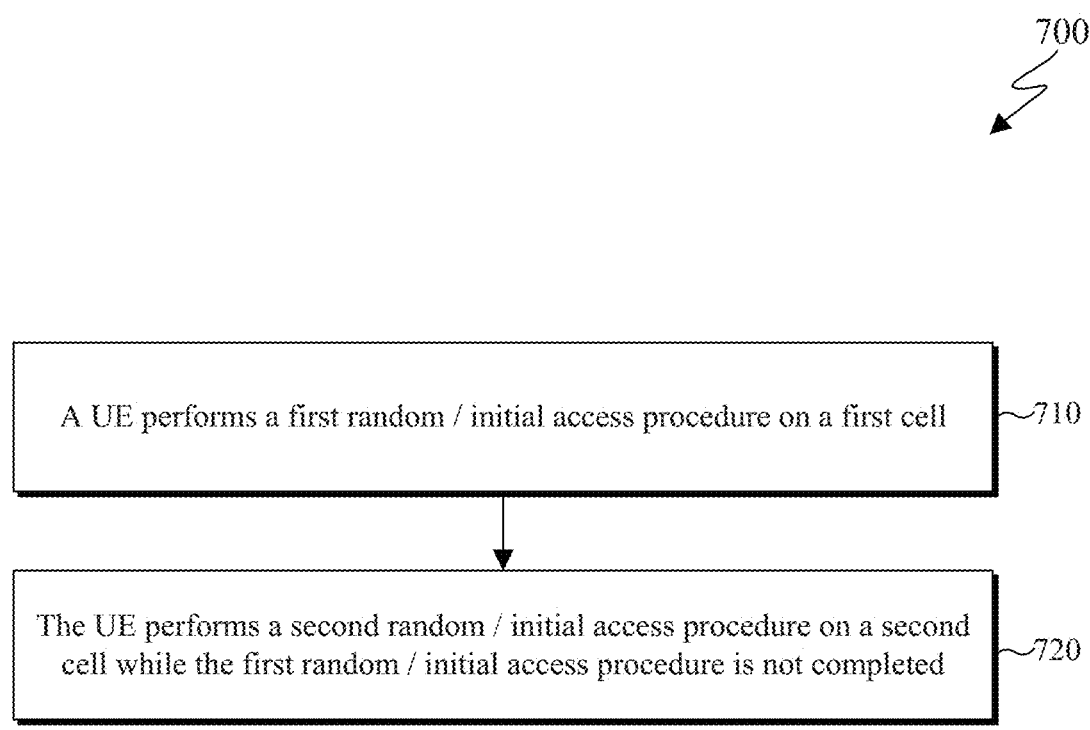
FIG. 7 illustrates an example method for two concurrent random/initial procedures from a UE on two different cells according to embodiments of present disclosure.
Figure 8:
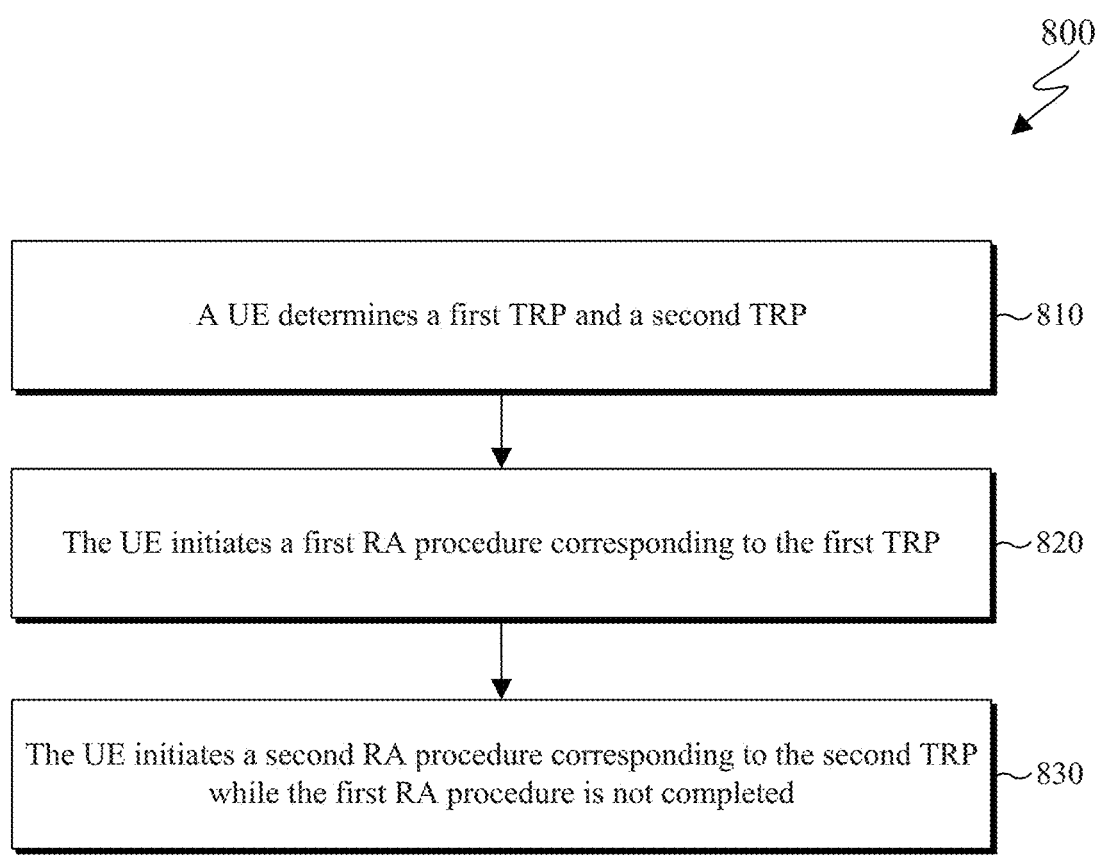
FIG. 8 illustrates an example method for two concurrent RA procedures towards two TRPs according to embodiments of present disclosure.
Figure 9:
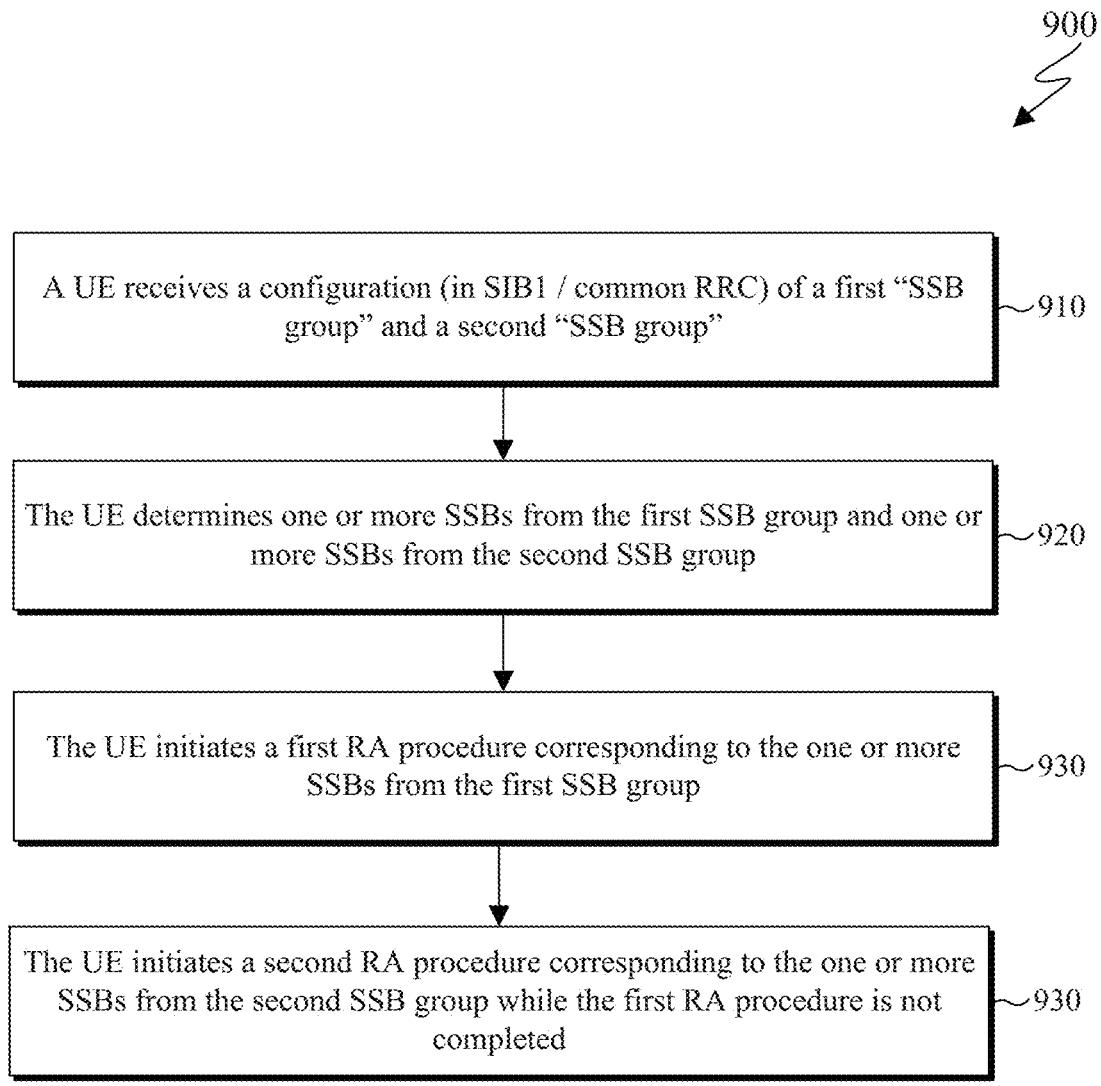
FIG. 9 illustrates an example method for two concurrent RA procedures on two TRPs captured as two synchronization signal (SS) physical broadcast channel block (PBCH) (SSB) groups according to embodiments of present disclosure.
Figure 10:
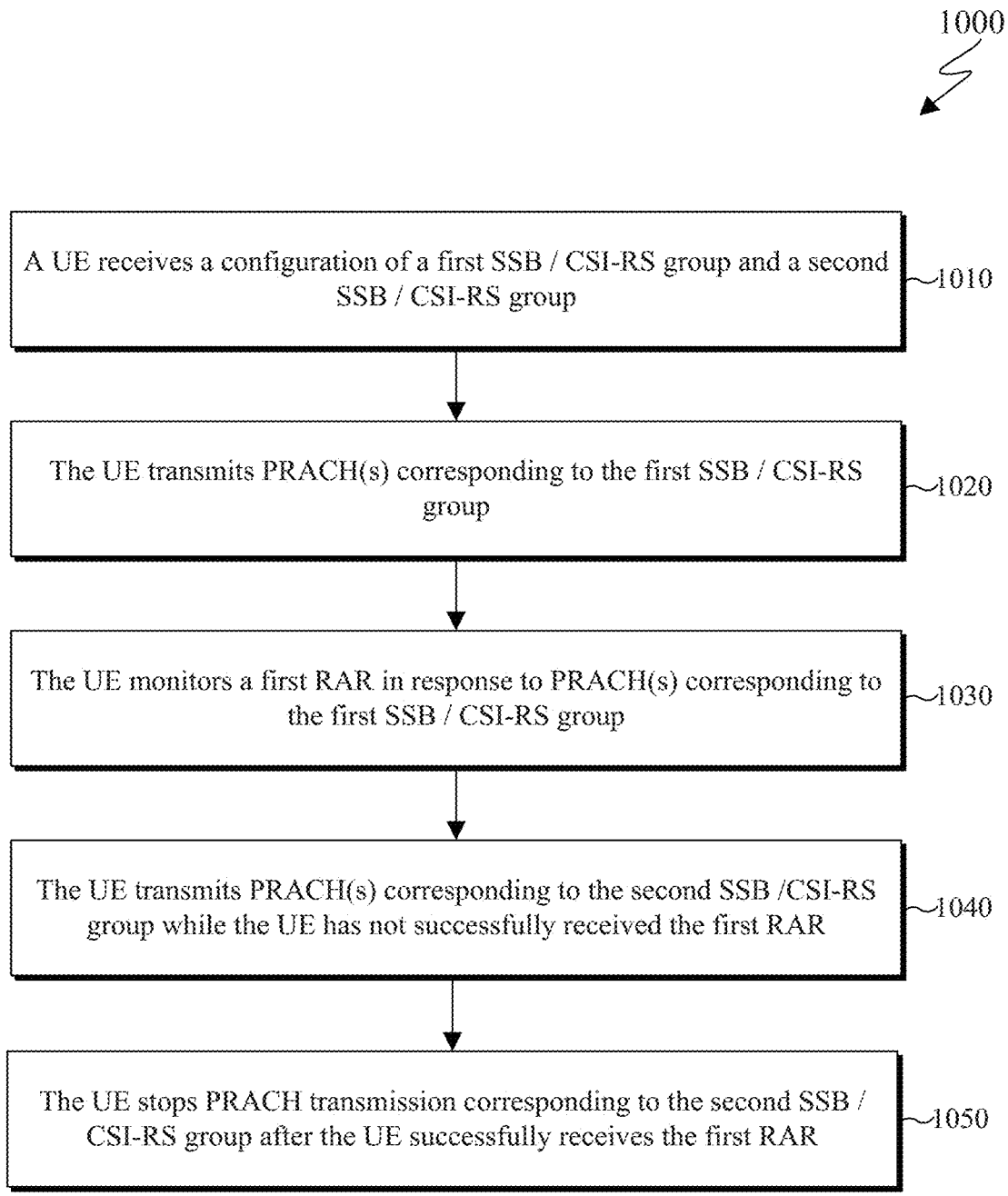
FIG. 10 illustrates an example method for multiple concurrent RA procedures for two TRPs with a "cut off" time at the random access response (RAR) reception according to embodiments of present disclosure.

FIG. 6 illustrates a diagram 600 of two concurrent random access (RA) procedures towards two TRPs according to embodiments of present disclosure. FIG. 7 illustrates an example method 700 for two concurrent random/initial procedures from a UE on two different cells according to embodiments of present disclosure. FIG. 8 illustrates an example method 800 for two concurrent RA procedures towards two TRPs according to embodiments of present disclosure. FIG. 9 illustrates an example method 900 for two concurrent RA procedures on two TRPs captured as two SSB groups according to embodiments of present disclosure. FIG. 10 illustrates an example method 1000 for multiple concurrent RA procedures for two TRPs with a "cut off" time at the RAR reception according to embodiments of present disclosure. The steps of the methods 700, 800, 900, and 1000 can be performed by any of the UEs 111-116 of FIG. 1, such as the UE 116 of FIG. 3. The methods 700, 800, 900, and 1000 are for illustration only and other embodiments can be used without departing from the scope of the present disclosure.

A UE (such as the UE 116) can perform two concurrent random access (RA) procedures towards to two TRPs or two cells. A first RA procedure is targeted at a first TRP/cell and a second RA procedure is targeted at a second TRP/cell, while the UE operates the two RA procedures concurrently.

The UE can associate the two concurrent RA procedures with two TRPs or cells based on an association of the TRPs/cell with reference signals or explicit/implicit identities for the two TRPs/cells. In one example, the UE may acquire different synchronization signals and physical broadcast channel (SS/PBCH) blocks and then obtain different SIBs/RRC configurations corresponding to the two different cells, for example associated with different PCIs or different PSS/SSS sequences. Accordingly, the UE can perform two RA procedures based on a PRACH configuration provided in a SIB for each cell.

In another example, a UE may acquire a same SSB corresponding to a same cell, such as with a same PCI and a same PSS/SSS sequences, but with different time or spatial SSB indices, such as in different slots or different spatial filters/beams There can be an association between the SSB indices and the TRPs of a cell. For example, a first TRP can be associated with a first set of SSB indices and a second TRP can be associated with a second TRP. For example, SSB indices {0,1,2,3} correspond to TRP #1 and SSB indices {4,5,6,7} correspond to TRP #2. Therefore, a number of "SSB groups" can be considered for a cell, where each "SSB group" corresponds to a different TRP. For example, when a UE determines a first SSB index from the first SSB group for a first RA procedure, the UE determines that the first RA procedures is associated with the first TRP, such as a first RPACH configuration associated with the first TRP. When a UE determines a second SSB index from the second SSB group for a second concurrent RA procedure, the UE determines that the second RA procedures is associated with the second TRP, such as a second RPACH configuration associated with the second TRP.

As used herein, an "SSB index" can be referred to as an "SSB" for brevity, and the intention can be determined based on reference to a single cell or different cells.

In yet another example, a UE (such as the UE 116) can associate two concurrent RA procedures with two TRPs of a cell using an association with other reference signals such as DL PRS or CSI-RS. For example, a first set or group of PRS/CSI-RS resource(s) or resource set(s) corresponds to a first TRP and a second set or group of PRS/CSI-RS resource(s) or resource set(s) corresponds to a second TRP. When a UE acquires a first PRS/CSI-RS resource from the first set or group of PRS/CSI-RS resource(s) or resource set(s), and the first PRS/CSI-RS is QCL with a first SSB index that the UE determines for a first RA procedure, the UE determines that the first RA procedure is associated with the first TRP, such as a first RPACH configuration associated with the first TRP. When a UE acquires a second PRS/CSI-RS resource from the second set or group of PRS/CSI-RS resource(s) or resource set(s), and the second PRS/CSI-RS is QCL with a second SSB index that the UE determines for a second RA procedure, the UE determines that the second RA procedure is associated with the second TRP, such as a second RPACH configuration associated with the second TRP. In one example, a PRS/CSI-RS resource(s) or resource set(s) can be configured and transmitted in a cell-specific or TRP-specific manner or can be UE-specific.

In various embodiments of the present disclosure, TRPs are linked to or identified by mapping to SSB groups or CSI-RS groups or PRS groups, and the like. For simplicity, it is considered that a TRP is mapped to a single SSB group/CSI-RS group/PRS group. However, more general mapping for TRPs is possible. In one example, a TRP is mapped to multiple SSB/CSI-RS/PRS groups. In another example, a SSB/CSI-RS/PRS group is mapped to multiple TRPs. Such mapping may or may not be known to the UE. Regardless, the UE can operate based on the configurations provided for SSB/CSI-RS/PRS groups, and further handling among TRPs can be based on gNB implementation.

In one example, a UE can perform two concurrent RA procedures prior to RRC connection towards two different cells, referred to as a dual/double initial access procedure.

UE higher layers such as L2/L3, or gNB signaling such as a PDCCH order, can initiate two concurrent RA procedures. In one example, a first RA procedure can be initiated by UE higher layer such as L2/L3 and a second RA procedure can be concurrently initiated by gNB signaling such as a PDCCH order. The two concurrent RA procedures can be associated with a single PRACH trigger or can be associated with different PRACH triggers. The two concurrent RA procedures can be associated with a same (serving) cell or different (serving) cells. In one realization, there can be two RA procedures ongoing at any point in time in a MAC entity or a cell group. In another realization, there can be two RA procedures ongoing at any point in time in a single (serving) cell, such as a single (serving) cell of the MAC entity. In one example, the UE can be in the RRC_CONNECTED state. In another example, the UE can have two concurrent RA procedures that occur before RRC connection.

A first RA procedure and a second RA procedure from a UE are concurrent when the UE can start the second RA procedure before the UE completes the first RA procedure. In one approach, when a new RA procedure is triggered while another RA procedure is ongoing in the MAC entity of a UE, the UE can continue with the ongoing procedure and also start the new RA procedure. In addition, a single random access trigger can initiate two concurrent RA procedures. In one example, when a third RA procedure is triggered while two concurrent RA procedures are ongoing in the MAC entity of a UE, it is up to UE implementation whether to continue with the two ongoing RA procedures or to stop one of the two ongoing RA procedures and start the third RA procedure (for example, for SI request).

It is noted that the term "complete" (or variations thereof, such as "completed" or "completion" and the like) for a RA procedure can be used to refer to a RA that is successfully or unsuccessfully completed/ended and is not ongoing anymore.

In one realization, a UE can alternate between two sets of PRACH transmission attempts, along with corresponding power ramp-up. The PRACH transmissions corresponding to the two sets/two RA procedures can be time-multiplexed, such as in different RACH occasions (ROs) or in different slots, or some or all of the PRACH transmissions can be overlapping in time, such as in same ROs.

One motivation to support two concurrent RA procedures from a UE is to increase a connection probability, reduce an initial access time, and enhance a PRACH reliability or coverage for the UE. Another motivation can be to receive TRP-specific information, such as timing advance (TA), system information, or higher layer configuration, such as RRC configuration. The operation of two concurrent RA procedures can apply in all frequency bands and can be particularly useful for higher frequency bands where coverage or beam/link failure is more likely.

When a UE (such as the UE 116) performs two concurrent RA procedures towards two TRPs, the latency and reliability of the two RA procedures including PRACH transmission(s) and following random access messages can be different. For example, contention levels among the two TRPs can be different due to different number of UEs that are accessing a TRP at each point or period of time or depending on the deployment of TRPs in different geographical places, such as a TRP deployed in an area with a typically higher or lower UE density.

In addition, different TRPs can experience different UL interference. For example, a TRP located closer to a cell-center experiences lower interference than a TRP located closer to the cell-edge.

Furthermore, a UE can experience different link or signal quality of two SSBs or two SSB indices corresponding to two TRPs. For example, a UE can be closer to a first TRP and detect a first SSB or CSI-RS with higher RSRP than a second SSB or CSI-RS from a second TRP.

By attempting two concurrent RA procedures, the UE can leverage TRP-based diversity and stay or move within the coverage area of at least one TRP or possibly both TRPs.

In one realization of the embodiment, a UE with two antenna panels can perform two concurrent RA procedures towards two TRPs, wherein each panel is performing one of the two RA procedures targeted to one of the two TRPs. In one example, an association between panels and TRPs is fixed, in that a first UE panel initiates, continues, and completes a first RA procedure towards a first TRP, while a second UE panel initiates, continues, and completes a second RA procedure towards a second TRP. According to this example, all UL transmissions such as Msg1/A PRACH preamble transmission(s), including any PRACH re-attempts, as well as Msg3/MsgA PUSCH transmission(s) and all repetitions and retransmissions thereof, are from a same UE Tx panel. In another example, when a panel is both a Tx/Rx panel, the UE additionally performs all receptions such as Msg2/MsgB/RAR receptions and Msg4 receptions, and all repetitions and retransmissions thereof, by the same UE panel.

In one example, for repetition of PRACH transmissions, the UE can be provided with an RO bundle by higher layers such as by system information or by dedicated configuration, wherein an RO bundle refers to a set/collection of multiple ROs that are jointly used for a PRACH transmission. For example, the UE transmits a same PRACH preamble format with multiple repetitions (using same or different UE-Tx beam(s)) in the set/collection of multiple ROs that belong to an RO bundle. The RO bundle can include multiple consecutive or non-consecutive valid ROs, wherein the UE determines a valid RO based on higher layer configuration, such as TDD DL/UL configuration, or SSB/CSI-RS configuration, and so on. The RO bundle can be associated with one or multiple DL/UL reference signals, such as one or multiple SSB(s), CSI-RS(s), or SRS(s), wherein the association can be based on a predetermined or higher layer configured mapping, based on a cycle or sequence/ordering of DL/UL reference signals.

In another example, an association between panels and TRPs can change in that a first UE panel may initiate a first RA procedure with a first PRACH transmission towards a first TRP and the UE may use a second UE panel to transmit a subsequent PRACH or a Msg3/MsgA PUSCH corresponding to the first RA procedure targeted to the first TRP. Similar considerations can apply for changing Rx panels for Msg2/4/B reception corresponding to the first RA procedure towards the second TRP. A (re-)selection or change of a Tx/Rx panel for different steps of a RA procedure can be enabled by network indication or by UE implementation.

In yet another example, an association between UE panel with gNB TRPs can have various forms. For example, one panel can be associated with one TRP. In another example, one panel can be associated with multiple TRPs. In yet another example, multiple panels can be associated with one TRP. Such linkages can be fixed or can change over time based on UE determination or gNB indication.

A usage of two concurrent RA procedures towards two TRPs/cells can be beneficial in various scenarios, such as due to different link/SSB quality towards two TRPs, different detection times for SSBs/RSs corresponding to two TRPs, or different levels of MPE at the UE when operating with the two TRPs. FIG. 6 shows example scenarios when two concurrent RA procedures towards two TRPs can be beneficial.

In one example, a UE (such as the UE 116) detects a first SSB or CSI-RS corresponding to a first TRP with sufficient quality, such as with a corresponding RSRP above a first threshold, and transmits a first PRACH associated with the first SSB or CSI-RS towards the first TRP. The UE also detects a second SSB or CSI-RS corresponding to a second TRP with sufficient quality, such as a corresponding RSRP above the first threshold or above a second threshold that can be, for example, larger than the first threshold by a higher layer signaled value such as in a SIB or RRC, and transmits a second PRACH associated with the second SSB or CSI-RS towards the second TRP. The UE two SSBs or CSI-RSs may detect the two SSBs or CSI-RSs concurrently or in different times. For example, the UE may detect the first SSB in a first SSB periodicity and the second SSB in a second SSB periodicity.

In another example, a UE (such as the UE 116) detects a first SSB or CSI-RS corresponding to a first TRP with sufficient quality, such as with a corresponding RSRP value above a first threshold or above a second threshold, wherein the second threshold is larger than the first threshold, and transmits a first PRACH associated with the first SSB or CSI-RS towards the first TRP. However, the UE cannot transmit the first PRACH with large power because the UE needs to set a smaller output power, for example due to an associated MPE, and apply a higher power management maximum power reduction (P-MPR) or a lower EIRP in the direction targeting the first TRP. Conversely, the UE detects a second SSB or CSI-RS corresponding to a second TRP with sufficient quality, such as with a corresponding RSRP value above the first threshold, and transmits a second PRACH associated with the second SSB or CSI-RS towards the second TRP. The UE can transmit the second PRACH with large power since the UE can set a larger output power, for example due to having no/little MPE, and apply zero/small P-MPR levels or higher EIRP in the direction targeting the second TRP. According to this example, EIRP can refer to a peak/average/maximum/minimum EIRP for the UE or UE panel in a certain angle or direction. The spatial angle or direction for a transmission can be associated with a corresponding spatial filter or with a TCI state of a DL RS, such as a SSB or a CSI-RS, that is associated with the PRACH transmission.

For example, one way to mitigate MPE can be to use a lower duty cycle. For example, when PRACH is a burst transmission, especially for PRACH formats that use a fraction of a slot, there can be various requirements to reduce (or not reduce) a PRACH transmission power.

In the previous examples, the UE determines that the first SSB or CSI-RS is associated with a first TRP and that the second SSB or CSI-RS is associated with a second TRP based on a different sequence for the SSBs or CSI-RS s (for the two cell case) or based on a mapping provided by higher layer configuration as was previously discussed in this disclosure. In addition, the two TRPs can correspond to a same cell (e.g., with same PCI/GO), or correspond to two different cells (e.g., with different PCIs/GCIs). Therefore, the first and second SSBs may correspond to two different SSB indices of a same cell or may correspond to two different SSBs of two different cells. In the former case, the two SSBs can have different periodicity values. Furthermore, the first/second CSI-RS can be periodic or semi-persistent. In one realization, the UE can have two Tx panels, wherein the first PRACH is transmitted by a first UE panel and the second PRACH is transmitted by a second UE panel. In such cases, $P_{CMAX,g,f,c}(i)$ can be a UE configured maximum output power for carrier f of serving cell c within transmission occasion i when using one or more antenna ports from a panel or antenna port group g, for example with g=0,1.

It is noted that when referring to "MPE" the intention is to address events when an uplink transmission from a UE or a UE panel with a target power level would violate regulatory requirements related to radiation absorption or exposure such as SAR or MPE, and the UE or UE panel therefore needs to back-off from the target power level, for example by setting a non-zero or large value for P-MPR, and use a smaller output power such as a smaller $P_{CMAX,f,c}(i)$ or smaller $P_{CMAX,g,f,c}(i)$ for each panel/antenna port group g, for g=0, 1, 2, . . . , N−1, where N is the number of UE transmitter panels. In one example, an MPE event refers to a case wherein a determined/target transmission power, such as for PRACH, would exceed $P_{CMAX,f,c}(i)$ or $P_{CMAX,g,f,c}(i)$, where applicable, so that the 'actual'/allowed transmission power is limited by $P_{CMAX,f,c}(i)$ or $P_{CMAX,g,f,c}(i)$, and in turn, by power back-off terms such as P-MPR or by antenna array gain such as a corresponding EIRP.

For a UE performing two concurrent RA procedures, the UE initiates a first random access (RA) procedure and initiates a second RA procedure while the first RA procedure is not completed. In one example, the first RA procedure or the second RA procedure are initiated by UE MAC entity or RRC. In another example, the first or the second RA procedure are initiated by a single or two PDCCH order(s). The first and second RA procedures are in a same MAC entity. In one example, the UE initiates the first RA procedure in a MAC entity and the second RA procedure in the MAC entity before the first RA procedure is completed. Conversely, conventional operation supports only one ongoing RA process at any point in time in a MAC entity (associated with a cell group such as MCG or SCG).

In one realization, two concurrent RA procedures can be on two different cells. A UE initiates a first RA procedure on a first cell. The UE initiates a second RA procedure on a second cell while the first RA procedure is not completed. The second cell can be different from the first cell. In one example, the first cell and the second cell can be serving cell(s), such as when the UE is in RRC_CONNECTED state. In one example, the first cell and the second cell correspond to a same cell group such as MCG or SCG (or source MCG or source SCG in DAPS handover). For example, for a UE in RRC_CONNECTED state, the RA procedures can be for UL timing synchronization, SI request, SR, BFR. For example, a UE can use two concurrent RA procedures to obtain corresponding two TA values for two cells or TRPs. In another realization, the UE may attempt two concurrent initial access procedures to establish RRC connection to two different cells. In another realization, the UE initiates two concurrent RA procedures for reception of the common control channel (CCCH) logical channel corresponding to two different cells such as when the trigger is for initial access to establish RRC connection, or for connection resume by transitioning from RRC_INACTIVE state to RRC_CONNECTED state, or for connection re-establishment upon radio link failure (RLF), or possibly for reconfiguration with synch such as handover, towards two cells. For example, the UE can be transitioning from RRC_IDLE to RRC_CONNECTED for a first cell and also transitioning from RRC_INACTIVE to RRC_CONNECTED for a second cell.

As shown in FIG. 7, the method 700 describes two concurrent random/initial access procedures from a UE on two different cells. In step 710, a UE (such as the UE 116) performs a first random access (RA)/initial access (IA) procedure on a first cell. In step 720, UE initiates/performs a second RA/IA procedure on a second cell while the first RA/IA procedure is not completed. The second cell can be different from the first cell. An IA procedure can include, for example, one or more of: SSB reception from corresponding cells, acquisition of time and frequency synchronization, reception and detection of PBCH/MIB, reception and detection of SIB1, performing RA procedure, and successfully establishing RRC connection. For example, the UE establishes RRC connection with two cells so that the UE can have two PCells. In another example, two concurrent IA procedures can correspond to two TRPs within a same cell and have TRP-specific configuration (such as those described in E-2 and E-4-1, below), so the UE can have two "primary TRPs" in a PCell. Such operation can be considered as a UE-initiated acquisition of multiple PCells or SCells and is contrary to existing framework in which addition of serving cells beyond a single PCell is based on network configuration such as by dedicated RRC signaling or network indication such as by a MAC-CE command or a DCI format.

The UE can perform the two concurrent IA procedures independently without any interaction between the two procedures, or jointly so that the two IA procedures can interact with each other or provide assistance information for each other. In one example, the two-cell IA procedures (or two-TRP IA procedures) need not be concurrent and can occur sequentially without overlapping in time. In one realization, the first IA procedure can provide assistance to the second IA procedure, such as an adjustment relative to a power the UE determines for PRACH transmission to the second cell for example by applying a latest value of a power ramping counter of the first IA procedure. In another example, the UE can use a time or frequency synchronization, or a TA value determined in a first IA procedure towards a first cell/TRP to determine a time or frequency synchronization or a TA value determined for a second IA procedure towards a second cell/TRP. In yet another example, the UE can use a first system information such as a first RA configuration received in the first IA procedure towards a first cell/TRP to determine (parts of) a second system information such as a second RA configuration received in a second IA procedure towards a second cell/TRP.

Above description also applies to RA procedures to two TRPs/cells, including before or after RRC connection. In one example, the second IA/RA procedure can continue even after the first IA/RA procedure is completed.

As shown in FIG. 8, the method 800 describes two concurrent RA procedures towards two TRP. In step 810, a UE (such as the UE 116) determines a first TRP and a second TRP. For example, the UE receives configurations corresponding to a first TRP and a second TRP. The configurations can be provided by higher layers, such as by SIB1 or common/cell-specific RRC configuration. In one example, the UE detects or select a first RS such as a first SSB corresponding to the first TRP, and a second RS such as a second SSB corresponding to the second TRP.

In step 820, the UE initiates a first RA procedure corresponding to the first TRP. For example, the first RA procedure can be based on a configuration for the first TRP.

In step 830, the UE initiates a second RA procedure corresponding to the second TRP while the first RA procedure is not completed. The second RA procedure can be based on a configuration for the second TRP. In one example, the first and second TRPs correspond to a same cell. In another example, the first and second TRPs correspond to two different cells.

FIG. 9 illustrates the method 900 describing a flowchart for two concurrent RA procedures on two TRPs captured as two "SSB groups". In step 910, a UE (such as the UE 116) receives a configuration (such as higher layer configuration in SIB1 or common RRC) of a first "SSB group" and a second "SSB group." For example, "SSB group(s)" can be a new information element (IE) in SIB1 or common RRC configuration under "non-critical extensions" that is read and interpreted only by capable UEs and are discarded by other UEs. In another example, SSB groups can be provided by a new other system information (OSI) that is broadcasted or transmitted on demand or provided by dedicated RRC configuration.

In step 920, the UE determines one or more SSBs from the first SSB group and one or more SSBs from the second SSB group. Herein, determining SSB(s) refers to SSB detection during initial access, or SSB selection for CBRA after RRC connection.

In step 930, the UE initiates a first RA procedure corresponding to the one or more SSBs from the first SSB group. In step 940, the UE initiates a second RA procedure corresponding to the one or more SSBs from the second SSB group while the first RA procedure is not completed.

In one example, the above flowchart can apply to the case of "CSI-RS groups", so the UE determines first and second CSI-RS resources corresponding to the first and second CSI-RS groups, wherein a CSI-RS resource can be a non-zero power (NZP) CSI-RS resource configured to the UE in a cell-specific or TRP-specific or UE-specific manner In another example, CSI-RS groups can be used along with SSBs associated with PRACH, based on QCL assumption between one or more CSI-RS resource in a CSI-RS group with an SSB configured for RA/PRACH.

In one example, two RA procedures can be associated with a single trigger and a UE initiates the two RA procedures for the single trigger. This can be applicable, for example, when RA procedures are initiated for the common control channel (CCCH) logical channel such as when the trigger is for initial access to establish RRC connection, or for connection resume by transitioning from RRC_INACTIVE state to RRC_CONNECTED state, or for connection re-establishment upon radio link failure (RLF), or possibly for reconfiguration with synch such as handover. In another example, the two concurrent RA procedures can be associated with two corresponding triggers (in a same cell or in two different cells). This can be applicable, for example, for a UE in the RRC_CONNECTED state, such as when PRACH triggers are for uplink timing synchronization, on-demand system information (SI) request, scheduling request (SR) issue or failure, BFR, or LBT failure. For example, two concurrent RA procedures can provide the UE with two TRP-specific TA values.

In one realization, a UE can "merge" two RA procedures into a single RA procedure when the two triggers are not associated with dedicated RA configuration, such as a dedicated PRACH preamble or RO or associated SSB or CSI-RS, and the UE needs to perform contention-based random access (CBRA) for both RA triggers. In one example, when the UE has already initiated a first RA procedure for a first such trigger and the UE receives a second such trigger while the first RA procedure is not completed, the UE can discard the second trigger. In another example, the UE can initiate a second RA procedure for the second trigger. In yet another example, a RA procedure trigger with CFRA configuration cannot be operated concurrently with any other RA procedure. In yet another example, a RA procedure trigger with CFRA configuration can operate concurrently with another CFRA procedure or with a CBRA procedure.

Support for two concurrent RA procedures can be defined as optional (with capability signaling) for a UE. In one example, such support can be limited to UEs with certain UE capability, such as based on a number of UE RF chains or a number of antenna panels, antenna arrays, or antenna sub-arrays, or number of PAs, or baseband processing capabilities or timelines, and the like. In one example, such support can be limited to UEs with two or multiple transmitter panels. In another example, such support can also apply to UEs with a single transmitter panel. In the specification text proposals provided throughout the present disclosure, the term "a UE with capability [2P-PRACHs]" is used as an example terminology to refer to UEs that support multiple concurrent RA procedures—this term is merely used for fast reference purposes and any other term with same intention may be used instead. In one example, a UE can report such capability to the network, or it may be transparent to the network. In one example, if a UE reports such capability to the network, the network can transmit corresponding configurations to the UE or set of UEs with such capabilities and the specification can refer to such UE(s) as one(s) that have received the corresponding configuration. In one example, the corresponding UE capability can be related to having two or more (non-collocated) antenna panels (with sufficient spatial separation) or can be related to a (maximum) number of supported antenna ports or antenna port groups or MIMO layers or SRS resource sets, and so on. In one example, such as before RRC configuration or establishing dedicated signaling, there is no need for reporting the corresponding UE capability, and a UE that possesses such capability (such as per certification testing) can select to perform two concurrent RA procedures.

In certain embodiments, the RA procedure is initiated by a PDCCH order, by the MAC entity itself, or by RRC for the events in accordance with TS 38.300. There can be one Random Access procedure ongoing at any point in time in a MAC entity for a UE without capability [2P-PRACHs]. For a UE with a capability [2P-PRACHs], there can be up to two Random Access procedures ongoing at any point in time in a MAC entity, wherein the two procedures can be associated with a same (serving) cell or two different (serving) cells of the MAC entity. The Random Access procedure on an SCell shall only be initiated by a PDCCH order with ra-PreambleIndex different from 0b000000.

In one example, higher layer configuration such as SIB1 (extension) or RRC can provide a value N for a maximum number of concurrent RA procedures by a (capable) UE per cell or per MAC entity or per UE. In one example, N equals 2. In another example, N can be greater than 2. In one example, system specification may provide a fix value for N, such as N=2 or N=4. In one example, network signaling such as higher layer signaling or L1/L2 signaling can provide limits on number of RA procedure, for example, out of a maximum 4 RA procedure by a UE, up to 2 or 3 RA procedures can be on a first cell and up to 2 or 1 RA procedure(s) can be on a second cell, respectively.

Prior to initiation of a RA procedure in the physical-layer, that is, before a first PRACH transmission attempt, a UE measures and reports to higher layers (or possibly to the gNB) a signal quality such as a RSRP that corresponds to reference signals associated with the first PRACH transmission, such as a SSB or CSI-RS, or possibly UL RS such as an SRS. In one example, a UE with two concurrent RA procedures measures and reports two sets of RSRP values, such as two sets of SSB RSRP values or CSI-RS RSRP values, with each set of RSRP values corresponding to one TRP. For example, when each TRP is associated with a SSB group, the UE can provide a set of SSB RSRP values for each SSB group. In another example, the UE can provide a set of CSI-RS RSRP values for each set of CSI-RS resources, associated with PRACH transmission, wherein each CSI-RS in the set is QCL with at least one SSB in the SSB group. In another example, when each TRP is associated with a set of PRS resources, the UE can provide two sets of SSB RSRP values or CSI-RS RSRP values, wherein each set of SSB RSRP values or CSI-RS RSRP values corresponds to a set of PRS resources, and the UE determines the set of PRS resources such that at least one PRS resource from the set of PRS resources is QCL with at least one SSB or CSI-RS in the set of SSB resources or the set of CSI-RS resources associated with the PRACH. In one example, the UE provides the two sets of RSRP values with a predetermined order, such as starting from a first SSB group and proceeding until an N-th SSB group, wherein a value for the number N of SSB groups is provided by higher layers. In another example, the UE may provide RSRP values only for a subset of TRPs and then the UE also provides an indication for the TRP ID or SSB group index. This can be applicable, for example, when the UE can detect RS corresponding to PRACH associated with some, but not all, TRPs of a cell.

In one example, if the UE is equipped with multiple panels, the UE may provide multiple sets of RSRP values for each TRP, wherein each set of RSRP values corresponds to RSRP measurements from a different UE panel of the SSBs or CSI-RS resources associated with the TRP. For example, a two-panel UE can provide two sets of SSB RSRP measurements associated with a first SSB group or a first PRS resource set, and another two sets of SSB RSRP measurements associated with a second SSB group or a second PRS resource set. In one example, the UE additionally provides an indication of RSs, such as SSB index or CRI, for which an RSRP value is provided.

In certain embodiments, prior to initiation of the physical random access procedure, Layer 1 receives from higher layers a set of SS/PBCH block indexes and provides to higher layers a corresponding set of RSRP measurements. For a UE with a capability [2-PRACHs] that is provided with a higher layer configuration for two/multiple "SSB groups", Layer 1 provides to higher layers two/multiple corresponding sets of RSRP measurements, each set corresponding to one SSB group.

In other embodiments, prior to initiation of the physical random access procedure, Layer 1 receives from higher layers a set of SS/PBCH block indexes and provides to higher layers a corresponding set of RSRP measurements. For a UE with a capability [2-PRACHs] that is provided with a higher layer configuration for two/multiple "CSI-RS groups", Layer 1 provides to higher layers two/multiple corresponding sets of RSRP measurements, each set corresponding to one CSI-RS group [based on QCL assumption between CSI-RS resource(s) in the CSI-RS resource groups and the SS/PBCH block indexes].

In one example, if a UE is equipped with two antenna panels or "antenna port groups" and is provided with a higher layer configuration for two/multiple "SSB groups" or "CSI-RS groups", the UE can provide to higher layers two/multiple sets of RSRP measurements, each set corresponding to a combination or linkage of a UE panels/antenna port groups with a TRP/SSB group/CSI-RS group, or other variations thereof. In one example, RSRP measurements can correspond to those for SSB indexes or CSI-RS resource indexes provided by higher layers.

According to this embodiment, there can be a number of RS types associated with two concurrent RA procedures. In one realization, two concurrent RA procedures are associated with different DL RSs, such as two different SSBs or two different CSI-RSs. In one example, a first RA procedure is associated with an SSB, while a second RA procedure is associated with a CSI-RS, wherein the CSI-RS is not quasi-co-located "QCL" (Type-D) with the SSB. In another example, the CSI-RS associated with the second RA procedure can be QCL with the SSB associated with the first RA procedure. In another example, the two different DL RSs can correspond to a same TRP or two different TRPs, or a same cell or two different cells.

Each of the multiple RA procedures can be configured or indicated to operate with repetitions, such as PRACH repetitions, or PDCCH or corresponding RAR/MsgB PDSCH reception with repetitions, Msg3/MsgA PUSCH transmission with repetitions, or PDCCH or corresponding Msg4 PDSCH reception with repetitions. The repetitions can be with or without UE Tx beam cycling per number of repetitions such as half the total number of repetitions, or DL RS cycling or precoder cycling, and the like. For example, a SIB can indicate a link between a number of repetitions, for one or more of the above channels, and corresponding RSRP ranges, and the UE can determine the associated number of repetitions based on a RSRP range to which a RSRP that the UE measures belongs. Such cycling among multiple beams or RSs or precoders can be in an alternative manner or sequential/consecutive manner. For example, the UE performs one transmission or repetition associated with a first beam/RS/precoder, then one transmission or repetition associated with a second beam/RS/precoder, then another transmission or repetition associated with the first beam/RS/precoder, and then another transmission or repetition associated with the second beam/RS/precoder, and the like. In another example, the UE can perform all of a first number of transmissions or repetitions for a first beam/RS/precoder before performing all of a second number of transmissions or repetitions for a second beam/RS/precoder. In one example, there can be a spatial filter/beam/RS switching delay time when a UE needs to transmit a second/subsequent transmission or reception or repetition (such as for PRACH transmission or for RAR reception) with a different spatial filter/beam/RS than for a first/previous transmission or reception or repetition. In one example, such delay is considered in the configuration of ROs or RAR monitoring window. In another example, the UE is allowed to extend the RAR PDCCH monitoring window to compensate for guard period(s) such as for RS/beam switching.

In certain embodiments, a UE performs two sequential RA procedures, wherein the two RA procedures can have no overlap in time and be related such that the earlier RA procedure provides information or assistance for the later RA procedure. For example, such two sequential RA procedures can be beneficial for establishing and maintaining two respective links. This feature can be based on a UE capability. In one variation, a first RA procedure can contain information for a second RA procedure, such as a CERA preamble or a power ramping value. In a second variant, a first RA procedure is in licensed/non-shared spectrum, a second RA procedure is in unlicensed/shared spectrum, wherein the first RA procedure provides information, such as listen-before-talk "LBT", for a second RA procedure. Various embodiments provided in the present disclosure for two concurrent RA procedures may be applied to two sequential RA procedures, possibly with applicable modifications.

In certain embodiment, a UE (such as the UE 116) determines whether to perform a single RA procedure towards one TRP or two RA procedures towards two TRPs based on one or more condition(s). For example, for a UE reporting a capability for two concurrent RA procedures, when higher layers such as a SIB1 extension or a new SIB provides a configuration for two TRPs or SSB groups or corresponding RA procedures, the UE can determine to initiate and perform two concurrent RA procedures based on an absolute or a relative RSRP condition, an absolute or a relative MPE/P-MPR condition, an absolute or a relative EIRP/Pcmax condition, and the like.

For example, when a UE determines an SSB from a first SSB group with an SSB RSRP above a threshold, and an SSB from a second SSB group with an RSRP above the threshold, the UE can perform two concurrent RA procedures towards corresponding first and second TRPs. Herein, the threshold can be provided by higher layers. In another example, the UE can perform two concurrent RA procedures when a relative RSRP, such as a difference of the first SSB RSRP and second SSB RSRP, is not smaller than a second threshold, wherein the second threshold can be provided by higher layers.

In another example, a UE can perform two concurrent RA procedures when the UE determines that a first Pcmax (or EIRP or total radiated power "TRP") corresponding to a PRACH transmission for a first RA procedure is smaller than a third threshold, and a second Pcmax (or EIRP or total radiated power "TRP") corresponding to a PRACH transmission for a second RA procedure is larger than the third threshold. In one example, the UE can perform two concurrent RA procedures when a relative Pcmax (or EIRP or total radiated power "TRP"), such as a difference of corresponding values for the first RA procedure and the second RA procedure, is larger than a fourth threshold. In one example, similar conditions can be considered for absolute or relative P-MPR values for the first and second RA procedures.

In yet another example, a UE (such as the EU 116) combines two or more conditions to determine whether or not to perform two concurrent RA procedures. For example, the UE determines to perform two RA procedures when: (i) a first SSB RSRP corresponding to a first SSB group is larger than a first threshold, and a first Pcmax corresponding to a PRACH transmission associated with the first SSB group is smaller than a second threshold; (ii) a second SSB RSRP corresponding to a second SSB group is larger than the first threshold (or a second threshold), and a second Pcmax corresponding to a PRACH transmission associated with the second SSB group is greater than the second threshold; and (iii) a difference of the first SSB RSRP with respect to the second SSB RSRP is larger than a third threshold.

In one example, a higher layer configuration may restrict two concurrent RA procedure to a subset of RA triggers so that any remaining RA triggers can only use a single RA procedure or cannot have a concurrent RA procedure.

In one example, a UE performs two concurrent RA procedures if a sum power for any overlapping uplink transmissions, such as Msg1/MsgA PRACH or Msg3/MsgA PUSCH, corresponding to the two concurrent RA procedure does not exceed a threshold.

In one realization, a UE can initiate two concurrent RA procedures at a same time or at different times regardless of whether or not the two RA procedures correspond to same/different cell(s) or same/different trigger(s). In another realization, two concurrent RA procedures can be in different stages where, for example, a first RA procedure is in the stage of Msg3 PUSCH transmission or Msg4 PDSCH reception, while a second RA procedure is in the stage of PRACH transmission or PDSCH RAR reception. In yet another realization, a specification of the system operation can introduce restrictions on an absolute time, or on a RA procedure stage, that the two concurrent RA procedures can differ. For example, a UE may not start a second RA procedure X milliseconds, such as X=100, after a first RA procedure.

In one realization, a UE can start a second concurrent RA procedure corresponding to a second TRP at any time until the UE successfully receives a RAR for a first RA procedure corresponding to a first TRP. For example, the UE can continue two concurrent RA procedures corresponding to two TRPs until the UE successfully receives a RAR associated with one of the two RA procedures from one of the two TRPs and then the UE can stop the other RA procedure. For example, a two-panel UE alternates between two sets of numbers of PRACH transmissions to the two TRPs, along with corresponding power ramp-up, until the UE receives a RAR from (at least) one of the two TRPs. For example, if the UE has already received a RAR for a first RA procedure corresponding to a first TRP, the UE cannot initiate a second concurrent RA procedure corresponding to a second TRP, and the UE needs to wait until the first RA procedure is completed. The benefit of such restrictions for "cut-off time of concurrency" is to avoid any extra handling of contention resolution in Msg3 or Msg4 when operating with two concurrent RA procedures, such as those discussed in E-4, E-4-2, E-4-3, below.

Herein, a successful reception of RAR includes, for example, reception of a PDCCH that contains a (valid) downlink assignment, such as a DCI format 1_0, that schedules a PDSCH providing a RAR, and successful reception of a transport block (TB) in the PDSCH, wherein the TB contains the RA preamble identity (RAPID) of the transmitted PRACH(s) and, when applicable, a RAR UL grant that schedules a Msg3 PUSCH transmission.

In another realization, even after successfully receiving a first RAR for a first RA procedure for a first TRP, a UE can continue with reception of a second RAR for a second RA procedure for a second TRP, for example in order for the UE to acquire different TRP-specific TA values or to determine different TRP-specific spatial filters/beams corresponding to the two RA procedures. The UE can discard any remaining steps of an RA procedure, such as Msg3 transmission or Msg4 reception, so that the UE transmits only one Msg3 PUSCH and monitors PDCCH/receives PDSCH for one Msg4 between the two concurrent RA procedures. For example, that can be applicable when the UE establishes initial access with two TRPs of a same cell and the UE behavior to stop the remaining steps of a RA procedure after correctly receiving a RAR message for a second RA procedure can be indicated in a SIB. In another example, the UE can continue with both RA procedures, transmit two Msg3 PUSCHs and monitor PDCCH for scheduling two corresponding Msg4 PDSCHs for the two respective RA procedures. For example, a UE can continue with a second RA procedure after a successful completion of a first RA procedure when the first and second RA procedures correspond to a same cell or a same trigger.

FIG. 10 illustrates the method 1000 describing a flowchart for multiple concurrent RA procedures for two TRPs with a "cut-off" time at the RAR reception so that the UE stops a RA procedure after the UE successfully receives a RAR for the other RA procedure.

In step 1010, a UE (such as the UE 116) receives a configuration of a first SSB/CSI-RS group and of a second SSB/CSI-RS group. For example, the configuration can be provided by higher layers, such as a SIB1 extension, or a new SIB, or common RRC configuration. In one example, TRP association can be provided using other methods such as PRS resource sets.

In step 1020, the UE transmits one or more PRACH(s) corresponding to the first SSB/CSI-RS group. The one or more PRACH(s) correspond to one or multiple SSBs from (or one or multiple CSI-RS s QCL with) the first SSB/CSI-RS group. In case of more than one PRACH transmission, corresponding power ramping can apply for each additional re-attempt.

In step 1030, the UE monitors PDCCH for a first PDSCH RAR reception in response to PRACH(s) corresponding to the first SSB/CSI-RS group. For example, the UE monitors PDCCH for scheduling a first RAR PDCCH within a first time window starting (a number of symbols) after each of the one or more PRACH(s) corresponding to the first SSB/CSI-RS group.

In step 1040, the UE transmits PRACH(s) corresponding to the second SSB/CSI-RS group while the UE has not successfully received the first RAR. In step 1050, the UE stops PRACH transmission corresponding to the second SSB/CSI-RS group after the UE successfully receives the first RAR.

It is noted that the method 1000 of FIG. 10, each of the PRACH transmission(s) or RAR reception(s) can be with or without repetitions. A RAR monitoring window with a configured or predetermined length exists between two consecutive PRACH transmissions of a RA procedure. In one example, a length of a monitoring window for the first RAR reception can be same or different from a length of a monitoring window for the second RAR reception. In one example, the order of RAR reception can be independent from the order of RA initiation or PRACH transmission. For example, a UE can start a first RA procedure or corresponding first PRACH transmission(s) to a first TRP earlier than a second RA procedure or corresponding second PRACH transmission(s) to a second TRP and the UE may receive a RAR for the second RA procedure earlier than a RAR for the first RA procedure. This can be because, for example, the second TRP is less congested by PRACH transmissions than the first TRP and detects earlier the second PRACH transmission than the first TRP detects the first PRACH transmission to the first TRP.

In one realization, a UE receives a configuration (in SIB1 extension or common RRC configuration) of a first "SSB group" and of a second "SSB group". The UE determines a first SSB from the first SSB group and a second SSB from the second SSB group. The UE transmits a first PRACH corresponding to the first SSB. The UE monitors first PDCCH for scheduling a first PDSCH RAR reception within a first time window in response to the first PRACH. The UE transmits a second PRACH corresponding to the second SSB while the UE has not successfully received the first RAR Similar procedure can be used with CSI-RS groups instead of or in addition to SSB groups.

In one example, any or all of the UE determinations/decisions described above (such as stopping PRACH transmission, stopping PDCCH monitoring for scheduling a PDSCH RAR reception, dropping an RA procedure, and the like, after another RA procedure make progress to a next/certain step or a "cut-off" time) can correspond only to the case that the two RA procedures correspond to two TRPs of a same cell. In another example, any or all of the UE determinations/decisions described above can also correspond to the case that the two TRPs correspond to different cells. Similar considerations can also apply for the case that the two concurrent RA procedures correspond to a same RA trigger or two different triggers.

In one realization, among two or multiple concurrent RA procedures, a UE can continue with a second RA procedure when the UE does not successfully complete a first RA procedure. In another realization, a UE stops a second RA procedure when the UE successfully completes a first RA procedure. In one example, a UE stops a second RA procedure after the UE successfully completes a first RA procedure that is associated with a same trigger or a same cell as the second RA procedure. In another realization, the UE continues with a second RA procedure, regardless of successful or unsuccessful completion of a first RA procedure, when the first RA procedure is associated with a different trigger or a different cell than the second RA procedure.

In one realization, when a UE has a capability for multiple concurrent RA procedures, and the UE is performing two concurrent RA procedures, the UE can indicate a Random Access problem to upper layers when both RA procedures have reached their configured maximum number of PRACH preamble transmission attempts, for example, PREAMBLE_ TRANSMISSION_COUNTER=preamble TransMax+1 for the first TRP and PREAMBLE_TRANSMISSION_COUNTER_2=preambleTransMax_2+1 for the second TRP.

In one realization, for a UE performing two concurrent RA procedures, the UE can separately determine a RA type for each of the two concurrent RA procedures or can jointly determine a common RA type for both concurrent RA procedures, wherein a RA type refers to a RA Type-1 or 4-step RA, or a RA Type-2 or 2-step RA. Such determination can be based on, for example, the PRACH trigger and the SSB RSRP or CSI-RS RSRP associated with the RA procedure.

In one realization, when the two concurrent RA procedures are associated with different SSBs (for example, SSBs corresponding to two TRP from a same cell or different cells), the UE can determine a type for a RA procedure depending on a corresponding signaling in a SIB for a 4-step or a 2-step RA procedure where a first SSB for the first RA procedure can indicate use of either a 2-step or a 4-step RA procedure depending on a RSRP value and a second SSB for the second RA procedure does not indicate use of a 2-step RA procedure.

In one realization, a single-panel UE can perform two concurrent RA procedures towards two TRPs provided that the two procedures are associated with time multiplexed PRACH transmissions, PDCCH monitoring for RAR/MsgB PDSCH reception, Msg3/A PUSCH transmission, and PDCCH monitoring and Msg4 PDSCH reception. In one example, time multiplexing applies only to transmissions by a single-panel UE while simultaneous or time-overlapping receptions can be supported by such UE.

In one realization, a single-panel UE can perform two concurrent RA procedures that are associated with two SSBs or two CSI-RS s, associated with two SSB groups (or two PRS resource sets), that correspond to time multiplexed (TDMed) ROs. Therefore, when the single-panel UE selects SSB(s) or CSI-RS(s) corresponding to two concurrent RA procedures, the UE avoids selection of SSB(s) or CSI-RS(s) that result in simultaneous or overlapping transmission of two PRACHs with two different spatial filters. Similar methods and considerations can apply to Msg3/A PUSCH transmission. In another example, transmission timing constraints for Msg3/A PUSCH transmission can be configured by higher layers, or indicated by the RAR UL grant, or can be controlled by the network.

In another realization, a single-panel UE is expected to receive higher layer configuration for a mapping of a set of time-multiplexed (TDMed) slots or symbols included during a RAR monitoring time window with the two TRPs or corresponding SSB groups (or PRS resource sets). For example, a SIB extension or an extension of the RRC (common) configuration can indicate that a first set of symbols or slots in the RAR monitoring window include RAR monitoring occasions for a first RA procedure corresponding to a first TRP or a first SSB group, and a second set of symbols or slots include RAR monitoring occasions for a second RA procedure corresponding to a second TRP or a second SSB group. In one example, a single-panel UE can be configured to monitor PDCCH for scheduling of a PDSCH RAR reception from the first TRP in odd slots within the RAR time window, and to monitor PDCCH for scheduling a PDSCH RAR reception from the second TRP in even slots within the RAR time window Similar methods and considerations can apply to PDCCH monitoring and Msg4 PDSCH reception.

Although FIG. 7 illustrates the method 700, FIG. 8 illustrates the method 800, FIG. 9 illustrates the method 900, and FIG. 10 illustrates the method 1000, various changes may be made to FIGS. 7-10. For example, while the method 700 of FIG. 7 is shown as a series of steps, various steps could overlap, occur in parallel, occur in a different order, or occur multiple times. In another example, steps may be omitted or replaced by other steps. For example, steps of the method 700 can be executed in a different order.

The following embodiments of the present disclosure, denoted as E-2, describe TRP-specific configuration of RA procedure parameters and TRP-specific system information. This is described in following examples and embodiments such as those of FIG. 11.

Figure 11:
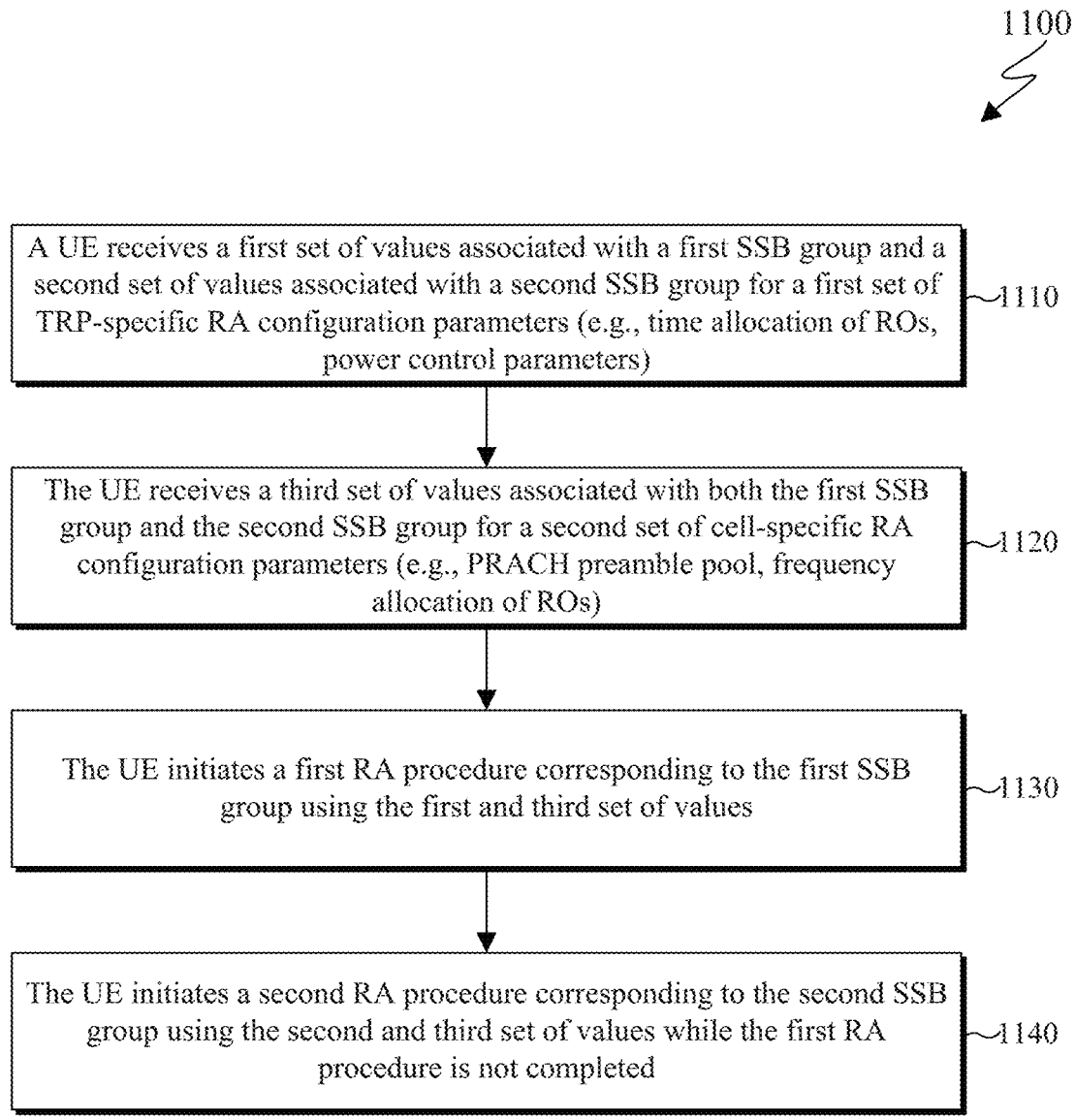
FIG. 11 illustrates an example method for TRP-specific RA configuration for a UE with two concurrent RA procedures according to embodiments of present disclosure.

FIG. 11 illustrates an example method 1100 for TRP-specific RA configuration for a UE with two concurrent RA procedures according to embodiments of present disclosure. The steps of the method 1100 can be performed by any of the UEs 111-116 of FIG. 1, such as the UE 116 of FIG. 3. The method 1100 is for illustration only and other embodiments can be used without departing from the scope of the present disclosure.

A UE (such as the UE 116) can be provided with a RA configuration that is partially or fully TRP-specific. In one realization, the UE can be provided with two RA configurations, each corresponding to one TRP from the two TRPs. In another realization, the UE can be provided with a set of cell-specific RA parameters that are common to both TRPs, and a set of TRP-specific RA parameters that are only applicable to each TRP. Such TRP-specific RA parameters as well as any other TRP-specific configuration parameters can be provided by TRP-specific higher layer configuration including TRP-specific system information. The signaling of the system information can be from one or both TRP(s) and include RA parameters for one or both TRP(s). Here, RA configuration includes configuration parameters for Msg1/MsgA PRACH transmission, PDCCH monitoring for RAR/Msg2/MsgB PDSCH reception, Msg3/MsgA PUSCH transmission, or PDCCH monitoring for Msg4 PDSCH reception. TRP-specific system information can include information elements and configuration-RO parameters in addition to or other than RA configuration parameters.

In one realization, there is a single cell-specific RA configuration, all RA parameters are cell-specific, and the UE follows the cell-specific configuration for both concurrent RA procedures for the two TRPs, while each TRP can correspond to a different SSB group (or different PRS resource set)).

In one realization, the UE can be configured with two separate RA configurations, wherein a first RA configuration is used for a first RA procedure for a first TRP (or first SSB group or PRS resource set), and a second RA configuration is used for a second RA procedure for a second TRP (or second SSB group or PRS resource set).

In another realization, in order to reduce a signaling overhead associated with fully separate configurations, the UE can be configured with a first set of cell-specific RA parameters that are used for both RA procedures for the two TRPs and can be separately configured with a second set of TRP-specific RA parameters that are individually used for each RA procedure for each TRP (or SSB group or PRS resource set(s)). For example, a single value is provided for each RA parameter in the first set of cell-specific RA parameters while separate values are provided for each parameter in the set of TRP-specific RA parameters. In one example, the set of cell-specific and TRP-specific parameters can be predetermined in the system specifications, while in another example, such determination is left to gNB implementation and can be provided in a SIB.

Various RA parameters can be TRP-specific. In one example, two TRPs can be associated with a same set of RO while there are two different PRACH preamble pools for the two TRPs. In another example, each of the two TRPs can be provided with a separate TRP-specific configuration for RO time resources, that is, two different "prach-Configuration-Index" values. In another example, the two TRPs can be configured with a same RO time resources, that is, a same "prach-ConfigurationIndex" value, and with different RO frequency resources, including different number of FDMed ROs or different location/offset for ROs in the frequency domain In yet another example, two TRPs can be associated with same PRACH preamble pool and same RO configuration, while other configuration parameters can be TRP-specific. For example, the SSB-to-RO mapping (or CSI-RS to RO mapping) can be TRP-specific, including different values for one or more of the parameters N, R, and Q used for SSB-to-RO mapping in 4-step RA or 2-step RA. In one example, a PRACH mask index can be TRP-specific. In another example, each of the two TRPs can be associated with a different TRP-specific time division duplexing (TDD) DL-UL configuration. In yet another example, PRACH power control parameters, such as PRACH preamble target received power, or a power ramping value, or a power offset value for Msg3/MsgA PUSCH transmission, can be TRP-specific. In a further example, a configuration for only 4-step RA is provided for a first TRP, while configurations for both 2-step RA and 4-step RA are provided for a second TRP. In one example, configurations for both 2-step RA and 4-step RA are provided for both TRPs and the configuration for the first TRP provides shared ROs for the 2-step RA and 4-step RA, while the configuration for the second TRP provides separate ROs for the 2-step RA compared to ROs for 4-step RA or provides separate PRACH mask index. Other RA parameters that can be TRP-specific can include: cyclic shift for PRACH sequence, PDCCH monitoring window for scheduling RAR/MsgB/Msg4 PDSCH receptions, DL RS associated with PRACH, power ramping, PRACH format and numerology/SCS, and the like. In one example, there is no cell-specific RA parameter, and all RA parameters are TRP-specific.

A first RA configuration can be provided by a cell-specific configuration via higher layers such as SIB1 or a common RRC configuration, while a second RA configuration can be provided by a SIB1 extension (such as a non-essential SIB1 extension) or by another broadcast or on-demand SIB>1, or by extension of common RRC configuration, or by dedicated RRC configuration for a connected mode UE. This approach ensures that UEs not capable of supporting concurrent RA procedures are able to receive the SIB or RRC common configuration without any backward compatibility issues, while UEs capable of concurrent RA procedures can receive and use both configurations.

In one realization, both TRPs transmit a same SIB and RRC content, so any configuration information provided by a first TRP is same as the one provided by a second TRP and the two RA configurations, including any TRP-specific RA configurations, are provided by both TRPs. For example, a SIB1 extension (such as a non-essential SIB1 extension), or broadcast, or on-demand SIB>1, or extension of common RRC configuration, or dedicated RRC configuration can provide two RA configurations. In one example, a mapping is provided between SSB groups (or PRS resource sets) with the (TRP-specific) RA configuration parameters. For example, a first set of RA parameter values is provided for a first SSB group (or a first PRS resource set), and a second set of RA parameter values is provided for a second SSB group (or a second PRS resource set). Such operation can be beneficial, for example, for TRPs with fast backhaul, or tighter synchronization assumptions, or CA-like operation.

In another realization, different TRPs transmit partially different SIB or RRC content, so that some configuration information is shared among different TRPs, such as cell-specific RA parameters, while other TRP-specific RA parameters are provided only by a corresponding TRP. In one example, the two TRPs may correspond to partially different MIB contents or potentially different configurations for CORESET #0 or search space set #0. In another example, the two TRPs correspond to a same MIB content, and a same CORESET #0 and search space set #0 indicated by MIB, and the two TRPs use two different PDCCH candidates or two different DCI formats to schedule two corresponding SIB1 PDSCHs, for example, in different time/frequency resources. Such operation can be beneficial, for example, for TRPs with non-ideal backhaul, or looser synchronization assumptions, or DC-like operation.

In one realization, TRP-specific configuration can apply to additional parameters, in addition to TRP-specific RA configuration parameters. Such TRP-specific configuration can include TRP-specific system information, for example, TRP-specific SIB1, or TRP-specific SIB>1 including broadcast or on-demand OSI. In another example, some parameters have a TRP-specific configuration, until a UE-dedicated RRC configuration is provided to a UE and replaces or modifies the TRP-specific configuration. Such TRP-specific system information or RRC configuration can be based on a linkage with SSB groups, or PRS resource sets, or explicit TRP-IDs, and the like. In one example, a UE can receive multiple dedicated/UE-specific configurations (for RA procedures or for other operations) from multiple TRPs, and the UE uses a corresponding configuration when operating with each corresponding TRP. Such configuration can be referred to as UE-TRP-specific configuration.

In one example, cell-specific RA parameters are based on values provided by the first/cell-specific RA configuration while TRP-specific parameters are provided by the second RA configuration in a SIB extension, or in an extension of RRC configuration, with two separate values corresponding to the two TRPs.

In another example, the second RA configuration provides a single set of values for the RA parameters. A UE with two concurrent RA procedures for two TRPs follows the second RA configuration, commonly for both TRPs, for a predetermined set of parameters (per system specifications), such as for determination of ROs or of PRACH preambles, for identification of the UE by the network and distinction from UEs that are not capable of concurrent RA procedures. For other RA parameters, a UEs with two concurrent RA procedures uses the two RA configurations separately for a corresponding RA procedure for each corresponding TRP.

In yet another example, when higher layer configuration provides two RA configurations, UEs not performing two concurrent RA procedures use the first RA configuration, such as the cell-specific RA configuration provided by SIB1 or RRC common configuration, while UEs performing two concurrent RA procedures use the second RA configuration, provided by SIB1 extension or extension of RRC configuration, for both RA procedures for the two TRPs. Such operation provides a means for the network to identify and distinguish UEs that can support concurrent RA procedures while both RA procedures use a same configuration when performing RA for the two TRPs.

In one example, usage of two different RA configurations for two TRPs can be allowed only when certain conditions are met, such as a frequent overlap of ROs for the two concurrent PRACH transmissions, and then a UE can use the second RA configuration or both RA configurations. For example, when a UE detects the two SSBs associated with the two TRPs (for example, from the two SSB groups) that a UE detects for the two concurrent RA procedures and the two SSBs map to same ROs or FDMed ROs frequently, for example for a percentage of mapped ROs larger than a threshold, when using the RO configuration in the first RA configuration, the UE can use the second RO configuration for the second RA procedure for the second TRP, or to commonly use the second RO configuration for PRACH transmission for both TRPs, as was previously described.

FIG. 11 illustrates the method 1100 describing a flowchart for TRP-specific RA configuration for a UE with two concurrent RA procedures, where TRPs are identified based on a linkage with SSB groups.

In step 1110, a UE (such as the UE 116) receives a first set of values associated with a first SSB group and a second set of values associated with a second SSB group for a first set of TRP-specific RA configuration parameters (e.g., time allocation of ROs, power control parameters). In step 1120, the UE receives a third set of values associated with both the first SSB group and the second SSB group for a second set of cell-specific. RA configuration parameters (e.g., PRACH preamble pool, frequency allocation of ROs). In step 1130, the UE initiates a first RA procedure corresponding to the first SSB group (towards the first TRP) using the first and third set of values. In step 1140, the UE initiates a second RA procedure corresponding to the second SSB group (towards the second TRP) using the second and third set of values while the first RA procedure is not completed.

In one example, CSI-RS groups or PRS groups can be used above instead of SSB groups to identify the TRPs.

Although FIG. 11 illustrates the method 1100 various changes may be made to FIG. 11. For example, while the method 1100 of FIG. 11 is shown as a series of steps, various steps could overlap, occur in parallel, occur in a different order, or occur multiple times. In another example, steps may be omitted or replaced by other steps. For example, steps of the method 1100 can be executed in a different order.

The following embodiments of the present disclosure, denoted as E-3, describe PRACH power control for a TRP-specific RA procedure overlapping with another PRACH or PUSCH/PUCCH/SRS. This is described in following examples and embodiments such as those of FIG. 12.

Figure 12:
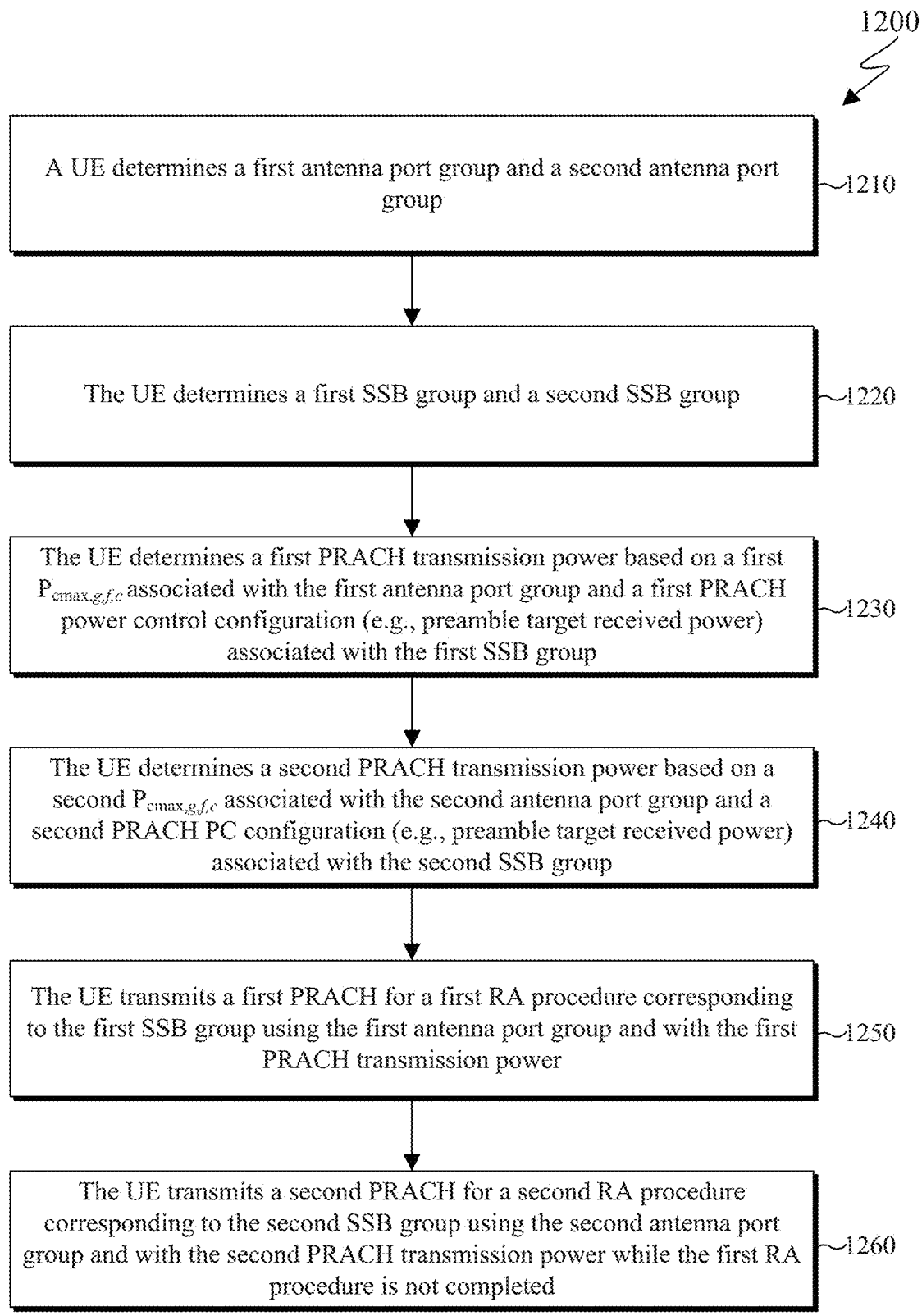
FIG. 12 illustrates an example method for TRP-specific and panel-specific power control for a multi-panel UE with two concurrent RA procedures according to embodiments of present disclosure.

FIG. 12 illustrates an example method 1200 for TRP-specific and panel-specific power control for a multi-panel UE with two concurrent RA procedures according to embodiments of present disclosure. The steps of the method 1200 can be performed by any of the UEs 111-116 of FIG. 1, such as the UE 116 of FIG. 3. The method 1200 is for illustration only and other embodiments can be used without departing from the scope of the present disclosure.

In certain embodiments, when a UE (such as the UE 116) performs two concurrent RA procedures for two respective TRPs, the UE determines different PRACH transmission power levels for the corresponding RA procedures, for example due to TRPs-specific configuration values for target PRACH preamble received power, or for power ramping of PRACH transmissions. In one realization, TRP-specific power control can also apply for Msg3/MsgA PUSCH transmission, for example due to TRP-specific configuration of corresponding target power levels, pathloss compensation factors, or power offset values. In another realization, TRP-specific power control can also apply to Msg1/MsgA PRACH transmission(s) or Msg3/MsgA PUSCH transmission(s) of a single RA procedure for a first TRP, including when such transmissions overlap with a PUSCH/PUCCH/SRS transmission for a second TRP, as explained in the following.

In one realization, some or all Msg1/MsgA PRACH power control parameters can be TRP-specific, such as Pcmax for PRACH including MPR, A-MPR, P-MPR values or EIRP or total radiated power "TRP" value targeting a gNB TRP direction associated with a transmission spatial filter, PRACH power ramping value, and any other PRACH power offset and power control parameter.

In another realization, some or all Msg3/MsgA PUSCH power control parameters can be TRP-specific, such as Pcmax for PUSCH including MPR, A-MPR, P-MPR values or EIRP or total radiated power "TRP" value targeting a gNB TRP direction associated with a transmission spatial filter, PUSCH target power, PUSCH pathloss reference and corresponding values, PUSCH pathloss compensation factors, antenna gain values, transmit power control (TPC) command configuration and corresponding values, any PUSCH power offset parameter, and the like.

In one realization, a UE can perform two concurrent RA procedures from two UE panels for two corresponding TRPs, so that Msg1/MsgA PRACH transmission(s) and Msg3/MsgA PUSCH transmission(s) follow both TRP-specific and panel-specific power control parameters. For example, panel-specific power control parameters can be due to one or more of: different MPE or P-MPR values, different peak/average/max/min EIRP or total radiated power "TRP" values, different Pcmax values, different target PUSCH power levels, different pathloss values, different PUSCH pathloss compensation factors, different antenna gain values, or different PUSCH power offset parameters, corresponding to different UE panels.

FIG. 12 illustrates the method 1200 describing a flowchart for TRP-specific and panel-specific power control for a multi-panel UE with two concurrent RA procedures.

In step 1210, a UE (such as the UE 116) determines a first antenna port group and a second antenna port group. In step 1220, the UE determines a first SSB group and a second SSB group. In step 1230, the UE determines a first PRACH transmission power based on a first $P_{CMAX,g,f,c}$ (in turn based on a first P-MPR/EIRP value) associated with the first antenna port group and a first PRACH power control configuration (e.g., preamble target received power or power ramping) associated with the first SSB group. In step 1240, the UE determines a second PRACH transmission power based on a second $P_{CMAX,g,f,c}$ (in turn based on a second P-MPR/EIRP value) associated with the second antenna port group and a second PRACH PC configuration (e.g., preamble target received power or power ramping) associated with the second SSB group.

In step 1250, the UE transmits a first PRACH for a first RA procedure corresponding to the first SSB group using the first antenna port group and with the first PRACH transmission power. in step 1260, the UE transmits a second PRACH for a second RA procedure corresponding to the second SSB group using the second antenna port group and with the second PRACH transmission power while the first RA procedure is not completed.

As described in the method 1200, panel-specific configuration and determination of parameters is based on a linkage with antenna port groups but any other linkage to UE panels can be considered in a similar manner. TRP-specific configuration and determination of parameters is based on a linkage with SSB groups, but any other linkage to UE panels can be considered in a similar manner In one example, one UE panel is mapped to one TRP. In another example, one UE panel can be mapped to multiple TRPs. In yet another example, multiple UE panels can be mapped to one TRP.

In one realization, when a UE performs multiple concurrent RA procedures, the UE may need to transmit PRACHs that would overlap in time. In such case, when a total transmission power is larger than a maximum transmission power, the UE can drop or power scale some of the PRACH transmission(s), for example based on priority rules specified in the system operation.

In certain embodiments, a UE (such as the UE 116) transmits a PRACH for a RA procedure for a first TRP and transmits a PUSCH/PUCCH/SRS to a second TRP that overlaps in time with the PRACH or is in a short time gap such as less than N symbols (for a given SCS) from the start or end of the PRACH transmission. For example, such operation can be applicable to a UE in RRC CONNECTED state. In one example, the UE can perform the first RA procedure to retain "partial" UL synchronization to the first TRP, such as when the UE has valid TA for the second TRP but not for the first TRP. For example, the first TRP can belong to a first timing advance group (TAG) and the second TRP can belong to a second TAG, wherein both TAGs correspond to a same serving cell that supports multiple TAGs, or can correspond to multiple different serving cells. In another example, the UE can perform the first RA procedure as a part of a "partial" link recovery procedure (or "partial BFR"), or for an uplink link recovery procedure (UL BFR). The UE transmits a link recovery request (LRR—also referred to as PRACH-based beam failure indication, or new candidate beam identification, or beam failure recovery request) to indicate that a DL RS/TCI state/beam or an UL RS/spatial filter/beam corresponding to the first TRP (or the second TRP) has failed and needs link recovery. According to this example, the UE has a valid TA on the second TRP and at least one valid DL RS/TCI state/beam or UL RS/spatial filter/beam to transmit a PUSCH or PUCCH or SRS to the second TRP.

In one example, the UE can have two transmitter panels and transmit the PRACH from the first UE panel and the PUSCH/PUCCH/SRS from the second UE panel. The PRACH transmission can overlap in time with the PUSCH/PUCCH/SRS transmission. In one example, the UE can have a single transmitter panel, the PRACH transmission may not overlap in time with the PUSCH/PUCCH/SRS transmission, and the UE may be capable of a short timeline for beam switching so that the transmissions occur with a short time gap, such as less than a predetermined number of N symbols, for a given SCS, corresponding to a baseline capability and timeline.

When a UE transmits a PRACH that overlaps in time with one or more PUSCH/PUCCH/SRS transmissions, a total UE transmission power may exceed a maximum configured UE transmission power limit (e.g., a maximum power limit across all UE panels for a multi-panel UE, due to implementation issues or regulatory requirements) at least in one symbol. Then the UE scales (including to zero power resulting in dropping) the PRACH transmission power or the one or more PUSCH/PUCCH/SRS transmission power(s) in the at least one symbol or for part or the entire duration of the transmission(s) such that the total UE transmission power does not exceed the maximum configured UE transmission power limit.

In one realization, the UE determines a power scaling (including to zero power resulting in dropping) among such overlapping transmissions based on a priority rule, wherein the priority rule is specified in the system operation or determined by the UE. In one example, the PRACH has a higher priority for power allocation than the PUSCH/PUCCH/SRS when the PRACH is associated with PCell. In another example, the PUCCH/PUCCH/SRS has a higher priority for power allocation than the PRACH when the PRACH is associated with an SCell. In one example, the PRACH always has higher priority while in another example the PUSCH/PUCCH/SRS always has a higher priority.

In another realization, the UE drops one of the overlapping transmissions, at least in the symbols where the time overlapping occurs, or additionally in the remaining symbols before or after the time overlapping, based on a condition. For example, the UE drops a transmission with lower EIRP, or lower total radiated power "TRP", or lower PCMAX. For another example, the UE drops a transmission with higher MPE such as a higher P-MPR value. For another example, the UE drops a transmission with lower signal/channel quality, such as lower RSRP or higher pathloss estimate value. For another example, the UE drops a transmission with TRP with larger distance from the UE, when the TRP locations are provided to the UE. For another example, the UE drops a transmission with earlier/later trigger time (e.g., for PRACH or SRS) or scheduling information reception (e.g., PDCCH/DCI format reception time for PUSCH/PUCCH). For yet another example, the UE drops a transmission with lower priority, wherein a priority of a RA procedure can be based on a priority order of the trigger for that RA procedure using a specified ordering of the PRACH triggers, for example, a PRACH for acquisition of TA or for BFR can have a higher priority compared to a PRACH due to scheduling request (SR), and wherein a priority for a PUSCH is based on a priority level for a corresponding traffic as provided by higher layers or indicated by a DCI format scheduling the PUSCH transmission, and wherein a priority for PUCCH is based on a priority level for UCI multiplexed in the PUCCH as determined in the system operation or indicated by higher layers or by a DCI format triggering the PUCCH transmission, and wherein a priority for an SRS is based on a time-domain configuration of SRS such as aperiodic SRS having higher priority compared to semi-persistent or periodic SRS.

In one example, the UE can be configured with a threshold for any of the above determinations, for example for comparison of PCMAX or EIRP, TRP, MPE, P-MPR, RSRP, RSRP, pathloss estimate value, and the like, wherein the threshold can apply to absolute values corresponding to the each of the overlapping transmissions or a relative/difference values between the overlapping transmissions. In one example, when both/all overlapping transmissions satisfy the threshold, or when none of the overlapping transmissions satisfies the threshold, the UE drops one of the two/multiple overlapping transmissions uniformly at random.

In one example, a decision to drop a transmission and maintain an overlapping transmission can be based on one or more of: a UE capability, or a gNB indication, or uniformly at random selection. In another example, such decision is per UE implementation.

In one example, when the UE needs to frequently drop an overlapping PRACH transmission, such as for a percentage of ROs larger than a threshold, the UE can stop the corresponding RA procedure, or stop using a corresponding SSB or CSI-RS for PRACH transmission.

In another realization, the UE transmits both the PRACH and the overlapping PUSCH/PUCCH/SRS and applies power scaling or power back-off to the overlapping transmissions such that a total power after power scaling/back-off does not exceed the maximum UE transmission power limit in any symbol of the overlapping transmissions. For application of power back-off, in one example, the UE selects one of the overlapping transmissions and applies the entire power back-off to the selected transmission without any power back-off for the other overlapping transmission. The selection can be based on a condition or a priority order, such as one of the several examples that were previously described. In another example, the UE applies an equal power back-off to all overlapping transmissions. In yet another example, the UE applies separately-determined power back-off values to the overlapping transmissions, such as a power back-off for each overlapping transmission being proportional to a transmission parameter, including computed powers for transmission, RSRPs, MPE/P-MPR values, EIRP/TRP values, pathloss values, and the like.

In one example, the UE determines whether or not to drop or power scale a transmission based on a time gap, when any, between the two transmissions, or a corresponding trigger time, or scheduling information signaling time such as a PDCCH reception time. According to this example, when the time gap is less than a threshold, such as one based on UE processing time or a factor thereof, the UE can determine to power scale or to drop a transmission, and the like.

In certain embodiments, for single cell operation or for operation with carrier aggregation in a same frequency band, except for a UE reporting a capability [2 panels], a UE does not transmit PRACH and PUSCH/PUCCH/SRS in a same slot or when a gap between the first or last symbol of a PRACH transmission in a first slot is separated by less than N symbols from the last or first symbol, respectively, of a PUSCH/PUCCH/SRS transmission in a second slot where $N=2$ for $\mu=0$ or $\mu=1$, $N=4$ for $\mu=2$ or $\mu=3$, and $\mu$ is the SCS configuration for the active UL BWP. For a PUSCH transmission with repetition Type B, this applies to each actual repetition for PUSCH transmission [6, TS 38.214]. For a UE reporting a capability [2-panel], the UE can transmit PRACH and PUSCH/PUCCH/SRS on different panels/using different antenna port groups in a same slot or when a gap between the first or last symbol of a PRACH transmission in a first slot is separated by less than N symbols from the last or first symbol, respectively, of a PUSCH/PUCCH/SRS transmission in a second slot where N=2 for µ=0 or µ=1, N=4 for µ=2 or µ=3, and µ is the SCS configuration for the active UL BWP. For a PUSCH transmission with repetition Type B, this applies to each actual repetition for PUSCH transmission [6, TS 38.214]. If the PRACH and PUSCH/PUCCH/SRS transmissions in the same slot overlap in at least one symbol, and if a total UE transmit power for PRACH and PUSCH/PUCCH/SRS in the same slot on serving cell(s) in a frequency range in a respective transmission occasion i would exceed $\hat{P}_{CMAX}(i)$, where $\hat{P}_{CMAX}(i)$ is the linear value of $P_{CMAX}(i)$ in transmission occasion i as defined in [8-1, TS 38.101-1] for FR1 and [8-2, TS38.101-2] for FR2, the UE allocates power to PRACH and PUSCH/PUCCH/SRS transmissions according to a priority order provided in Clause 7.5 so that the total UE transmit power for transmissions on serving cells in the frequency range is smaller than or equal to $\hat{P}_{CMAX}(i)$ for that frequency range in every symbol of transmission occasion i.

Although FIG. 12 illustrates the method 1200 various changes may be made to FIG. 12. For example, while the method 1200 of FIG. 12 is shown as a series of steps, various steps could overlap, occur in parallel, occur in a different order, or occur multiple times. In another example, steps may be omitted or replaced by other steps. For example, steps of the method 1200 can be executed in a different order.

The following embodiments of the present disclosure, denoted as E-4, describe monitoring and reception of two RARs/MsgBs and handling two Msg3s/Msg4s (or two MsgA PUSCH(s)) corresponding to two concurrent RA procedures towards two TRPs/cells. This is described in following examples and embodiments.

In certain embodiment, for a UE performing two or multiple concurrent RA procedures towards two TRPs/cells, the UE can monitor PDCCH for scheduling two RAR/Msg2/MsgB PDSCH receptions corresponding to the RA procedures, each possibly including a TA value, a TC-RNTI, and a RAR UL grant for Msg3 PUSCH transmission. The UE can transmit one or two Msg3/MsgA PUSCHs and can monitor PDCCH for scheduling one or two Msg4 PDSCH receptions for contention resolution, each with a corresponding contention resolution time window.

Such operation can be beneficial, for example, as a form of repetition or spatial diversity and can improve a reliability and latency of the RA procedure including an increased likelihood of a successful reception of at least one Msg4. Therefore, use of two concurrent RA procedures reduces RA latency since the UE can independently perform each RA procedure without waiting for a successful Msg4 reception for another concurrent RA procedure.

In one realization, for a UE with multiple concurrent RA procedures, the UE can determine a first TA value from a first RAR associated with a first RA procedure corresponding to a first TRP (such a first SSB group, or CSI-RS group, or PRS resource set) that the UE can apply a corresponding spatial filter when transmitting UL channels or signals towards the first TRP (e.g., QCL with an SSB from the first SSB group or with a CSI-RS from a CSI-RS group, or with a PRS resource set). In addition, the UE can determine a second TA value from a second RAR associated with a second RA procedure corresponding to a second TRP (such a second SSB group, or CSI-RS group, or PRS resource set) that the UE can apply a corresponding spatial filter when transmitting UL channels or signals towards the second TRP (e.g., QCL with an SSB from the second SSB group, or CSI-RS group, or PRS resource set). The UE applies the corresponding TA values for subsequent PUSCH/PUCCH/SRS transmissions when transmitting with a corresponding spatial filter (targeting the corresponding TRP).

In certain embodiments, Syntax (1), below, describes a process for when RAR is successful.
Syntax (1)
2> if the Random Access Response reception is considered successful:
    3> if the Random Access Response includes a MAC subPDU with RAPID only:
        4> consider this Random Access procedure successfully completed;
        4> indicate the reception of an acknowledgement for SI request to upper layers.
    3> else:
        4> apply the following actions for the Serving Cell where the Random Access Preamble was transmitted:
            5> process the received Timing Advance Command (see clause 5.2) for a UE without capability [2-PRACHs];
            5> if the UE has a capability [2-PRACHs] and is performing two concurrent RA procedures, process the first received Timing Advance Command for transmissions corresponding to (e.g., QCL with) the first SSB/CSI-RS group, and process the second received Timing Advance Command for transmissions corresponding to (e.g., QCL with) the second SSB/CSI-RS group;
            5> indicate the preambleReceivedTargetPower and the amount of power ramping applied to the latest Random Access Preamble transmission to lower layers (i.e. (PREAMBLE_POWER_RAMPING_COUNTER−1)×PREAMBLE_POWER_RAMPING_STEP);
            5> if the Random Access procedure for an SCell is performed on uplink carrier where pusch-Config is not configured:
                6> ignore the received UL grant.
            5> else:
                6> process the received UL grant value and indicate it to the lower layers.

The following embodiments of the present disclosure, denoted as E-4-1, describe reception of one or two RARs including RAPID only corresponding to cell-specific or TRP-specific OSI. This is described in following examples and embodiments.

In certain embodiments, when a UE (such as the UE 116) performs two concurrent RA procedures to request for some (on-demand) other system information "OSI" or SIB>1, and the UE receives a first RAR with an indication of a matching random access preamble identity (RAPID) corresponding to a first RA procedure for a first TRP, the UE considers the first RA procedure for OSI request to be successfully completed. The UE can determine whether to stop or continue the second RA procedure for a second TRP based on whether the OSI is cell-specific or TRP-specific.

In one realization, when a requested OSI is cell-specific, the UE stops the second RA procedure for the second TRP, including stopping PRACH transmissions and monitoring PDCCH for scheduling PDSCH receptions for a RAR from the second TRP.

In another realization, when a requested OSI is TRP-specific, the UE continues the second RA procedure for the second TRP, including PRACH transmission(s) and PDCCH monitoring for scheduling a PDSCH reception with a RAR, until the UE receives a second RAR that includes a matching RAPID corresponding to the second RA procedure for the second TRP.

In either case, the RA procedures can be completed after RAR reception, without the UE transmitting a Msg3 PUSCH or receiving a Msg4 PDSCH (for 4-step RA), at least when dedicated configuration is provided for OSI request, including dedicated PRACH preamble, or RO, or SSB index.

The UE determines whether a requested OSI is cell-specific or TRP-specific based on a configuration for OSI scheduling provided in the SIB1. In one example, if a single configuration is provided for scheduling the requested OSI, the UE determines that the requested OSI is cell-specific. In another example, if multiple configurations are provided for scheduling the requested OSI, with each configuration linked to one of two SSB groups or one of two PRS resource sets, the UE determines that the OSI is TRP-specific. The latter case is applicable at least when the two TRPs correspond to two different cells or when the two TRPs correspond to a same cell and the OSI includes TRP-specific system information at least for some configuration parameters, as discussed in E-2, above.

The following embodiments of the present disclosure, denoted as E-4-2, describe reception of two RARs from two TRPs and transmission of two Msg3s for "intra-UE" contention resolution for a UE before RRC connection. This is described in following examples and embodiments, such as those of FIGS. 13-16.

Figure 13:
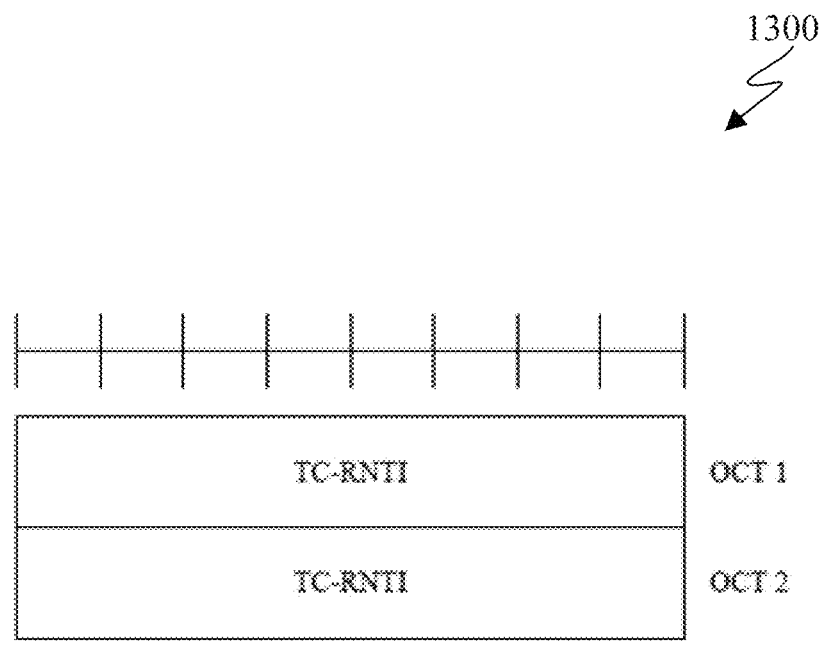
FIG. 13 illustrates an example diagram according to embodiments of present disclosure.
Figure 14:
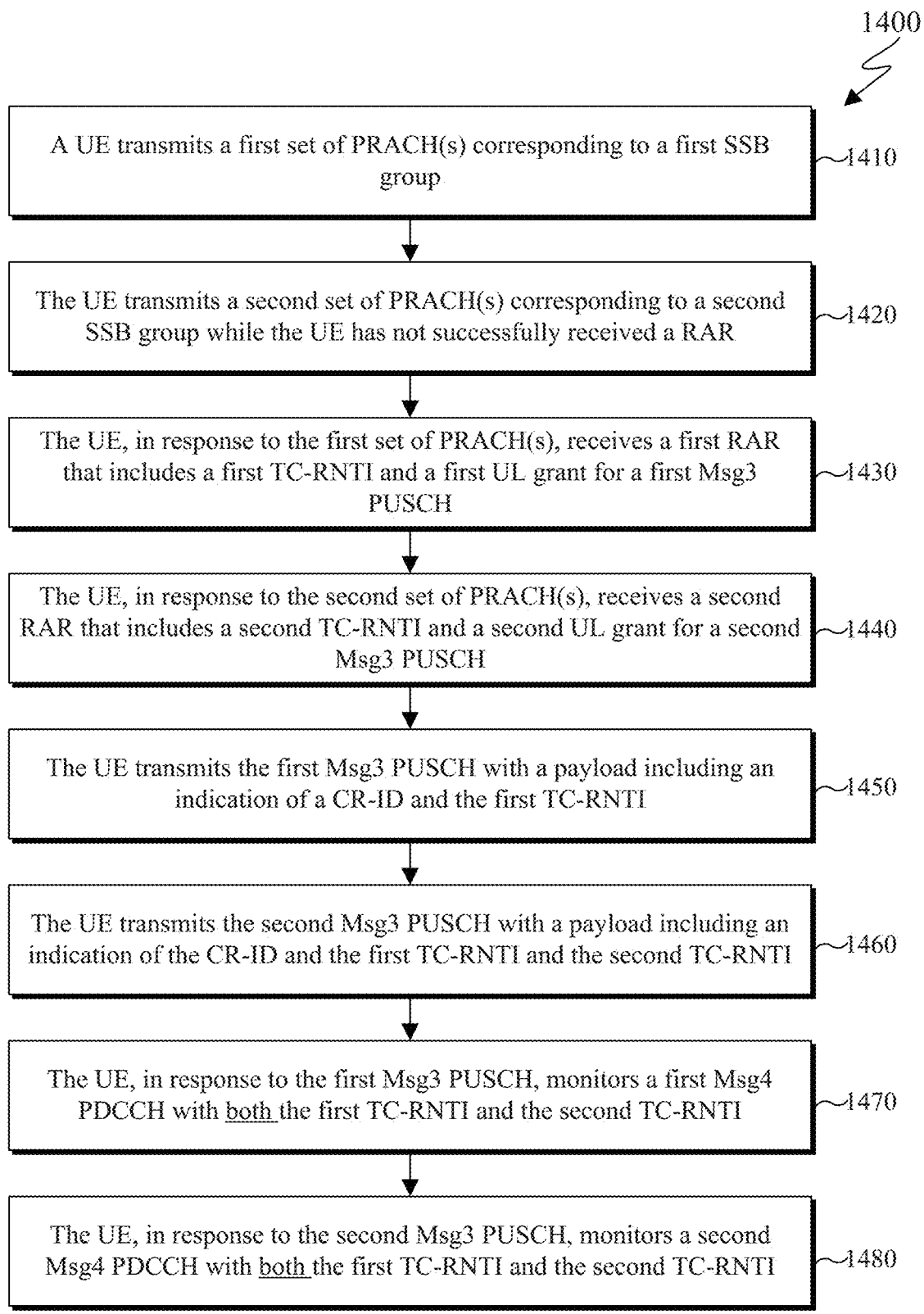
FIG. 14 illustrates an example method for reception of two RARs from two TRPs and transmission of two modified Msg3s and monitoring physical downlink control channel (PDCCH) for scheduling two Msg4 physical downlink shared channel (PDSCH) receptions for a UE with two concurrent RA procedures before radio resource control (RRC) connection according to embodiments of present disclosure.
Figure 15:
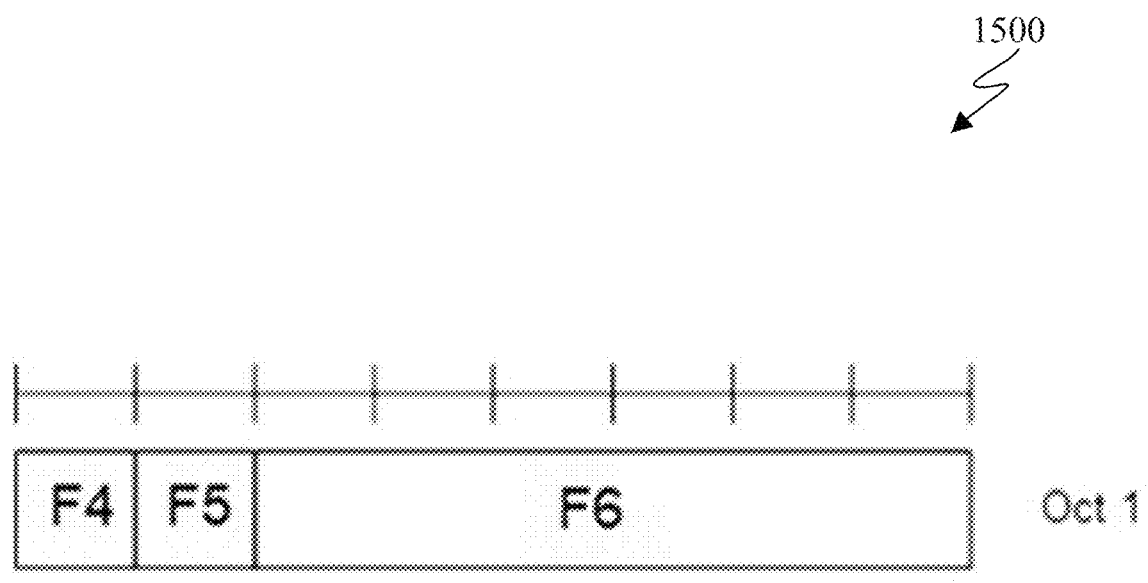
FIG. 15 illustrates an example diagram for TRP-coordination assistance information medium access control (MAC) control element (CE) according to embodiments of present disclosure.
Figure 16:
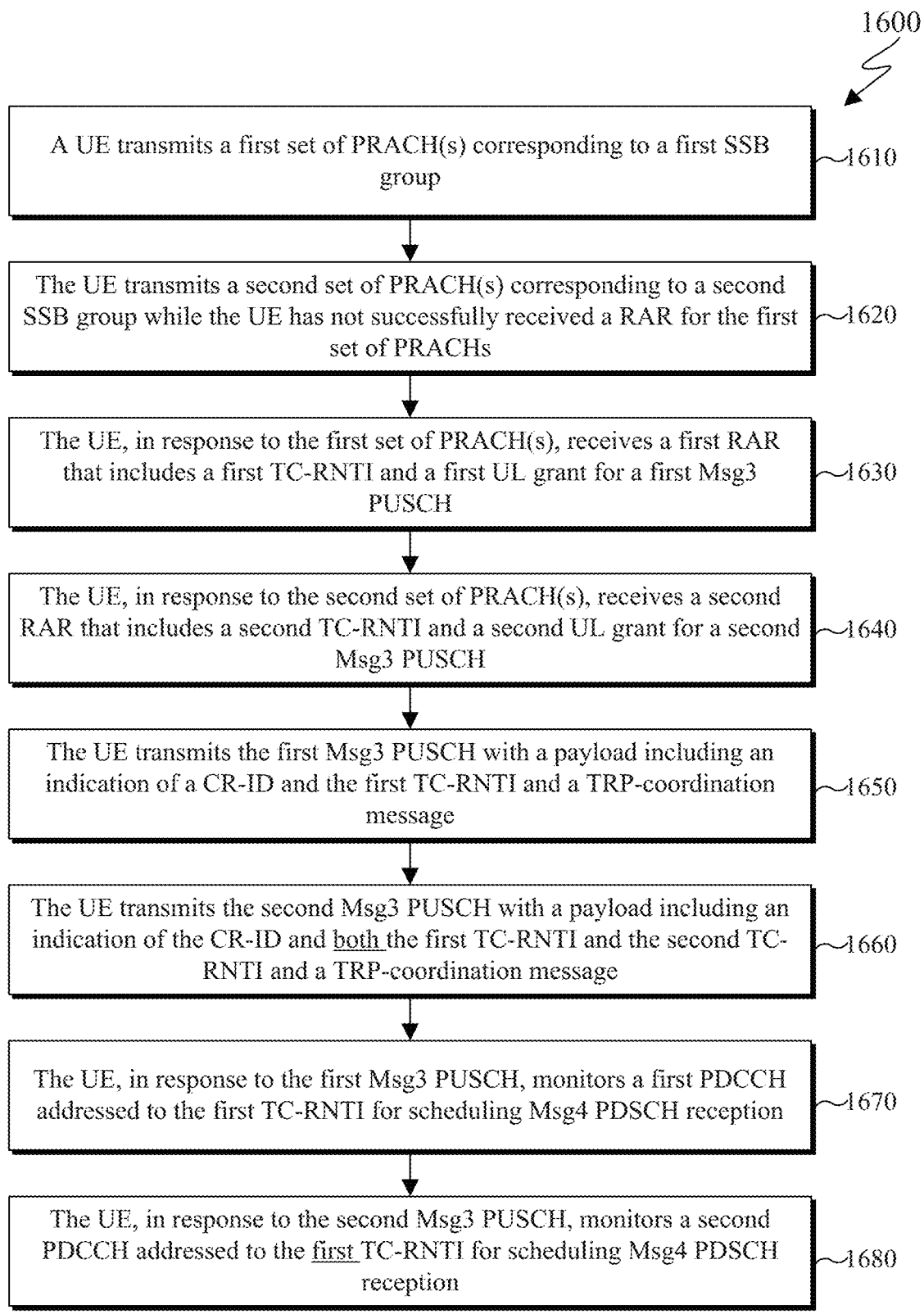
FIG. 16 illustrates an example method for repletion of two RARs from two transmission of two modified Msg3 physical uplink shared channels (PUSCHs) and monitoring PDCCH for scheduling of two Msg4 physical downlink shared channels (PDSCHs) for a UE with two concurrent RA procedures before RRC connection according to embodiments of present disclosure.

FIG. 13 illustrates an example diagram 1300 according to embodiments of present disclosure. FIG. 14 illustrates an example method 1400 for reception of two RARs from two TRPs and transmission of two modified Msg3s and monitoring PDCCH for scheduling two Msg4 PDSCH receptions for a UE with two concurrent RA procedures before RRC connection according to embodiments of present disclosure. FIG. 15 illustrates an example diagram 1500 for TRP-coordination assistance information MAC CE according to embodiments of present disclosure. FIG. 16 illustrates an example method 1600 for repletion of two RARs from two transmission of two modified Msg3 PUSCHs and monitoring PDCCH for scheduling of two Msg4 PDSCHs for a UE with two concurrent RA procedures before RRC connection according to embodiments of present disclosure. The steps of the methods 1400 and 1600 can be performed by any of the UEs 111-116 of FIG. 1, such as the UE 116 of FIG. 3. The methods 1400 and 1600 is for illustration only and other embodiments can be used without departing from the scope of the present disclosure.

In certain embodiments, for a UE (such as the UE 116) that does not have an RRC connection with a gNB (such as the BS 102) (UE does not have C-RNTI) and performs two concurrent RA procedures for two TRPs and receives two RARs from the two TRPs for the two concurrent RA procedures, the UE can transmit two Msg3 PUSCHs with modified content to enable the gNB to link the two concurrent RA procedures initiated by the UE and resolve an "intra-UE" contention resolution. This is because the gNB has no knowledge before Msg3/MsgA PUSCH reception that the concurrent RA procedures are from a same UE, rather than from multiple corresponding UEs. For example, the two RARs include two TC-RNTIs for the same UE and the gNB needs to resolve such "double TC-RNTI" that was issued for the UE. In another example, the two TRPs may provide the UE with two conflicting RRC configurations and then a UE behavior needs to be defined to avoid or resolve such "double/conflicting RRC configuration" issue. Such modification of Msg3/MsgA PUSCHs transmission, compared to the contents of Msg3 PUSCH for a UE performing a single RA procedure at a given time, and corresponding gNB and UE behaviors depend, among other factors, on the backhaul assumptions between the two TRPs/cells. For example, the UE may need to provide assistance information to the two TRPs/cells so that the two TRPs/cells can link the two concurrent RA procedures to the UE and resolve the intra-UE contention resolution.

A UE (such as the UE 116) without C-RNTI can trigger a PRACH transmission, for example for initial access to establish RRC connection, due to RLF to re-establish RRC connection, or for transition from RRC_INACTIVE state to resume RRC connection and move to the RRC connected state.

In one realization, UE without C-RNTI can include, on one or both Msg3 PUSCHs including at least on the latest transmitted Msg3 PUSCH, a MAC-CE that includes one or more of the following information fields such as F1, F2, and F3. Here, F1 is a contention resolution ID (CR-ID) for the UE, F2 is an indication of a first TC-RNTI that the UE received in the first/earlier MAC RAR, and F3 is an indication of a second TC-RNTI that the UE received in the second/later MAC RAR.

In one example, the UE can include such MAC-CE in both Msg3 PUSCHs for two concurrent RA procedures, such as for the case that the UE receives the two corresponding RARs with a time gap less than a threshold (e.g., a threshold based on UE processing time).

In one example, some of the above information elements can be implicitly indicated. For example, the UE can use the original TC-RNTI as the scrambling initialization of the Msg3 PUSCH, thereby implicitly indicating the information element F2. In one example, a UE can have two different contention resolution IDs (CR-IDs) corresponding to each concurrent RA procedure or each TRP/cell, or each UE panel.

The diagram 1300 of FIG. 13 illustrates an example format of a MAC CE that the UE includes in one or both Msg3 PUSCHs. The C-RNTI MAC CE is identified by MAC sub-header with LCID as specified in Table 6.2.1-2 of TS 38.321. It can have a fixed size and consists of a single field. In certain embodiments, This field contains the C-RNTI of the MAC entity. The length of the field is 16 bits. In certain embodiments, the TC-RNTI MAC CE is identified by MAC sub-header with LCID as specified in Table 6.2.1-2. of TS 38.321. It can have a fixed size and consists of a single field as shown in the diagram 1300 of FIG. 13. For a UE with a capability [2-PRACHs] and performing two concurrent RA procedures, this field contains the TC-RNTI associated with one of the two RA procedure. The length of the field is 16 bits.

When the two TRPs/cells receive two Msg3 PUSCHs indicating a same CR-ID, and at least one of the two Msg3 PUSCHs includes an indication of two TC-RNTIs, then at least the second TRP can identify and link the two RA procedures to the UE and become aware of the double TC-RNTI for the UE. The second TRP can then inform the first TRP through the backhaul of the two concurrent RA procedures associated with the UE. Accordingly, the two TRPs can resolve the "intra-UE" contention resolution and the double TC-RNTI issue by responding in Msg4(s) with only one of the two TC-RNTIs to ensure that one C-RNTI is assigned to the UE and one RRC configuration is provided using Msg4 or later PDSCH transmissions. In one example, although UE monitors PDCCH for two Msg4 PDSCHs, the gNB can transmit only one Msg4 PDSCH (and only PDCCH for scheduling the one Msg4 PDSCH reception) or can transmit two Msg4 PDSCHs.

In a first option, the two TRPs can coordinate on a single TC-RNTI for the UE without providing an explicit indication to the UE about the selected TC-RNTI. The two TRPs can transmit one or two Msg4(s) to the UE that are addressed to the single selected TC-RNTI, regardless of whether the Msg4 corresponds to the first RA procedure/RAR or the second RA procedure/RAR. The UE monitors PDCCH for scheduling of the two Msg4 PDSCHs using both TC-RNTIs and the UE determines the final C-RNTI based on the TC-RNTI used for addressing the one or two Msg4 PDCCHs/PDSCHs.

In a second option, the two TRPs can coordinate on a single TC-RNTI for the UE and provide explicit indication to the UE about the selected TC-RNTI. For example, the two TRPs can indicate the selected TC-RNTI via a one-bit flag to indicate the first TC-RNTI or the second TC-RNTI, or by indicating the full bit string of the selected TC-RNTI. The two TRPs can transmit one or two Msg4(s) to the UE and, unlike the first option, each Msg4 PDSCH is addressed to a same TC-RNTI as the TC-RNTI received in the corresponding RAR for the corresponding RA procedure. The UE monitors PDCCH for scheduling of two Msg4 PDCCHs using both TC-RNTIs and determines a C-RNTI based on a TC-RNTI indicated in the one or two Msg4 PDSCHs (with a matching CR-ID).

In a third option, the two TRPs use a single default TC-RNTI based on a rule, such as the TC-RNTI provided in the earliest RAR, or the min/max of the two TC-RNTIs, so that the C-RNTI is known to the UE and does not need to be indicated. The UE monitors PDCCH for scheduling two Msg4 PDCCHs using the default TC-RNTI that is also the C-RNTI for the UE.

For example, a first RAR time window for monitoring a first PDCCH for a first RAR from a first TRP can have no/partial/full overlap in time with a second RAR time window for monitoring a second PDCCH for a second RAR from a second TRP. In another example, a first contention resolution time window for monitoring a first PDCCH for a first Msg4 PDSCH from a first TRP can have no/partial/full overlap in time with a second contention resolution time window for monitoring a second PDCCH for a second Msg4 PDSCH from a second TRP. In a further example, the UE may be monitoring for a PDCCH for a RAR from a first TRP while the UE is monitoring for a PDCCH for a Msg4 PDSCH from a second TRP, with the corresponding RAR time window having no/partial/full overlap in time with the corresponding contention resolution time window.

For example, the UE uses the same modifications for Msg3 PUSCH transmission and PDCCH monitoring for Msg4 PDSCH receptions also for repetitions and retransmissions of Msg3 PUSCH as well as for repetitions and retransmissions of Msg4 PDSCH.

FIG. 14 illustrates the method 1400 describing a flowchart for reception of two RARs from two TRPs and transmission of two modified Msg3s and monitoring PDCCH for scheduling two Msg4 PDSCH receptions for a UE with two concurrent RA procedures before RRC connection.

In step 1410, a UE (such as the UE 116) transmits a first set of PRACH(s) corresponding to a first SSB group. In step 1420, the UE transmits a second set of PRACH(s) corresponding to a second SSB group while the UE has not successfully received a first RAR corresponding to the first SSB group. For example, the while condition in step 1420 can be relaxed so the UE can transmit a second set of PRACH(s) corresponding to the second SSB group while the first RA procedure corresponding to the first SSB group has not successfully completed.

In step 1430, the UE in response to the first set of PRACH(s), receives a first RAR that includes a first TC-RNTI and a first UL grant for a first Msg3 PUSCH. In step 1440, the UE in response to the second set of PRACH(s), receives a second RAR that includes a second TC-RNTI and a second UL grant for a second Msg3 PUSCH. It is also possible that both the first and second Msg3 PUSCHs include the first and second TC-RNTIs and the contents can be different for an initial transmission, such as for the first Msg3 PUSCH to include only the first TC-RNTI, and for a retransmission, such as for the first Msg3 PUSCH to include both the first TC-RNTI and the second TC-RNTI, for example because the UE obtained the second TC-RNTI after the initial Msg3 PUSCH transmission and before the Msg3 PUSCH retransmission.

In step 1450, the UE transmits the first Msg3 PUSCH with a payload including an indication of a CR-ID and the first TC-RNTI. In step 1460, the UE transmits the second Msg3 PUSCH with a payload including an indication of the CR-ID, the first TC-RNTI, and the second TC-RNTI. In step 1470, the UE, in response to the first Msg3 PUSCH, monitors a first PDCCH for scheduling a first Msg4 PDSCH reception with both the first TC-RNTI and the second TC-RNTI. In step 1480, the UE in response to the second Msg3 PUSCH, monitors a second PDCCH for scheduling a second Msg4 PDSCH reception with both the first TC-RNTI and the second TC-RNTI. It is noted that in steps 1470 and 1480, the two TRPs resolve the "double TC-RNTI" issue and assign a single C-RNTI to the UE.

In another realization, a UE without assigned C-RNTI can include different items on the first Msg3 PUSCH and on the second Msg3 PUSCH. For example, the first Msg3 PUSCH, can include at least one of (i) an UL MAC to assist the coordination of the two TRPs with information element(s) from {F4, F5, F6} as defined below, and (ii) an UL MAC-CE to provide the information element(s) from {F1, F2, F3} as previously described, if such information is available when generating the first/earlier Msg3 PUSCH (or a retransmission thereof) and there is sufficient processing time for the UE to include it on the first Msg3 PUSCH (or a retransmission thereof). The first Msg3 PUSCH, can include at least one of (i) an UL MAC to assist the coordination of the two TRPs with information element(s) from {F4, F5, F6} as defined below, and (ii) an UL MAC-CE to provide the information element(s) from {F1, F2, F3} as previously described.

Herein, for two concurrent RA procedures, the first Msg3 PUSCH refers to a Msg3 PUSCH that the UE received a corresponding RAR UL grant earlier or that the UE transmits earlier.

An UL MAC-CE to assist the coordination of the two TRPs for two concurrent RA procedures can include at least one or more of the following information elements. The information elements can be denoted as F4, F5, and F6. Here, F4 is a one-bit field that indicates whether or not the UE has provided a second TC-RNTI in the first/earlier Msg3 PUSCH; F5 is a one-bit field that indicates whether or not the UE has attempted a concurrent PRACH procedure and is waiting for a second/later RAR (when UE has not received the second RAR/TC-RNTI yet); and F6 is a 6-bit field to indicate an SSB index used for transmission of the other PRACH corresponding to the other RAR/TC-RNTI/Msg3 PUSCH. Alternatively, the field can provide a CSI-RS resource indicator (CRI) corresponding to the PRACH for example when NZP CSI-RS resources for different TCI states are provided by SIB, or an indication for an SSB group, or a CSI-RS group or a PRS resource set corresponding to the other RAR/TC-RNTI/Msg3 PUSCH.

The diagram 1500 of FIG. 15 illustrates an example format of UL MAC CE for TRP coordination that can be included on both the first and the second Msg3 PUSCHs.

In one example, while a same format is used for the TRP-coordination assistance information MAC CE, values of one or more of the corresponding fields in a first such MAC-CE included in the first Msg3 PUSCH associated with the first RA procedure can be different from the corresponding fields in a second such MAC-CE included in the second Msg3 PUSCH associated with the second RA procedure. For example, a value for the F4 field in the first PUSCH can correspond to initiation and RAR reception for the second RA procedure, while a value for the F4 field in the second PUSCH can correspond to initiation and RAR reception for the first RA procedure. Similar for fields F5 and F6.

In certain embodiments, the TRP-coordination assistance information MAC CE is identified by MAC sub-header with LCID/eLCID as specified in Table 6.2.1-2 of [TS 38.321]. This MAC CE applies to a UE with a capability [2-PRACHs] and performing two concurrent RA procedures. It can have a fixed size of one octet and consists of the fields as illustrated in FIG. 15.

As illustrated in the diagram 1500 the field "TC-RNTI presence" denoted as F4 can include an indication whether or not the UE has indicated its TC-RNTI_2 in the Msg3 transmission corresponding to the first RA procedure. The length of this field is 1 bit.

As illustrated in the diagram 1500 the field "RAR waiting" denoted as F5 can include an indication whether or not the UE has attempted a concurrent RA procedure and is waiting for a second RAR corresponding to the second RA procedure. The length of this field is 1 bit.

As illustrated in the diagram 1500 the field "RS indication" denoted as F6 can include an indication of the SSB index or the CSI-RS index or SSB/CSI-RS/PRS group index used for the other RA procedure. The length of this field is 6 bit.

According to this realization, when at least one of the TRPs, such as the second TRP, receives a Msg3 PUSCH indicating a CR-ID and two TC-RNTIs, at least the second TRP identifies the two concurrent RA procedures by the UE and the second TRPs can respond with a Msg4 PDSCH addressed to, from example, the first TC-RNTI. Accordingly, the UE monitors PDCCH for scheduling two Msg4 PDSCHs using the first/earliest TC-RNTI.

The TRP-coordination assistance information MAC CE provides an indication to the TRPs about a potential concurrent RA procedure for both TRPs that is ongoing by the UE using fields F4 and F5. Furthermore, the information element F6 can provide assistance to the TRP to identify the other TRP for which the UE has a concurrent RA procedure, for example using linkages between TRPs and SSB groups. At least the second TRP or both TRPs can transmit a Msg4 PDSCH for contention resolution purposes and RRC connection setup can follow in subsequent PDSCHs after further inter-TRP coordination. The TRPs can exchange additional information using inter-TRP/inter-gNB interfaces such as the Xn interface or the F1 interface to further coordinate about assigning C-RNTI and RRC configuration to the UE.

In another example, the two TRPs can coordinate on a C-RNTI selection from the two TC-RNTIs, and therefore, the UE monitors PDCCH for one or two Msg4(s) using both TC-RNTIs.

FIG. 16 illustrates the method 1600 describing a flowchart for reception of two RARs from two and transmission of two modified Msg3 PUSCHs and monitoring PDCCH for scheduling of two Msg4 PDSCHs for a UE with two concurrent RA procedures before RRC connection.

In step 1610, a UE (such as the UE 116) transmits a first set of PRACH(s) corresponding to a first SSB group. In step 1620, the UE transmits a second set of PRACH(s) corresponding to a second SSB group while the UE has not successfully received a first RAR corresponding to the first SSB group. For example, while condition of step 1620 can be relaxed so the UE can transmit a second set of PRACH(s) corresponding to the second SSB group while the first RA procedure corresponding to the first SSB group has not successfully completed.

In response to the transmission of the first set of PRACH(s), the UE, in step 1630, receives a first RAR that includes a first TC-RNTI and a first UL grant for a first Msg3 PUSCH transmission. In response to the second set of PRACH(s) the UE in step 1640, receives a second RAR that includes a second TC-RNTI and a second UL grant for a second Msg3 PUSCH transmission. In step 1650, the UE transmits the first Msg3 PUSCH with a payload including an indication of a CR-ID and the first TC-RNTI and a TRP-coordination message. In step 1660, the UE transmits the second Msg3 PUSCH with a payload including an indication of the CR-ID and both the first TC-RNTI and the second TC-RNTI and a TRP-coordination message. The contents of the Msg3 PUSCH can vary between an initial transmission and a retransmission as it was previously described.

In response to the first Msg3 PUSCH transmission, the UE in step 1670, monitors a first PDCCH addressed to the first TC-RNTI for scheduling a first Msg4 PDSCH reception. In response to the second Msg3 PUSCH transmission, the UE in step 1680, monitors a second PDCCH addressed to the first TC-RNTI for scheduling a second Msg4 PDSCH reception.

In one realization, the UE transmits the two Msg3 PUSCHs and monitors PDCCH for scheduling of the two Msg4 PDSCHs independently, without any modification of the Msg3 PUSCH content or modification of Msg4 PDCCH monitoring. According to this realization, the UE and the two TRPs/cells coordinate on the UE identity issues, such as resolving the double C-RNTI issue and assigning a single C-RNTI to the UE using later messages, such as in later PUSCH transmissions or PDSCH receptions, and possibly based on UE-specific RRC signaling and configuration.

In another realization, a UE with may continue to operate with two TC-RNTIs, both elevated as C-RNTIs, so that the UE will have two C-RNTI values, as a means to indicate its connection to the two TRPs/cells. In one example, the UE is assigned one C-RNTI, selected from one of the two assigned TC-RNTIs (using any of the options and methods above), and the UE also maintains the other TC-RNTI, so that the UE's communication with the first TRP can be addressed by the C-RNTI, and the UE's communication with the second TRP can be addressed by the other TC-RNTI that is not selected as the C-RNTI.

Although FIG. 14 illustrates the method 1400 and FIG. 16 illustrates the method 1600 various changes may be made to FIGS. 14 and 16. For example, while the method 1400 of FIG. 14 is shown as a series of steps, various steps could overlap, occur in parallel, occur in a different order, or occur multiple times. In another example, steps may be omitted or replaced by other steps. For example, steps of the method 1400 can be executed in a different order.

The following embodiments of the present disclosure, denoted as E-4-3, describe reception of two RARs from two TRPs and transmission of two (modified) Msg3s for "intra-UE" contention resolution for a UE after RRC connection. This is described in following examples and embodiments.

In certain embodiments, when a UE is in the RRC_CONNECTED state, has been provided a C-RNTI, and performs two concurrent RA procedures towards two TRPs/cells, the UE can monitor PDCCH for scheduling of two RAR PDSCH receptions corresponding to two concurrent RA procedures, each with a corresponding RAR time window, and then transmit two Msg3 PUSCHs, and then monitor PDCCH for scheduling two Msg4 PDSCH receptions, each with a corresponding contention resolution time window. The UE can transmit the two Msg3 PUSCHs independently for the two RA procedures or the two Msg3 PUSCHs can have some dependence and linkage. PDCCH monitoring for Msg4 PDSCH reception can be based on the UE's C-RNTI.

The UE may transmit a PRACH in RRC_CONNECTED state, for example, due to PDCCH order, loss of UL timing, SR issue/failure, SpCell BFR, or SCell BFR and the like.

In one example, the UE can include a C-RNTI MAC-CE in both Msg3 PUSCH transmissions to the two TRPs/cells, and that information can be sufficient at the two TRPs to link the two RA procedures to a same UE.

In another example, the UE can include a C-RNTI MAC-CE in both Msg3 PUSCH transmissions to the two TRPs, and additionally include a TC-RNTI MAC-CE as described in E-4-2, above, so that the two TRPs are provided further information for faster linkage of the two RA procedures to a same UE.

In yet another example, the UE can include the TRP-coordination assistance data MAC CE, as described in E-4-2, above, so that the two TRPs can faster identify the two concurrent RA procedure and initiate any necessary message exchange for handling of RRC configuration to the UE.

In all cases, the two TRPs transmit and the UE monitors one or two PDCCH(s) addressed to the C-RNTI configured to the UE for scheduling two Msg4 PDSCH receptions.

In certain embodiments, Syntax (2) below, describes a process that can be used in both E-4-2 and E-4-3.

Syntax (2)
4> if the Random Access Preamble was not selected by the MAC entity among the contention-based Random Access Preamble(s):
   5> consider the Random Access procedure successfully completed.
4> else:
   5> set the TEMPORARY C-RNTI to the value received in the Random Access Response;
   5> if this is the first successfully received Random Access Response within this Random Access procedure:
      6> if the transmission is not being made for the CCCH logical channel:
         7> indicate to the Multiplexing and assembly entity to include a C-RNTI MAC CE in the subsequent uplink transmission for a UE without capability [2-PRACHs].
      7> if the UE has a capability [2-PRACHs] and is performing two concurrent RA procedures:
         8> indicate to the Multiplexing and assembly entity to include: a C-RNTI MAC CE, and a TRP-coordination assistance information MAC CE, in the subsequent uplink transmission corresponding to the first RA procedure;
         8> indicate to the Multiplexing and assembly entity to include: a C-RNTI MAC CE, a TC-RNTI MAC-CE associated with the first RA procedure, and a TRP-coordination assistance information MAC CE, in the subsequent uplink transmission corresponding to the second RA procedure;
      6> if the Random Access procedure was initiated for SpCell beam failure recovery:
         7> indicate to the Multiplexing and assembly entity to include a BFR MAC CE or a Truncated BFR MAC CE in the subsequent uplink transmission.
      6> if the UE has a capability [2-PRACHs] and is performing two concurrent RA procedures, and if the transmission is being made for the CCCH logical channel:
         7> indicate to the Multiplexing and assembly entity to include a TRP-coordination assistance information MAC CE in the subsequent uplink transmission corresponding to the first RA procedure;
         7> indicate to the Multiplexing and assembly entity to include: a TC-RNTI MAC-CE associated with the first RA procedure, and a TRP-coordination assistance information MAC CE, in the subsequent uplink transmission corresponding to the second RA procedure;
      6> obtain the MAC PDU to transmit from the Multiplexing and assembly entity and store it in the Msg3 buffer.

It is noted that in Syntax (2), if within a Random Access procedure, an uplink grant provided in the Random Access Response for the same group of contention-based Random Access Preambles has a different size than the first uplink grant allocated during that Random Access procedure, the UE behavior is not defined.

In certain embodiments, once Msg3 is transmitted the MAC entity can perform Syntax (3).

Syntax (3)
1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
   2> if the C-RNTI MAC CE was included in Msg3:
      3> if the Random Access procedure was initiated for SpCell beam failure recovery (as specified in clause 5.17) and the PDCCH transmission is addressed to the C-RNTI; or
      3> if the Random Access procedure was initiated by a PDCCH order and the PDCCH transmission is addressed to the C-RNTI; or 3> if the Random Access procedure was initiated by the MAC sublayer itself or by the RRC sublayer and the PDCCH transmission is addressed to the C-RNTI and contains a UL grant for a new transmission:
4> consider this Contention Resolution successful;
4> stop ra-ContentionResolutionTimer;
4> discard the TEMPORARY C-RNTI;
4> consider this Random Access procedure successfully completed.
2> else if the CCCH SDU was included in Msg3 and the PDCCH transmission is addressed to its TEMPORARY C-RNTI, or TEMPORARY C-RNTI_2 (for a UE with capability [2-PRACHs] and performing a second concurrent RA procedures):
3> if the MAC PDU is successfully decoded:
4> stop ra-ContentionResolutionTimer;
4> if the MAC PDU contains a UE Contention Resolution Identity MAC CE; and
4> if the UE Contention Resolution Identity in the MAC CE matches the CCCH SDU transmitted in Msg3:
5> consider this Contention Resolution successful and finish the disassembly and demultiplexing of the MAC PDU;
5> if this Random Access procedure was initiated for SI request:
6> indicate the reception of an acknowledgement for SI request to upper layers.
5> else:
6> set the C-RNTI to the value of the TEMPORARY C-RNTI or TEMPORARY C-RNTI_2;
5> discard the TEMPORARY C-RNTI and TEMPORARY C-RNTI_2;
5> consider this Random Access procedure successfully completed.
5> for a UE with capability [2-PRACHs] and performing a second concurrent RA procedures, stop the second Random Access procedure.
4> else:
5> discard the TEMPORARY C-RNTI for a UE without capability [2-PRACHs];
5> consider this Contention Resolution not successful and discard the successfully decoded MAC PDU.

The following embodiments of the present disclosure, denoted as E-5, describe enhancements for PDCCH order for two concurrent RA procedures, including "extended" PDCCH order. This is described in following examples and embodiments.

In certain embodiments, a PDCCH order can be enhanced to provide information for two concurrent RA procedures (possibly from a two-panel UE) for two TRPs. Such enhancements can include, for example, TRP indication, UE panel indication, TCI state indication for RAR reception, TCI state indication for Msg3/MsgA PUSCH transmission, and the like. In another realization, a single "extended" PDCCH order can be used to indicate two concurrent RA procedures using a single DCI format.

In one realization, a PDCCH order can indicate a TRP for RA procedure. In one example, a PDCCH order can include a new field in the DCI format, such as by using some of the reserved bits for PDCCH order, to indicate an identity for the TRP such as a TRP ID. In another example, the UE determines a TRP for the RA procedure based on an SSB index provided by the PDCCH order. For example, the UE determines the TRP based on which an SSB group that is associated with the SSB indicated by the PDCCH order.

In one realization, a PDCCH order can indicate a UE panel to be used for PRACH transmission. For example, a PDCCH order can include a new field in the DCI format, such as by using some of the reserved bits in the DCI format serving as PDCCH order, to indicate a UE panel ID such as an antenna group index or a DL/UL resource set index associated with the UE panel. In another example, the UE determines a UE Tx panel for PRACH transmission based on an Rx panel used for reception of the PDCCH order, such as a same panel as the Rx panel when it is both a Rx/Tx panel, and a Tx panel associated with the Rx panel, otherwise.

In one example, a PDCCH order for a RA procedure from a first UE panel for a first TRP can be transmitted by either the first TRP or a second TRP and can be received by either the first UE panel or a second UE panel.

In another example, a PDCCH order can provide a CSI-RS resource indicator (CRI) instead of an SSB index.

In another realization, a PDCCH order can provide a TCI state or a spatial filter for RAR PDCCH or PDSCH reception or for Msg3 PUSCH transmission. In one example, the PDCCH order can include a field to indicate an SSB or a CSI-RS or an SRS or a DL/UL TCI state to be used for reception of Msg2/RAR PDCCH or PDSCH. In another example, PDCCH order can include a field to indicate an SSB or a CSI-RS or an SRS or a DL/UL TCI state to be used for Msg3 PUSCH transmission. In one example, such DL/UL RS or TCI-state can be cell-specific, TRP-specific, BWP-specific, UE-specific, UE-TRP-specific, or panel-specific.

In one example, when a UE has a TRP-specific configuration for PRACH transmission, the UE interprets at least some PRACH parameters provided by a PDCCH order based on the TRP-specific configuration. For example, when a PDCCH order indicates an RO and a PRACH mask index, the UE determines the RO and mask index based on the TRP-specific PRACH configuration corresponding to the TRP that is indicated by the PDCCH order.

In one realization, the UE can be provided by an "extended" PDCCH order that includes information for UE to perform two RA procedures corresponding to two UE panels or targeting two TRPs. For example, an extended PDCCH order can include two sets of values for PRACH preamble, SSB index, and mask index, and the UE performs one RA procedure based on each set of parameter values. In another example, an extended PDCCH order can include two separate corresponding fields for UE panel index, TRP ID, or TCI state for RAR PDCCH or PDSCH reception or Msg3 PUSCH transmission. According to this realization, the UE initiates two RA procedures at a same time based on corresponding information provided in the extended PDCCH order.

In certain embodiments, for a UE (such as the UE 116) with a capability [panel-selection for PRACH], if a random access procedure is initiated by a PDCCH order, the UE, if requested by higher layers, transmits a PRACH in the selected PRACH occasion using [an antenna port in] the indicated "antenna port group", as described in [11, TS 38.321]. For a UE with a capability [2-PRACHs], if two concurrent physical random access procedures are initiated by an extended PDCCH order, the UE, if requested by higher layers, transmits a first PRACH in the first selected PRACH occasion using [a first antenna port in] the first indicated "antenna port group" and a second PRACH in the second selected PRACH occasion using [a second antenna port in] the second indicated "antenna port group", as described in [11, TS 38.321]. The UE/Layer 1 does not expect to be indicated by an extended PDCCH order a same SS/PBCH block index for both random access procedures.

The following embodiments of the present disclosure, denoted as E-6, describe modified BI in RAR for load distribution among TRPs. This is described in following examples and embodiments.

In certain embodiments, a UE that is capable of performing (or is performing) two concurrent RA procedures can interpret a back-off indication (BI) provided in a RAR/Msg2/MsgB PDSCH differently from other UEs. For example, for TRP-specific PRACH operation, the BI can be used to provide assistance information about the PRACH congestion level at different TRPs and assist with load distribution among TRPs.

In one realization, when a UE receives a BI in a first RAR PDSCH from a first TRP, the UE determines that the UE should avoid PRACH transmission to the first TRP (using a corresponding transmission spatial filter) for an indicated amount of time. However, the BI can include assistance information to the UE for other TRPs that may be available. For example, a BI can provide a recommendation about another available TRP or SSB group with little/no PRACH back-off time. In one example, a BI can indicate that a first TRP corresponding to SSB group {0,1,2,3} is not currently available for RA procedure, but a second TRP corresponding to SSB group {4,5,6,7} is available. The benefit of such operation is to assist UEs to access different TRPs, if possible, so that PRACH congestion is moved across TRPs and better distributed among TRPs.

Such behavior can also be considered per "SSB area" instead of per TRP/SSB group, so that it can also apply in case of single TRP. Then, a BI can indicate a second SSB index that is available when a first attempted SSB index is not available.

The following descriptions can be applicable to the embodiments described in E-7 through E-12.

PRACH preamble sequences are generated using the Zadoff-Chu (ZC) sequence. The set of random-access preambles $x_{u,v}(n)$ shall be generated according to Equation (3) and Equation (4), below. The frequency-domain representation shall be generated according to Equation (5), below.

$$x_{u,v}(n) = x_u((n + c_v) \mod L_{RA}) \quad (3)$$

$$x_u(i) = e^{-j\frac{\pi u i(i+1)}{L_{RA}}}, \quad (4)$$

$$i = 0, 1, \ldots, L_{RA} - 1$$

$$y_{u,v}(n) = \sum_{m=0}^{L_{RA}-1} x_{u,v}(m) \cdot e^{-j\frac{\pi u i(i+1)}{L_{RA}}} \quad (5)$$

It is noted that $L_{RA}=839$, $L_{RA}=139$, $L_{RA}=1151$, or $L_{RA}=571$ depending on the PRACH preamble format.

There are 64 preambles defined in each time-frequency PRACH occasion, enumerated in increasing order of first increasing cyclic shift C, of a logical root sequence, and then in increasing order of the logical root sequence index, starting with the index obtained from the higher-layer parameter prach-RootSequenceIndex or rootSequenceIndex-BFR or by msgA-PRACH-RootSequenceIndex if configured and a type-2 random-access procedure is initiated. Additional preamble sequences, in case 64 preambles cannot be generated from a single root ZC sequence, are obtained from the root sequences with the consecutive logical indexes until all the 64 sequences are found. The logical root sequence order is cyclic; the logical index 0 is consecutive to $L_{RA}-2$. The sequence number u is obtained from the logical root sequence index.

The preamble sequence shall be mapped to physical resources as described in Equation (6), below:

$$a_k^{(p,RA)} = \beta_{PRACH} Y_{u,v}(k), \; K=0,1,\ldots,L_{RA}-1 \quad (6)$$

Here, $\beta_{PRACH}$ is an amplitude scaling factor in order to conform to the PRACH transmit power, and p=4000 is the antenna port.

Random access preambles can only be transmitted in the time resources obtained from predetermined Tables depending on a frequency range and a spectrum type (shared or non-shared). The PRACH configuration index is given by the higher-layer parameter prach-ConfigurationIndex, or by msgA-PRACH-ConfigurationIndex if configured.

Random access preambles can only be transmitted in the frequency resources given by either the higher-layer parameter msg1-FrequencyStart or msgA-RO-FrequencyStart, if configured. The PRACH frequency resources $n_{RA} \in \{0,1,\ldots,M-1\}$, where M equals the higher-layer parameter msg1-FDM or msgA-RO-FDM if configured, are numbered in increasing order within the initial uplink bandwidth part during initial access, starting from the lowest frequency. Otherwise, $n_{RA}$ are numbered in increasing order within the active uplink bandwidth part, starting from the lowest frequency.

For the purpose of slot numbering, the following subcarrier spacing shall be assumed: 15 kHz for FR1 and 60 kHz for FR2.

Prior to initiation of the physical random access procedure, Layer 1 receives from higher layers a set of SS/PBCH block indexes and provides to higher layers a corresponding set of RSRP measurements.

Prior to initiation of the physical random access procedure, Layer 1 may receive from higher layers an indication to perform a Type-1 random access procedure or a Type-2 random access procedure.

Prior to initiation of the physical random access procedure, Layer 1 can receive the information from the higher layers. The information can include configuration of physical random access channel (PRACH) transmission parameters (PRACH preamble format, time resources, and frequency resources for PRACH transmission). The information can also include parameters for determining the root sequences and their cyclic shifts in the PRACH preamble sequence set (index to logical root sequence table, cyclic shift ($N_{CS}$), and set type (unrestricted, restricted set A, or restricted set B)).

From the physical layer perspective, the Type-1 L1 random access procedure includes the transmission of random access preamble (Msg1) in a PRACH, random access response (RAR) message with a PDCCH/PDSCH (Msg2), and when applicable, the transmission of a PUSCH scheduled by a RAR UL grant, and PDSCH for contention resolution.

From the physical layer perspective, the Type-2 L1 random access procedure includes the transmission of random access preamble in a PRACH and of a PUSCH (MsgA) and the reception of a RAR message with a PDCCH/PDSCH (MsgB), and when applicable, the transmission of a PUSCH scheduled by a fallback RAR UL grant, and PDSCH for contention resolution.

If a random access procedure is initiated by a PDCCH order to the UE, a PRACH transmission is with a same SCS as a PRACH transmission initiated by higher layers.

If a UE is configured with two UL carriers for a serving cell and the UE detects a PDCCH order, the UE uses the UL/SUL indicator field value from the detected PDCCH order to determine the UL carrier for the corresponding PRACH transmission.

In certain embodiments, physical random access procedure is triggered upon request of a PRACH transmission by higher layers or by a PDCCH order. A configuration by higher layers for a PRACH transmission can include a configuration for PRACH transmission. A configuration by higher layers for a PRACH transmission can also include a preamble index, a preamble SCS, $P_{PRACH,target}$, a corresponding RA-RNTI, and a PRACH resource.

A PRACH is transmitted using the selected PRACH format with transmission power $P_{PRACH,b,f,c}(i)$ on the indicated PRACH resource.

For Type-1 random access procedure, a UE is provided a number N of SS/PBCH block indexes associated with one PRACH occasion and a number R of contention based preambles per SS/PBCH block index per valid PRACH occasion by ssb-perRACH-OccasionAndCB-PreamblesPerSSB.

For Type-2 random access procedure with common configuration of PRACH occasions with Type-1 random access procedure, a UE is provided a number N of SS/PBCH block indexes associated with one PRACH occasion by ssb-perRACH-OccasionAndCB-PreamblesPerSSB and a number Q of contention based preambles per SS/PBCH block index per valid PRACH occasion by msgA-CB-PreamblesPerSSB-PerSharedRO. The PRACH transmission can be on a subset of PRACH occasions associated with a same SS/PBCH block index within an SSB-RO mapping cycle for a UE provided with a PRACH mask index by msgA-SSB-SharedRO-MaskIndex.

For Type-2 random access procedure with separate configuration of PRACH occasions with Type-1 random access procedure, a UE is provided a number N of SS/PBCH block indexes associated with one PRACH occasion and a number R of contention based preambles per SS/PBCH block index per valid PRACH occasion by msgA-SSB-PerRACH-OccasionAndCB-PreamblesPerSSB when provided; otherwise, by ssb-perRACH-OccasionAndCB-PreamblesPerSSB.

For Type-1 random access procedure, or for Type-2 random access procedure with separate configuration of PRACH occasions from Type 1 random access procedure, if N<1, one SS/PBCH block index is mapped to 1/N consecutive valid PRACH occasions and R contention based preambles with consecutive indexes associated with the SS/PBCH block index per valid PRACH occasion starting from preamble index 0. If N≥1, R contention based preambles with consecutive indexes associated with SS/PBCH block index n, 0≤n≤N−1, per valid PRACH occasion start from preamble index $n \cdot N_{preamble}^{total}/N$ where $N_{preamble}^{total}$ is provided by totalNumberOfRA-Preambles for Type-1 random access procedure, or by msgA-TotalNumberOfRA-Preambles for Type-2 random access procedure with separate configuration of PRACH occasions from a Type 1 random access procedure, and is an integer multiple of N.

For Type-2 random access procedure with common configuration of PRACH occasions with Type-1 random access procedure, if N<1, one SS/PBCH block index is mapped to 1/N consecutive valid PRACH occasions and Q contention based preambles with consecutive indexes associated with the SS/PBCH block index per valid PRACH occasion start from preamble index R. If N≥1, Q contention based preambles with consecutive indexes associated with SS/PBCH block index n, 0≤n≤N−1, per valid PRACH occasion start from preamble index $n \cdot N_{preamble}^{total}/N+R$, where $N_{preamble}^{total}$ is provided by totalNumberOfRA-Preambles for Type-1 random access procedure.

For link recovery, a UE is provided N SS/PBCH block indexes associated with one PRACH occasion by ssb-perRACH-Occasion in BeamFailureRecoveryConfig. For a dedicated RACH configuration provided by RACH-ConfigDedicated, if cfra is provided, a UE is provided N SS/PBCH block indexes associated with one PRACH occasion by ssb-perRACH-Occasion in occasions. If N<1, one SS/PBCH block index is mapped to 1/N consecutive valid PRACH occasions. If N≥1, all consecutive N SS/PBCH block indexes are associated with one PRACH occasion.

In certain embodiments, SS/PBCH block indexes provided by ssb-PositionsInBurst in SIB1 or in ServingCellConfigCommon are mapped to valid PRACH occasions in the following order. First, in increasing order of preamble indexes within a single PRACH occasion. Second, in increasing order of frequency resource indexes for frequency multiplexed PRACH occasions. Third, in increasing order of time resource indexes for time multiplexed PRACH occasions within a PRACH slot. Fourth, in increasing order of indexes for PRACH slots.

An association period, starting from frame 0, for mapping SS/PBCH block indexes to PRACH occasions is the smallest value in the set determined by the PRACH configuration period such that $N_{TX}^{SSB}$ SS/PBCH block indexes are mapped at least once to the PRACH occasions within the association period, where a UE obtains $N_{TX}^{SSB}$ from the value of ssb-PositionsInBurst in SIB1 or in ServingCellConfigCommon. If after an integer number of SS/PBCH block indexes to PRACH occasions mapping cycles within the association period there is a set of PRACH occasions or PRACH preambles that are not mapped to $N_{TX}^{SSB}$ SS/PBCH block indexes, no SS/PBCH block indexes are mapped to the set of PRACH occasions or PRACH preambles. An association pattern period includes one or more association periods and is determined so that a pattern between PRACH occasions and SS/PBCH block indexes repeats at most every 160 msec. PRACH occasions not associated with SS/PBCH block indexes after an integer number of association periods, if any, are not used for PRACH transmissions.

For a PRACH transmission triggered by a PDCCH order, the PRACH mask index field, if the value of the random access preamble index field is not zero, indicates the PRACH occasion for the PRACH transmission where the PRACH occasions are associated with the SS/PBCH block index indicated by the SS/PBCH block index field of the PDCCH order.

For a PRACH transmission triggered by higher layers, if ssb-ResourceList is provided, the PRACH mask index is indicated by ra-ssb-OccasionMaskIndex which indicates the PRACH occasions for the PRACH transmission where the PRACH occasions are associated with the selected SS/PBCH block index.

The PRACH occasions are mapped consecutively per corresponding SS/PBCH block index. The indexing of the PRACH occasion indicated by the mask index value is reset per mapping cycle of consecutive PRACH occasions per SS/PBCH block index. The UE selects for a PRACH transmission the PRACH occasion indicated by PRACH mask index value for the indicated SS/PBCH block index in the first available mapping cycle.

For the indicated preamble index, the ordering of the PRACH occasions is the following. First, in increasing order of frequency resource indexes for frequency multiplexed PRACH occasions. Second, in increasing order of time resource indexes for time multiplexed PRACH occasions within a PRACH slot. Third, in increasing order of indexes for PRACH slots.

For a PRACH transmission triggered upon request by higher layers, a value of ra-OccasionList, if csirs-ResourceList is provided, indicates a list of PRACH occasions for the PRACH transmission where the PRACH occasions are associated with the selected CSI-RS index indicated by csi-RS. The indexing of the PRACH occasions indicated by ra-OccasionList is reset per association pattern period.

For a Type-2 random access procedure, a UE transmits a PUSCH, when applicable, after transmitting a PRACH. The UE encodes a transport block provided for the PUSCH transmission using redundancy version number 0. The PUSCH transmission is after the PRACH transmission by at least N symbols where N=2 for µ=0 or µ=1, N=4 for µ=2 or µ=3, and µ is the SCS configuration for the active UL BWP.

A UE does not transmit a PUSCH in a PUSCH occasion if the PUSCH occasion associated with a DMRS resource is not mapped to a preamble of valid PRACH occasions or if the associated PRACH preamble is not transmitted. A UE can transmit a PRACH preamble in a valid PRACH occasion if the PRACH preamble is not mapped to a valid PUSCH occasion.

A mapping between one or multiple PRACH preambles and a PUSCH occasion associated with a DMRS resource is per PUSCH configuration.

A UE determines time resources and frequency resources for PUSCH occasions in an active UL BWP from msgA-PUSCH-Config for the active UL BWP. If the active UL BWP is not the initial UL BWP and msgA-PUSCH-Config is not provided for the active UL BWP, the UE uses the msgA-PUSCH-Config provided for the initial UL BWP.

For mapping one or multiple preambles of a PRACH slot to a PUSCH occasion associated with a DMRS resource, a UE determines a first slot for a first PUSCH occasion in an active UL BWP from msgA-PUSCH-TimeDomainOffset that provides an offset, in number of slots in the active UL BWP, relative to the start of a PUSCH slot including the start of each PRACH slot. The UE does not expect to have a PRACH preamble transmission and a PUSCH transmission with a msgA in a PRACH slot or in a PUSCH slot, or to have overlapping msgA PUSCH occasions for a MsgA PUSCH configuration. The UE expects that a first PUSCH occasion in each slot has a same SLIV for a PUSCH transmission that is provided by startSymbolAndLengthMsgA-PO or msgA-PUSCH-timeDomainAllocation.

Consecutive PUSCH occasions within each slot are separated by guardPeriodMsgA-PUSCH symbols and have same duration. A number $N_t$ of time domain PUSCH occasions in each slot is provided by nrofMsgA-PO-perSlot and a number $N_s$ of consecutive slots that include PUSCH occasions is provided by nrofSlotsMsgA-PUSCH.

A UE can be provided a DMRS configuration for a PUSCH transmission in a PUSCH occasion in an active UL BWP by msgA-DMRS-Config.

A UE can be provided an MCS for data information in a PUSCH transmission for a PUSCH occasion by msgA-MCS.

A PUSCH transmission can use a same spatial filter as an associated PRACH transmission.

A UE can determine whether or not to apply transform precoding for a MsgA PUSCH transmission.

A PUSCH occasion for PUSCH transmission is defined by a frequency resource and a time resource and is associated with a DMRS resource. The DMRS resources are provided by msgA-DMRS-Config.

Each consecutive number of $N_{preamble}$ preamble indexes from valid PRACH occasions in a PRACH slot (first, in increasing order of preamble indexes within a single PRACH occasion; second, in increasing order of frequency resource indexes for frequency multiplexed PRACH occasions; and third, in increasing order of time resource indexes for time multiplexed PRACH occasions within a PRACH slot) are mapped to a valid PUSCH occasion and the associated DMRS resource (first, in increasing order of frequency resource indexes $f_{id}$ for frequency multiplexed PUSCH occasions; second, in increasing order of DMRS resource indexes within a PUSCH occasion, where a DMRS resource index $DMRS_{id}$ is determined first in an ascending order of a DMRS port index and second in an ascending order of a DMRS sequence index; third, in increasing order of time resource indexes $t_{id}$ for time multiplexed PUSCH occasions within a PUSCH slot; and fourth, in increasing order of indexes for $N_s$ PUSCH slots). Here, $N_{preamble}$=ceil $T_{preamble}/T_{PUSCH}$), $T_{preamble}$ is a total number of valid PRACH occasions per association pattern period multiplied by the number of preambles per valid PRACH occasion provided by rach-ConfigCommonTwoStepRA, and $T_{PUSCH}$ is a total number of valid PUSCH occasions per PUSCH configuration per association pattern period multiplied by the number of DMRS resource indexes per valid PUSCH occasion provided by msgA-DMRS-Config.

For Msg1/PRACH, a UE Tx beam/spatial transmission filter can be up to UE implementation.

For Msg2/RAR, a UE Rx beam can be same as a UE Rx beam for reception of DL RS associated with PRACH. If the UE detects a DCI format 1_0 with CRC scrambled by the corresponding RA-RNTI and LSBs of a SFN field in the DCI format 1_0, if included and applicable, are same as corresponding LSBs of the SFN where the UE transmitted the PRACH, and the UE receives a transport block in a corresponding PDSCH, the UE may assume same DM-RS antenna port quasi co-location properties as for a SS/PBCH block or a CSI-RS resource the UE used for PRACH association, regardless of whether or not the UE is provided TCI-State for the CORESET where the UE receives the PDCCH with the DCI format 1_0.

For Msg2/RAR PDSCH, an MCS is provided in a scheduling DCI format 1_0 that is carried by Msg2/RAR PDCCH. In response to a PRACH transmission, a UE attempts to detect a DCI format 1_0 with CRC scrambled by a corresponding RA-RNTI during a window controlled by higher layers. The window starts at the first symbol of the earliest CORESET the UE is configured to receive PDCCH for Type1-PDCCH CSS set that is at least one symbol after the last symbol of the PRACH occasion corresponding to the PRACH transmission, where the symbol duration corresponds to the SCS for Type 1-PDCCH CSS set. The length of the window in number of slots, based on the SCS for Type1-PDCCH CSS set, is provided by ra-Response Window.

For Msg3/A PUSCH, a UE Tx beam can be up to UE implementation, or can be same as a UE Tx beam for Msg1/A PRACH or can be same as a refined Rx beam that the UE used for Msg2/RAR reception.

For Msg3 PUSCH in 4-step RACH, an MCS is indicated in a RAR UL grant that is carried by Msg2/RAR PDSCH. For MsgA PUSCH in 2-step RACH, higher layer signaling such as SIB or RRC configures an MCS for MsgA-PUSCH.

For Msg4 PDSCH, UE can use a same UE Rx beam that the UE used for reception of the DL RS associated with PRACH. When detecting a DCI format in response to a PUSCH transmission scheduled by a RAR UL grant, or corresponding PUSCH retransmission scheduled by a DCI format 0_0 with CRC scrambled by a TC-RNTI provided in the corresponding RAR message, the UE may assume the PDCCH carrying the DCI format has the same DM-RS antenna port quasi co-location properties as for a SS/PBCH block the UE used for PRACH association, regardless of whether or not the UE is provided TCI-State for the CORE-SET where the UE receives the PDCCH with the DCI format.

For Msg4 PDSCH, an MCS is indicated in a scheduling DCI format 1_0 that is carried by Msg4 PDCCH.

PRACH enhancements can be considered, including multiple PRACH transmissions with the same beam, multiple PRACH transmissions with different beams, and PRACH enhancements with finer beam based on CSI-RS resources configured during initial access.

Msg4 PDSCH enhancements can be considered, including early CSI on Msg3 PUSCH for early link adaptation based on CSI-RS resources configured during initial access, scaling factor for TBS determination and PDSCH repetition.

Beam reporting during initial/random access procedure is intended to enhance Msg3 re-transmission, Msg4 initial transmission, Msg4 re-transmission and PDSCH out of RACH procedure while without dedicated RRC configuration. Beam reporting during initial/random access procedure can include reporting a best SSB beam, alternative SSB beam, or early CSI report in Msg3 PUSCH based on CSI-RS resources configured during initial access, as well as beam indication for the following steps for RACH procedure.

The following embodiments of the present disclosure, denoted as E-7, describe CSI reports on PRACH. This is described in following examples and embodiments such as those of FIGS. 17A-17B.

Figure 17A:
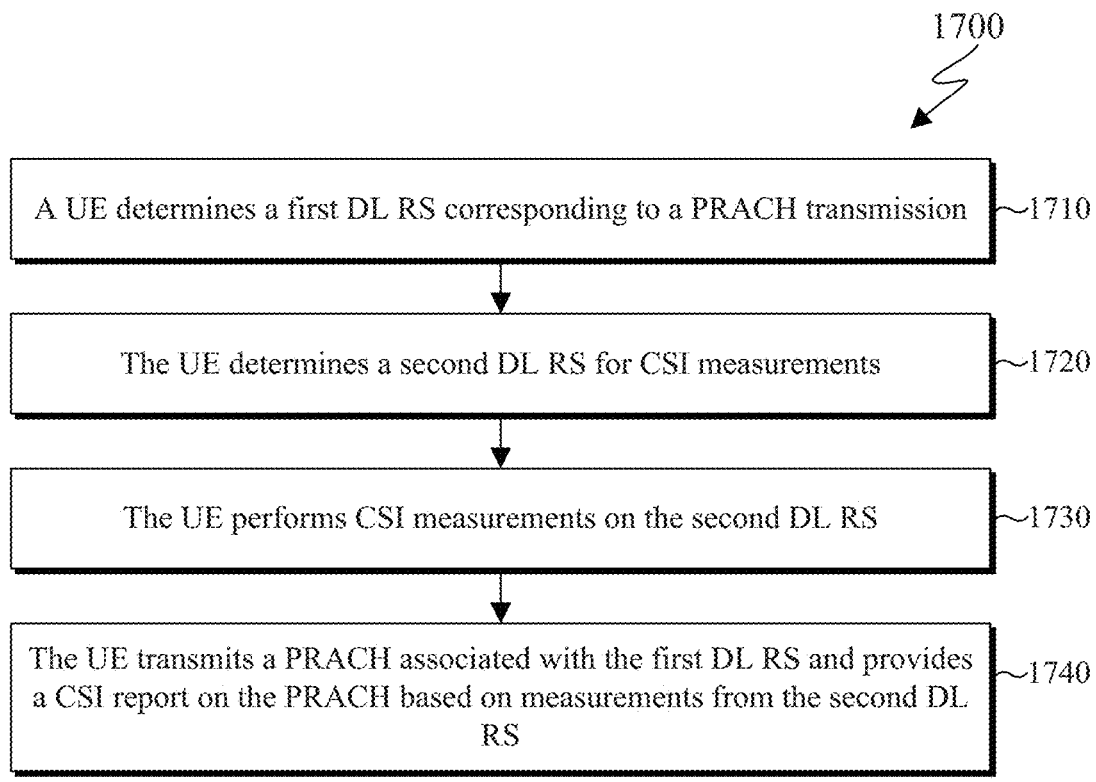
FIG. 17A illustrates an example method for channel state information (CSI) reporting on physical random access channel (PRACH) according to embodiments of present disclosure.
Figure 17B:
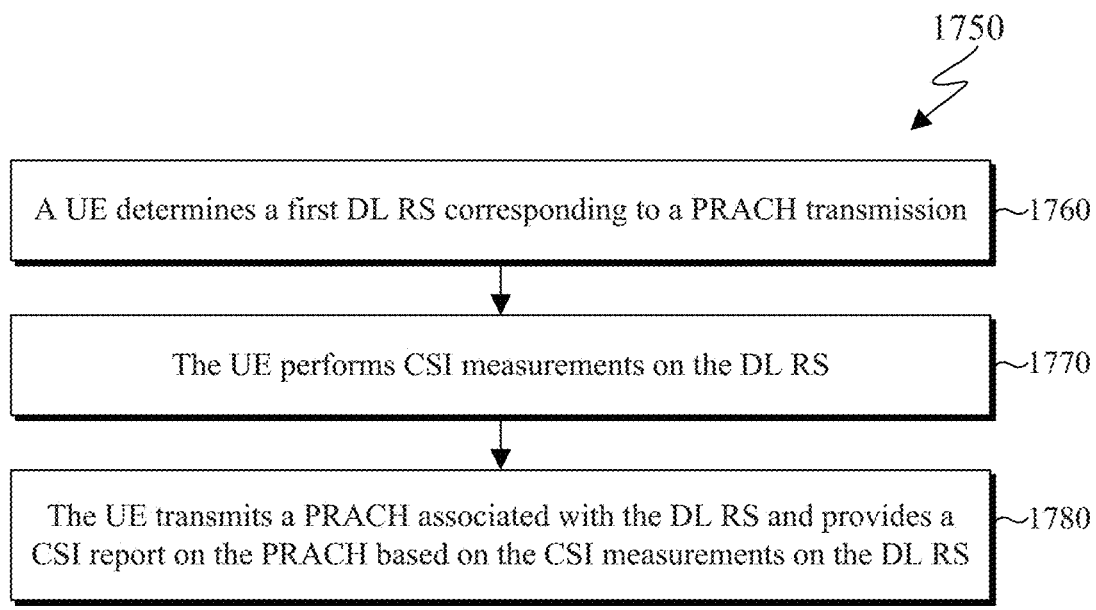
FIG. 17B illustrates another method for CSI reporting on PRACH according to embodiments of present disclosure.

FIG. 17A illustrates an example method 1700 for CSI reporting on PRACH according to embodiments of present disclosure. FIG. 17B illustrates another method 1750 describing a flowchart for CSI reporting on PRACH. The steps of the methods 1700 and 1750 can be performed by any of the UEs 111-116 of FIG. 1, such as the UE 116 of FIG. 3. The methods 1700 and 1750 are for illustration only and other embodiments can be used without departing from the scope of the present disclosure.

In certain embodiments, a UE (such as the UE 116) includes a channel state information (CSI) report in a PRACH transmission, wherein a PRACH transmission can refer to a Msg1 PRACH for a 4-step RACH (Type-1 random access) or MsgA PRACH for a 2-step RACH (Type-2 random access). Such reporting can be beneficial for link adaptation, MCS selection, or beam management during initial access, such as for a selection of a number of control channel elements (CCEs) for Msg2/B PDCCH, or MCS selection for Msg2/B PDSCH, or MCS selection for Msg3/A PUSCH, and the like.

Various options can be considered for CSI reporting in a PRACH, such as (i) a full CSI report, including one or more of RI, (T) PMI, CQI, LI, and the like; (ii) a compact CSI, such as only a CQI with a number of X bits, such as X=1, 2, 3, 4, 5 bits; and (iii) an indication for an RSRP range, such as an indication for one range from among a number of N=2, 4, 8, 16, 32 (equally-spaced) RSRP ranges within (−5 . . . 23) dBm.

Other examples for a CSI report in a PRACH can include an indication of an SINR range, or other channel quality metrics.

In one example, a CSI report can be with respect to a predetermined MCS table, such as a predetermined MCS table in the system operation specifications or a MCS table configured by higher layers such as by SIB1, or a subset thereof, for example, a first/last M=2, 4, 8, 16, 32 rows within such a table, or a predetermined or (pre-)configured set of M=2, 4, 8, 16, 32 non-consecutive rows within such a table.

In all examples above, the parameters X, N, or M can be predetermined in the system specifications or provided by higher layers.

There are a number of options in terms of the DL RS used for measurements by a UE to obtain the CSI report included in the PRACH. In one realization, a CSI report in a PRACH corresponds to measurements of an SSB, such as an SSB associated with the PRACH transmission, or an alternative SSB such as an SSB with index within a same SSB burst set or a different SSB burst set, that is configured for measurement by higher layer signaling or determined by UE implementation. For example, a UE can detect a first SSB index and a second SSB index from a same SSB burst set and transmit a PRACH associated with the first SSB index, for example on an RO associated with the first SSB index. In this example, a CSI report on the PRACH can correspond to measurements of the first SSB index or the second SSB index or both SSB indexes, including two CSI reports, or a CSI report corresponding to both SSB indices, such as corresponding to average of the measurements on the two SSB indices.

In another realization, a CSI report in the PRACH can be with respect to a CSI-RS resource that may or may not be associated with the PRACH transmission. In one example, for a PRACH transmission associated with a CSI-RS, such as for a RA in connected mode including a CERA or a RA for BI-R, a CSI report can correspond to the CSI-RS associated with the PRACH. In another example, for the case of RA from a UE that is not in connected mode, such as a RA for initial access or for connection re-establishment after RLF, a CSI report in the PRACH can correspond to a cell-specific NZP CSI-RS configured on the initial BWP. Such configuration can be provided by higher layers such as by SIB or common RRC configuration. According to this example, the PRACH transmission can be with respect to an SSB or the cell-specific NZP CSI-RS. In one example, the cell-specific NZP CSI-RS can be QCL, such as with QCL Type-D, with the SSB that is associated with the PRACH transmission. In one example, there can be a number of NZP CSI-RS resources associated with each SSB index, such as two or four NZP CSI-RS resources for each SSB index, and the UE determines one (or multiple) of the NZP CSI-RS resources based on which SSB index the UE can detect.

Accordingly, a CSI report in the PRACH can include only a "one-dimensional" CSI report, such as only the CQI report, or it can be a "two-dimensional" CSI report wherein an indication for the DL RS is provided in addition to the CSI/CQI report. For example, a CQI report can be provided together with a corresponding SSB resource indicator (SSBRI), or with CSI-RS resource indicator (CRI) corresponding to the CSI-RS used for measurements in obtaining the CSI report. In one example, a "two-dimensional" CSI report can be enabled or disabled. For example, a two-dimensional CSI report can be enabled when a UE has at least B bits such as B=4, 5 bits available for CSI reporting on PRACH, depending on the method used for CSI report, as described in the following embodiments.

There are various methods for CSI reporting on PRACH as described in the following embodiments. Several methods may be based on extension of PRACH resources/sequences/features so that CSI report can be conveyed on the extended PRACH. Several methods may be based on partitioning or splitting or restricting PRACH resources/sequences/features so that each value for the CSI report can be mapped to one of the multiple of partitions. A PRACH resource/sequence/feature can include one or more of a RACH occasion (RO), a PRACH preamble, a base sequence for PRACH preamble, a cyclic shift for PRACH preamble, and the like, as further discussed in the following embodiments.

A UE (or a group of UEs or the entire set of UEs in a serving cell) may be configured/indicated one or multiple methods for CSI reporting on PRACH. In one example, a single method for CSI reporting on PRACH can be specified in the system operation.

In another example, multiple methods can be specified in the system operation and higher layer signaling (such as SIB or common RRC configuration) configures one of the specified methods for CSI reporting on PRACH for all UEs in a cell.

In yet another example, multiple methods for CSI reporting on PRACH can be specified in the system operation or indicated by higher layer configuration, and a selection of a method from the multiple methods can be based on one or more of: a PRACH preamble format, a PRACH overhead for example based on a PRACH resource configuration in time or frequency for legacy or enhanced UEs, an operating frequency range, a duplex mode such as TDD or frequency division duplexing (FDD) for the serving cell, a target/minimum/maximum number of CSI report values or value ranges, a UE capability (or a number of UE capabilities) or up to UE implementation. In such cases, the UE may need to indicate to the gNB which method the UE used for CSI reporting in PRACH. For example, a first method may be used for a first PRACH preamble or a first PRACH resource configuration, while a second methods may be used for a second PRACH preamble or a second PRACH resource configuration.

It is noted that, a configuration of extensions or partitions of PRACH resources/sequences/features cannot constrain PRACH operation and usage of PRACH resources/sequences/features for legacy UEs. In one example, the configuration of extensions or partitions of PRACH resources/sequences/features for CSI reporting by non-legacy UEs can be at least partially different from a configuration of PRACH resources/sequences/features for legacy UEs, so that the gNB can be able to distinguish legacy UEs with PRACH transmission only from non-legacy UEs that aim to report CSI in addition to a PRACH transmission.

The present embodiment distributes UEs into multiple groups, based on respective reported CSI values. For example, with a configuration of 4 extensions or partitions of PRACH resources/sequences/features, UEs are distributed into 4 groups with 4 different channel quality levels/ranges, or different "geometries". In one example, a configuration of extended (or partitioned) PRACH resources/sequences/features applies only to enhanced UEs, for example using a new SIB or a SIB extension or a new RRC configuration or an extended RRC configuration that is readable only by enhanced UEs and is separate from or non-overlapping with a configuration of PRACH resources/sequences/features for legacy UEs. Herein, enhanced UEs refer to UEs with a capability for CSI reporting by PRACH.

Therefore, depending on the selection of PRACH resources/sequences/features, the gNB can distinguish legacy UEs from enhanced UEs. For example, there will be effectively 4+1=5 groups of UEs, including 4 groups of enhanced UEs and a group of legacy UEs.

In one example, higher layer signaling such as a SIB can indicate a different BWP to enhanced UEs.

In another example, a configuration of PRACH resources/sequences/features for legacy UEs is shared with one of multiple extensions or partitions of PRACH resources/sequences/features for enhanced UEs. For example, legacy UEs operate in a first or a last time/frequency resource group, which is configured by SIB for all UEs in the cell. For example, legacy UEs can be in a same group as enhanced UEs with the worst channel quality or "geometry". In another example, legacy UEs can be in a same group as enhanced UEs with the best channel quality or "geometry". Accordingly, some ROs or PRACH resources/sequences/features are used for legacy or default CSI/CQI/MCS indication, while other ROs or PRACH resources/sequences/features are used for indication of new CSI/CQI/MCS values.

CSI reporting on PRACH can be beneficial for a variety of scenarios. A UE performing initial access before RRC connection, or resuming RRC connection from RRC Inactive state, or re-stablishing RRC connection after RLF, can benefit from CSI measurement and reporting on PRACH for link adaptation or coverage enhancement of Msg2/RAR PDCCH or PDSCH, or Msg3/A PUSCH, or Msg4/B PDCCH or PDSCH, or retransmission or repetitions thereof. CSI reporting on PRACH can be also beneficial for connected mode UEs, for example for PRACH transmission due to link failure recovery procedure (beam failure recovery or BFR), wherein the UE can report a channel quality for a new candidate beam to the gNB using the PRACH transmission.

In one example, the gNB may combine a CSI report by the UE on a PRACH transmission with other channel quality information metrics available to the gNB, such as a received power of the PRACH preamble, or a propagation or round-trip delay/time determined based on a received value of a cyclic shift of the PRACH preamble, or a reception time of the PRACH preamble.

FIG. 17A illustrates the method 1700 describing a flowchart for CSI reporting on PRACH. FIG. 17B illustrates another method 1750 describing a flowchart for CSI reporting on PRACH.

In step 1710, a UE (such as the UE 116) determines a first DL RS corresponding to a PRACH transmission. The first DL RS can be an SSB. In step 1720, the UE determines a second DL RS for CSI measurements. The second DL RS can be same as the first DL RS or can be different from the first DL RS, for example, a NZP CSI-RS. In step 1730, the UE performs CSI measurements on the second DL RS. In step 1740, the UE transmits a PRACH associated with the first DL RS and provides a CSI report on the PRACH based on the measurements from the second DL RS.

For method 1750 of FIG. 17B, a UE (such as the UE 116) determines a DL RS corresponding to a PRACH transmission (step 1760). The DL RS can be an SSB or a CSI-RS. In step 1770, the UE performs CSI measurements on the DL RS. In step 1780, the UE transmits a PRACH associated with the DL RS and provides a CSI report on the PRACH based on the CSI measurements on the DL RS.

In one realization, the UE can report a valid, but reduced, CSI value on a PRACH transmission. For example, when the UE attempts to transmit a first PRACH with a first CSI report value, and the UE does not receive a RAR in response to the first PRACH transmission, the UE can transmit a second PRACH with a second CSI report value, wherein the second report CSI value is smaller than the first CSI report value. For example, the UE can report a smaller CQI value or a smaller MCS value or a smaller RSRP/SINR range, and the like. The smaller CSI value can be an immediately next smaller value to the original CSI report value in a previous PRACH transmission as described in the following. Such UE behavior can be beneficial to decrease the PRACH collision probability or PRACH latency when reporting CSI on PRACH.

Since a gNB may need to partition PRACH configuration parameters based on a set of possible CSI report values, a category/set of PRACH configuration parameters associated with each CSI report value may be constrained, thereby leading to an increase in a PRACH collision probability or PRACH latency when reporting CSI on PRACH. Herein, a category/set of PRACH configuration parameters for CSI reporting can include a group of time/frequency resources, such as a group of RACH occasions (ROs) or a BWP, or a group of PRACH preambles, or a set of cyclic shifts or root sequence, or a set of phase modulation parameters, and the like, for PRACH transmission. In such cases, the UE can report a smaller CSI value that is mapped to a different category/set of PRACH configuration parameters. Such flexibility for PRACH resource selection can mitigate a persistent PRACH collision while maintaining a benefit from early CSI reporting on PRACH.

In one example, the specification for system operation or higher layer configuration can provide information or conditions for when a UE is allowed to report a smaller CSI value or for how the UE selects a smaller CSI report value. For example, the UE can be provided a parameter 'N' for a number of PRACH transmissions that the UE does not receive a corresponding RAR message, wherein each PRACH transmission from the number of PRACH transmission is associated with a same CSI report value before the UE transmits a PRACH associated with a smaller CSI report value. In another example, the UE can be provided a parameter 'L' for a maximum number of levels the UE can reduce a CSI report value on PRACH. For example, the UE attempt a first 'N' times of PRACH transmission associated with a first CSI report value, and when the UE does not receive a corresponding RAR, the UE can attempt a second 'N' times of PRACH transmission associated with a second CSI report value that is one level below the first CSI report value. The UE can continue reducing a CSI report value until an L-th 'N' times of PRACH transmission associated with a L-th CSI report value, which is (L−1) levels lower than the first CSI report value. When the UE does not receive a RAR after all L*N PRACH transmissions, in a first option, the UE stops the RA procedure and reports a failed RA procedure to higher layers. In a second option, the UE continues to transmit PRACH using the PRACH configuration parameters associated with the L-th CSI report value without any further reduction of the CSI report value. In a third option, the UE can discard CSI reporting on PRACH, and transmit PRACH without a CSI report as for a legacy UE, or the UE can use all possible PRACH configuration parameters without any constraint.

In one example, when the UE reports a smaller CSI value, the UE can select a PRACH configuration parameter from a union of parameter values associated with both the larger CSI report value and the smaller CSI value. For example, the UE can be provided a first BWP/RO group/PRACH preamble group for reporting a first CSI value using a PRACH transmission and a second BWP/RO group/PRACH preamble group for reporting a second CSI value using a PRACH transmission. When the UE does not receive a RAR after a first PRACH transmission (or after first 'N' PRACH transmissions), the UE can select a BWP or a RO or a PRACH preamble from among the union of the first BWP/RO group/PRACH preamble group and the second BWP/RO group/PRACH preamble group. Such selection expands the set of allowed PRACH configuration parameter values when reporting a smaller CSI value using a PRACH as the UE can use both the original and the additional PRACH resources for the PRACH transmission.

Although FIGS. 17A and 17B illustrates the methods 1700 and 1750 various changes may be made to FIGS. 17S 17A and 17B. For example, while the methods 1700 and 1750 are shown as a series of steps, various steps could overlap, occur in parallel, occur in a different order, or occur multiple times. In another example, steps may be omitted or replaced by other steps. For example, steps of the methods 1700 and 1750 can be executed in a different order.

The following embodiments of the present disclosure, denoted as E-8, describe CSI reports on PRACH using time/frequency resource groups for PRACH. This is described in following examples and embodiments such as those of FIG. 18.

Figure 18:
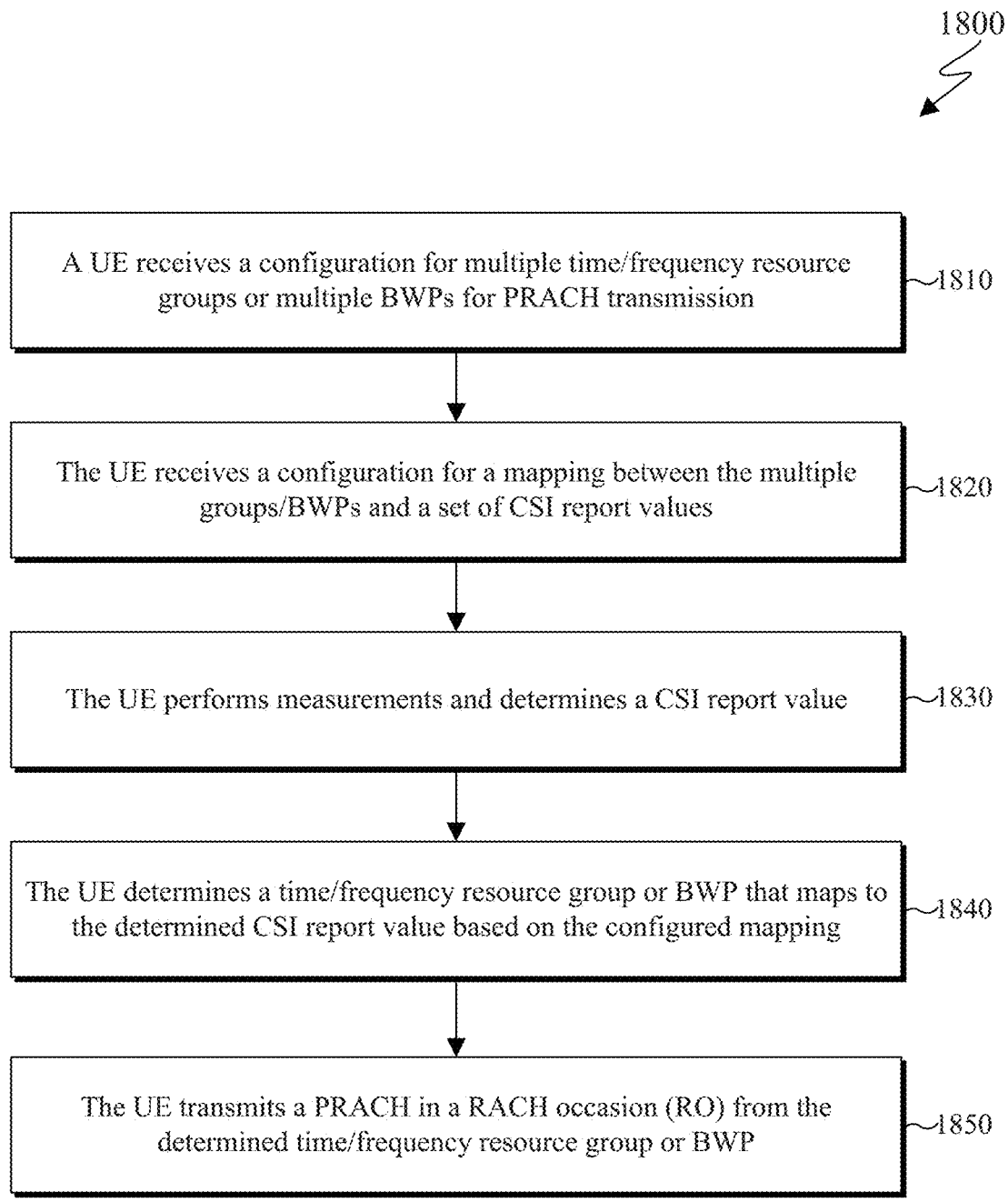
FIG. 18 illustrates an example method for CSI reporting in a PRACH transmission using multiple groups of time/frequency resource groups or multiple bandwidth parts (BWP) according to embodiments of present disclosure.

FIG. 18 illustrates an example method 1800 for CSI reporting in a PRACH transmission using multiple groups of time/frequency resource groups or multiple BWP according to embodiments of present disclosure. The steps of the method 1800 can be performed by any of the UEs 111-116 of FIG. 1, such as the UE 116 of FIG. 3. The method 1800 is for illustration only and other embodiments can be used without departing from the scope of the present disclosure.

In certain embodiments, a UE (such as the UE 116) indicates a CSI value range by a PRACH transmission based on a selection of time/frequency resources for the PRACH transmission. The UE can be configured with a number of groups of time/frequency resources for PRACH transmission, wherein a CSI value range is mapped to one of the time/frequency resource groups. A higher layer configuration such as a SIB can indicate a mapping between CSI values and PRACH time/frequency resource groups and a mapping between CSI values and parameters such as a MCS value or an RSRP range. MCS values used for the mapping to CSI values can be non-consecutive MCS entries from a predetermined MCS table in order to reduce a required number of bits for the CSI report. Therefore, when the UE transmits a PRACH in a RACH occasion (RO) from a first time/frequency resource group, the UE indicates a first value range for CSI report, and when the UE transmits a PRACH in an RO from a second time/frequency resource group, the UE indicates a second value range for CSI report. The multiple frequency resource groups can be in a same BWP or in different BWPs. A similar procedure can be used to determine or indicate a number of repetitions for DL receptions or UL transmissions following the PRACH transmission.

In one realization, the UE can be configured with multiple sets of frequency resources for PRACH transmission, such as with RACH occasions (ROs) in one of 4,8, or 16 (equally spaced) groups of RBs in the frequency domain in an initial UL BWP. For example, for an initial UL BWP of size 48 RBs and considering short PRACH preambles, such as for operation above 6 GHz, there can be 4 groups of frequency domain resources corresponding to 4 CSI value ranges: a first 12 RBs corresponding to a first CSI value range, a second 12 RBs corresponding to a second CSI value range, a third 12 RBs corresponding to a third CSI value range, and the last 12 RBs corresponding to a fourth CSI value range. Accordingly, when the UE selects a RACH occasion (RO) in the first 12 RBs, the UE indicates a first CSI value range, and the like. In one example, one set of the multiple sets of frequency resources for PRACH transmission is same as or includes a set of frequency resources for RACH occasions for legacy UEs. In another example, all of the multiple sets of frequency resources for PRACH transmission are different from the set of frequency resources for RACH occasions for legacy UEs. In another example, the frequency resources for PRACH transmission from UEs providing a CSI report through a PRACH transmission are in a different UL BWP than an UL BWP used by legacy UEs for PRACH transmissions.

In one example, an SSB-to-RO mapping is configured or determined separately for each time/frequency resource groups or for each CSI value range group. In another example, an SSB-to-RO mapping is configured or determined jointly across all time/frequency resource groups or CSI value ranges.

In one example, a serving cell configuration such as a SIB or RRC configuration can include two PRACH configurations. A first PRACH configuration can be applicable to legacy UEs and possibly some enhanced UEs, such as those enhanced UEs with a default CSI report value range such as with a lowest/highest RSRP or SINR range. A second PRACH configuration can be applicable to enhanced UEs that do not correspond to the default CSI report value range such as not with the lowest/highest RSRP or SINR range. The two PRACH configurations can be independent or can be related, for example, the ROs for the two PRACH configurations can be non-overlapping/non-contiguous or contiguous. For example, for a case with 4 ROs mapped to an SSB, a first PRACH configuration uses one RO per slot, while the second PRACH configuration uses the next 3 contiguous ROs per slot.

In one realization, if a UE has a PRACH configuration with one SSB mapped to multiple ROs, the UE can indicate a CSI report value range by transmitting a PRACH in one of the multiple ROs associated with the SSB. For example, if a higher layer parameter ssb-perRACH-OccasionAndCB-PreamblesPerSSB provides a number N<1 of SS/PBCH block indexes associated with one PRACH occasion, one SS/PBCH block index is mapped to 1/N consecutive valid PRACH occasions, then the UE can indicate a total of 1/N CSI report values. In one example, if N=4, the UE can indicate 4 CSI report values.

In another realization, the UE may be configured with multiple BWPs, wherein each BWP corresponds to one CSI value, such as 4 initial BWPs corresponding to 4 CQI values or 4 RSRP ranges. Accordingly, when the UE selects an RO in a first BWP, the UE indicates a first CSI value, and when the UE selects an RO in a second BWP, the UE indicates a second CSI value, and the like. In one example, a BWP from the multiple BWPs is same as an initial BWP configured to legacy UEs. In another example, all the multiple BWPs are different from the initial BWP configured to legacy UEs.

In yet another realization, a combination of the previous approaches can be used. For example, a UE may be configured with multiple BWPs, for example by SIB1, and each BWP can be partitioned into multiple frequency resource groups. In one example, the UE can be configured with two BWPs, and each BWP can be configured with two frequency resource groups, for a total of 4 groups across the two BWPs that can correspond to 4 CSI values.

In one realization, if a UE is configured with multiple uplink carriers on a cell, the UE can be configured with the multiple frequency domain groups or multiple BWPs separately on each of the uplink carriers or jointly across all uplink carriers. For example, when a UE is configured with a normal uplink carrier (NUL) and a supplementary uplink carrier (SUL), the UE can be configured with a first set of 4 BWPs or 4 frequency domain resource groups on the NUL, and a second set of 4 BWPs or 4 frequency domain resource groups on the SUL for a total of 8 groups corresponding to 8 different CSI report values or 8 RSRP ranges. In one example, the CSI value mapping or the RSRP range configuration on the NUL and SUL are aligned with an RSRP threshold value that is used for determination of an uplink carrier for PRACH transmission. For example, the first set of 4 BWPs or 4 frequency domain resource groups on the NUL correspond to 4 RSRP ranges above the RSRP threshold (or corresponding CSI/CQI/MCS values), and the second set of 4 BWPs or 4 frequency domain resource groups on the SUL correspond to 4 RSRP ranges below the RSRP threshold (or corresponding CSI/CQI/MCS values).

In one realization, a UE can be configured with multiple groups of time-domain resources wherein each group is associated with a CSI value. For example, the UE can be configured with a first group of ROs in even time slots (i.e., $T\_\{RO\}$ mod 2=0) and a second group of ROs in odd time slots (i.e., $T\_\{RO\}$ mod 2=1), wherein $T\_\{RO\}$ is a time slot in which the RO is configured. According to this example, when a UE transmits a PRACH in a RO in an even time slot, the UE indicates a first CSI value, and when the UE transmits a PRACH in an RO in an odd time slot, the UE indicates a second CSI value. In another example, there can be N=4, 8, 16, 32 groups of time resource, using $T\_\{RO\}$ mod N=0, 1, . . . , (N−1).

In another realization, a combination of time and frequency domain methods can be used, for example, a number of time-and-frequency resource groups, each group corresponding to a set of time domain resources, such as even or odd slots, as well as frequency domain resources, such as one of 4 BWPs.

In certain embodiments, to reduce inter-cell PRACH collision and increase a re-use factor for RACH occasions or various other PRACH resources/sequences/features, a first gNB (such as the BS 102) can indicate a mapping of time/frequency resources with CSI values configured in a first cell to a second gNB operating a second cell, such as a neighbor cell or a close in proximity of the first cell that is operating in a same frequency band. The indication can be over the Xn interface and can be an information exchange between gNB about their PRACH configuration. The second gNB/cell can consider such mapping information when configuring PRACH resources/sequences/features, for example, by excluding PRACH resources/sequences/features or by configuring PRACH resources/sequences/features to minimize inter-cell PRACH collision. For example, when a first time/frequency resource group in the first cell corresponds to a small CQI value or a small RSRP range, the time/frequency resource group is likely to be used by UEs at the edge of the first cell and inter-cell PRACH collisions are more likely. Therefore, the second cell/gNB can avoid configuring ROs in the first time/frequency resource group, at least for UEs at the edge of the second cell (low SINR UEs). Conversely, when a second time/frequency resource group in the first cell corresponds to a large CQI value or a large RSRP range, second time/frequency resource group is more likely to be used by UEs in the center of the first cell and is therefore less likely to create inter-cell PRACH collision. Therefore, the second gNB may re-use ROs in the second time/frequency resource group for UEs in the edge of the second cell or possibly for all UEs in the second cell.

FIG. 18 illustrates the method 1800 describing a flowchart for CSI reporting in a PRACH transmission using multiple groups of time/frequency resource groups or multiple BWPs.

In step 1810, a UE (such as the UE 116) receives a configuration for multiple time/frequency resource groups or multiple BWPs for PRACH transmission. in step 1820, the UE receives a configuration for a mapping between the multiple time/frequency resource groups or multiple BWPs and a set of CSI report values. For example, the set of CSI report values can include indications for CQI values from an MCS table, or indications of RSRP ranges, and the like. In step 1830, the UE performs measurements and determines a CSI report value. For example, the measurements can be based on a SSB associated with a PRACH transmission, or on a NZP CSI-RS configured for CSI measurements, RA beam management, or associated with PRACH transmission. In step 1840, the UE determines a time/frequency resource group or BWP from the multiple time/frequency resource groups or multiple BWPs, that maps to the determined CSI report value based on the configured mapping. In step 1850, the UE transmits a PRACH in a RACH occasion (RO) from the determined time/frequency resource group or BWP, thereby indicating a CSI report value.

Although FIG. 18 illustrates the method 1800 various changes may be made to FIG. 18. For example, while the method 1800 of FIG. 18 is shown as a series of steps, various steps could overlap, occur in parallel, occur in a different order, or occur multiple times. In another example, steps may be omitted or replaced by other steps. For example, steps of the method 1800 can be executed in a different order.

The following embodiments of the present disclosure, denoted as E-9, describe CSI reports on PRACH using PRACH preamble groups. This is described in following examples and embodiments such as those of FIG. 19.

Figure 19:
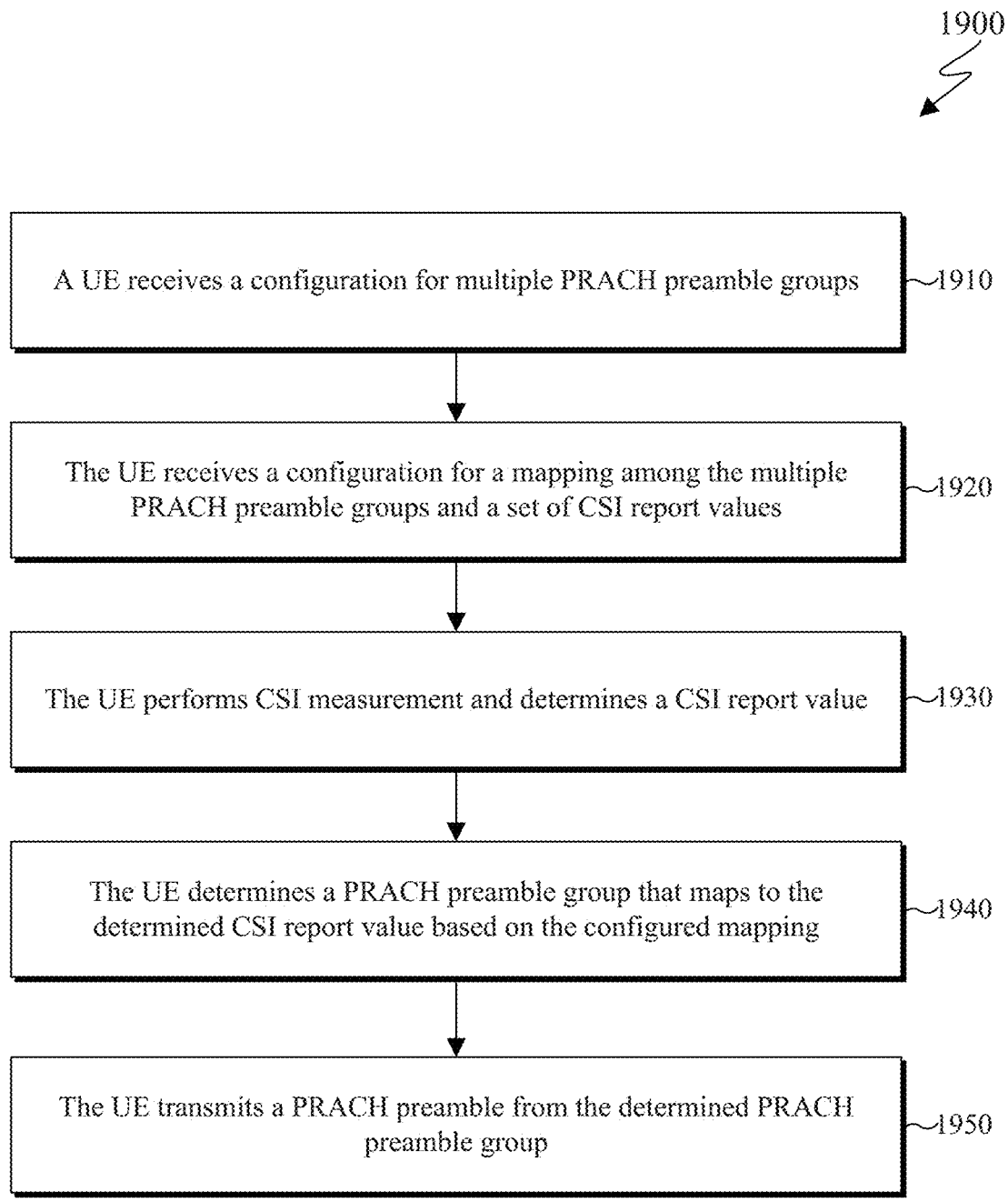
FIG. 19 illustrates an example method for CSI reporting in a PRACH transmission using multiple PRACH preamble groups according to embodiments of present disclosure.

FIG. 19 illustrates an example method 1900 for CSI reporting in a PRACH transmission using multiple PRACH preamble groups according to embodiments of present disclosure. The steps of the method 1900 can be performed by any of the UEs 111-116 of FIG. 1, such as the UE 116 of FIG. 3. The method 1900 is for illustration only and other embodiments can be used without departing from the scope of the present disclosure.

In certain embodiments, a UE can indicate a CSI value in a PRACH transmission by selecting a PRACH preamble from multiple PRACH preamble groups (a higher layer configuration such as a SIB indicates a mapping between CSI values and PRACH preamble groups). Accordingly, the UE can indicate a first CSI report value by transmitting a PRACH preamble from a first PRACH preamble group or indicate a second CSI report value by transmitting a PRACH preamble from a second PRACH preamble group.

In one example, the UE can be configured by higher layers with a number of PRACH preamble groups, each group with M=8 or 16 PRACH preambles, so that transmission of a PRACH preamble from the first M preambles would indicate a first CQI/MCS value, and transmission of a PRACH preamble from the second M preambles would indicate a second CQI/MCS value, and the like. In another example, different PRACH preamble groups can have different sizes, and one of group sizes or PRACH preambles indices, such as a first PRACH preamble index for each group, either the full index or via a bit-map, are configured by higher layers to indicate the multiple PRACH preamble groups. Selection of a size for the PRACH preamble groups can depend, for example, on a distribution of CSI values for the UEs in a serving cell that can in turn depend on a geographical distribution of UEs in the serving cell. For example, if different CSI values are expected to practically be equally likely, such as having a uniform probability distribution, a same size can be used for all PRACH preamble groups. In another example, if CSI values are expected to have a non-uniform probability distribution, such as when some CSI report values are expected to be more likely that some other CSI report values, then different sizes can be assigned to different PRACH preamble groups. For example, a more likely CSI report value can be associated with a PRACH preamble group that includes more PRACH preambles. Such design can lead to a uniform probability distribution for selection of a PRACH preamble and reduce the PRACH collision probability.

In one example, all PRACH preamble groups may be configured with a same size, wherein each preamble group may be mapped to an RSRP or SINR range based on higher layer signaling such as a SIB. Different RSRP or SINR ranges may have same or different size. For example, some RSRP/SINR ranges may be small/narrow, while other RSRP/SINR ranges may be large/wide.

In one example, a set of PRACH preambles or preamble groups configured for CSI reporting (by enhanced UEs) is separate from a set of PRACH preambles configured for legacy UEs. For example, out of 64 possible PRACH preambles, 32 PRACH preambles are configured by higher layer signaling for legacy UEs, and the remaining 32 PRACH preambles are configured for enhanced UEs reporting CSI on PRACH. For example, the remaining 32 PRACH preambles are distributed in 4 groups, each with 8 PRACH preambles, so that 4 CSI report values can be conveyed by the PRACH transmission corresponding to the 4 PRACH preamble groups.

In another example, the 32 PRACH preambles configured for legacy UEs can be additionally used for enhanced UEs having a specific CSI report value. Herein, the specific CSI report value can correspond to a specific CQI/MCS value or a default RSRP range and can be either predetermined in the specifications of the system operation or indicated by higher layers such as by SIB1. For example, the specific value can be a lowest (or highest) CQI/MCS value or RSRP range. Therefore, there can be effectively a total of 4+1=5 PRACH preambles groups, corresponding to the 4 groups of PRACH preambles for non-legacy UEs and a group of PRACH preambles for legacy UEs. For example, the 4 groups of PRACH preambles for non-legacy UEs can indicate 4 higher CQI/MCS values or RSRP ranges compared to the lowest CQI/MCS value or RSRP range.

In yet another example, a total number of PRACH preambles configured for legacy and non-legacy/enhanced UEs can exceed 64 preambles. For example, higher layers such as a SIB can indicate a first set of 64 PRACH preambles for legacy UEs, and a second set of 16 or 32 or 64 PRACH preambles for enhanced UEs, wherein the second set of preambles can be further partitioned into PRACH preamble groups of size 4 or 8 or 16 for CSI report value range indication.

In one example, a combination of PRACH preamble grouping with time/frequency resource groups (as in E-8, above) can be considered. For example, higher layer signaling configures one or multiple different BWPs for enhanced UEs and additionally indicates, for each such BWP, multiple groups of PRACH preambles corresponding to different CSI report values, such as CQI/MCS values or RSRP ranges.

In one example, a PRACH preamble or a PRACH preamble group configured for CSI reporting can be among contention-free preambles (configured for CR-RA), or among contention-based preambles (configured for CB-RA).

In one example, a PRACH preamble group configured for CSI reporting can be associated with a single SSB or associated with multiple SSBs. For example, a PRACH preamble group for CSI reporting can be a subset of CERA preambles associated with an SSB.

In one realization, a grouping of PRACH preambles for CSI reporting can be separate from, or combined with, a grouping of PRACH preambles for indication of (potential) Msg3/A PUSCH payload size. For example, the UE can be configured with a PRACH preamble group A and group B corresponding to a payload size of Msg3/A PUSCH being respectively smaller than or equal to, or larger than, a configured threshold number of bits. In one example, when PRACH preambles groups are configured for CSI reporting, a PRACH preamble grouping for Msg3/A PUSCH payload size is disabled.

In another example, a PRACH preamble grouping for Msg3/A PUSCH payload size only, such as group A and group B, applies to PRACH preambles configured for legacy UEs, and is not applicable to PRACH preamble groups configured for CSI reporting for enhanced/non-legacy UEs.

In yet another example, grouping of PRACH preambles for Msg3/A PUSCH payload size indication also applies to the PRACH preambles configured for CSI reporting by non-legacy UEs. For example, when 32 PRACH preambles out of a total of 64 PRACH preambles are configured for CSI reporting by non-legacy UEs and the 32 preambles are partitioned into 4 groups, each group with 8 preambles, to indicate 4 different CSI report values, a first and a second group can additionally indicate a Msg3/A PUSCH payload size smaller than or equal to a threshold (similar to group A), and a third and a fourth group can additionally indicate a Msg3/A PUSCH payload size greater than a threshold (similar to group B).

In a further example, a two-dimensional grouping of PRACH preambles can be considered, wherein each PRACH preamble group corresponds to a CSI report value from multiple CSI report values as well as a Msg3/A PUSCH payload size from multiple Msg3/A PUSCH payload sizes.

In one realization, an association or linkage of CSI report values with corresponding PRACH preamble groups is configured by higher layer signaling, such as by SIB1. In another realization, the UE determines a PRACH preamble group based on the CSI report value and a randomization factor. For example, the randomization factor can be based on a slot/subframe/frame for PRACH transmission and can also be based on RA-RNTI. For example, the randomization factor can be based on a UE identity such as a UE contention-resolution identity, or a C-RNTI if configured/applicable, or combinations or variations of such values, and the like. A benefit of such randomized selection of the PRACH preamble group is that, UEs with similar CSI report values, such as UEs with similar distances to the gNB receiver, are less likely to experience PRACH collision, since they are more likely to select PRACH preambles from different groups. Such operation can be beneficial to achieve an approximately uniform probability distribution for the use of PRACH preambles, not only among UEs of a serving cell but also among UEs with similar distances to the gNB receiver or UEs with similar channel conditions.

FIG. 19 illustrates the method 1900 describing a flowchart for CSI reporting in a PRACH transmission using multiple PRACH preamble groups.

In step 1910, a UE (such as the UE 116) receives a configuration for multiple PRACH preamble groups. In step 1920, the UE receives a configuration for a mapping among the multiple PRACH preamble groups and a set of CSI report values. For example, the set of CSI report values can include indications for CQI values from an MCS table, or indications of RSRP ranges, and the like.

In step 1930, the UE performs CSI measurement and determines a CSI report value. For example, CSI measurement can be based on an SSB associated with a PRACH transmission, or on a NZP CSI-RS configured for CSI measurements, RA beam management, or associated with PRACH transmission.

In step 1940, the UE determines a PRACH preamble group from the multiple PRACH preamble groups that maps to the determined CSI report value based on the configured mapping. In step 1950, the UE transmits a PRACH preamble from the determined PRACH preamble group.

Although FIG. 19 illustrates the method 1900 various changes may be made to FIG. 19. For example, while the method 1900 of FIG. 19 is shown as a series of steps, various steps could overlap, occur in parallel, occur in a different order, or occur multiple times. In another example, steps may be omitted or replaced by other steps. For example, steps of the method 1900 can be executed in a different order.

The following embodiments of the present disclosure, denoted as E-10, describe CSI reports on PRACH using PRACH cyclic shifts or root sequences. This is described in following examples and embodiments such as those of FIG. 20.

Figure 20:
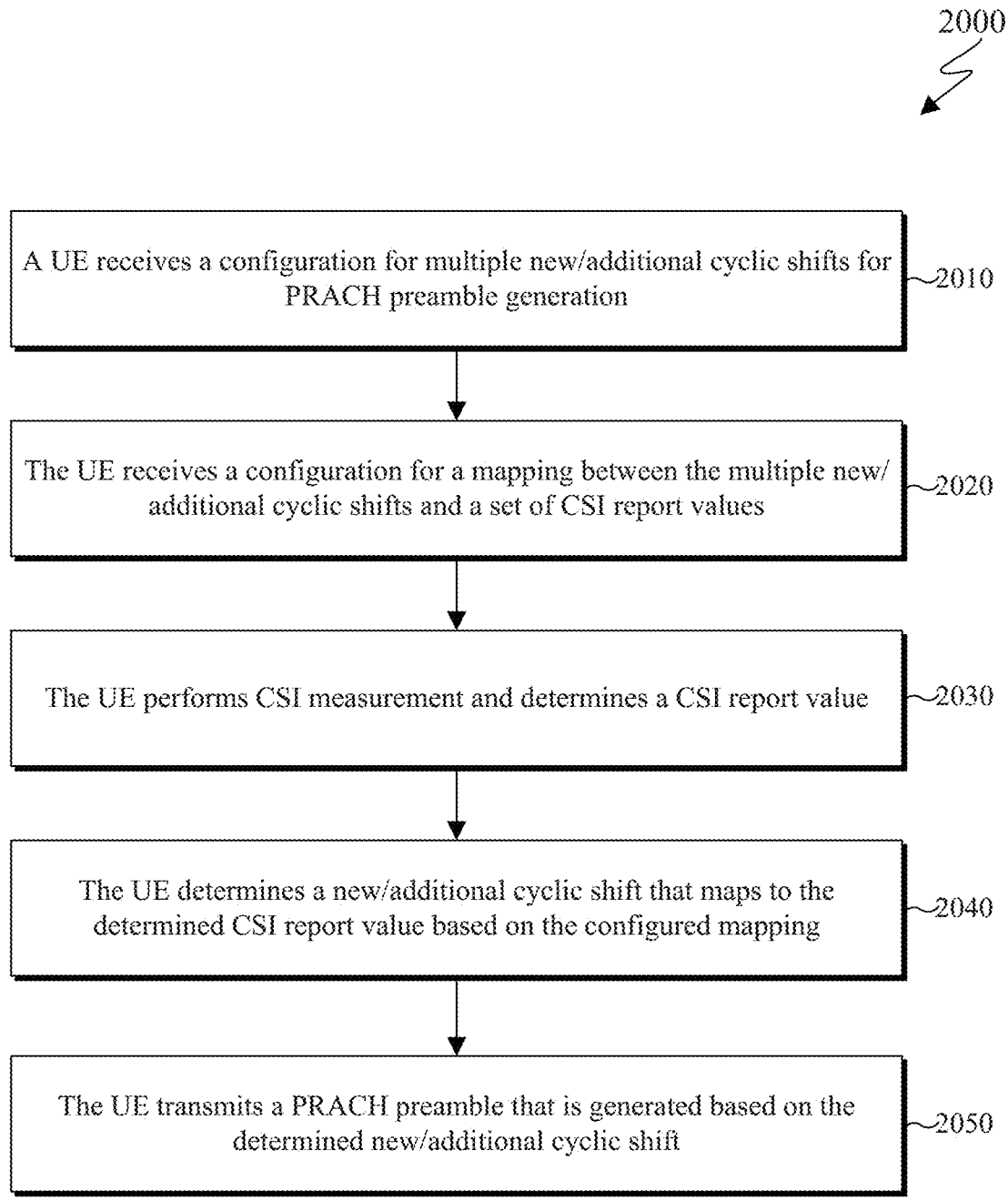
FIG. 20 illustrates an example method for CSI reporting in a PRACH transmission using new/additional cyclic shifts for the PRACH preamble according to embodiments of present disclosure.

FIG. 20 illustrates an example method 2000 for CSI reporting in a PRACH transmission using new/additional cyclic shifts for the PRACH preamble according to embodiments of present disclosure. The steps of the method 2000 can be performed by any of the UEs 111-116 of FIG. 1, such as the UE 116 of FIG. 3. The method 2000 is for illustration only and other embodiments can be used without departing from the scope of the present disclosure.

In certain embodiments, a UE indicates a CSI value in a PRACH transmission by applying a new/additional cyclic shift or root sequence to the PRACH preamble sequence. The UE can be configured by higher layer signaling, such as by SIB1, with a set of new cyclic shifts or root sequences for the PRACH preamble, separate from a cyclic shift or root sequence configured for PRACH sequence generation. The UE can indicate a first CSI report value by not applying a new/additional cyclic shift or applying a first new/additional cyclic shift to the PRACH preamble sequence or indicate a second CSI report value by applying a second new/additional cyclic shift to the PRACH preamble sequence.

In one realization, the UE can be configured with a new higher layer parameter, such as zeroCorrelationZoneConfig-CSI, with a range of integers (0 . . . 3) or (0 . . . 7) or (0 . . . 15), that configures a parameter $N_{CS\_CSI}$ indicating a row in a table with X=4 or 8 or 16 values. Accordingly, the UE can indicate a CSI report value using a corresponding cyclic shift parameter $C_{v\_csi} = v_{CSI} N_{CS\_CSI}$, wherein a value $v_{v\_CSI}$ is mapped to a CSI report value. For example, $v_{CSI}$ can be one of Y=2, 4, 8, 16 values that is mapped to one of 2, 4, 8, 16 CSI report values, such as CQI/MCS values or RSRP/SINR ranges. The value of parameter X relates to the orthogonality of different PRACH preambles, the round-trip time between the UE and the gNB, and can be based at least on the cell size. The value of parameter Y can be based on the granularity of the CSI report transmitted on PRACH and can impact the PRACH detection complexity and reliability at the gNB as well as the PRACH preamble re-use factor and inter-cell PRACH collision.

In one realization, an enhanced/non-legacy UE applies only the new cyclic shift value (for CSI reporting) to the PRACH base sequence to determine the PRACH preamble. Such an approach can maintain a total number of generated PRACH preambles to be same as a legacy number of PRACH preambles, such as 64 PRACH preambles.

In another realization, the enhanced/non-legacy UE applies the new cyclic shift value (for CSI reporting) in addition to a legacy cyclic shift value that is used by legacy UEs. Such an approach may increase a total number of generated PRACH preambles to, for example, 128 preambles, instead of a legacy number of PRACH preambles, such as 64 preambles.

In both cases, a cyclic shift value applied by the enhanced/non-legacy UE can be different from a cyclic shift value used by a legacy UE. In one example, one value in the set of new/additional cyclic shifts can be zero, so that an enhanced/non-legacy UE can report a default CSI values that is applied for legacy UEs, such as a worst/best CQI/MCS value or RSRP/SINR range.

For PRACH detection purposes, the gNB can perform multiple hypothesis testing corresponding to the new/additional cyclic shift values. In the example that the UE applies both a new cyclic shift and a baseline cyclic shift, the gNB may perform a hypothesis testing corresponding an extended set of all cyclic shift combinations or may perform a two-stage hypothesis testing. In the latter case, the gNB may perform an initial PRACH detection by first detecting one value from the set of baseline cyclic shift values, and then perform a second-stage PRACH detection for refinement by detecting one value from the set of new/additional cyclic shifts for CSI reporting (to determine a CSI report value), given a value determined as a baseline cyclic shift in the first stage. Such an approach can be beneficial, for example, when a set of cyclic shift values for CSI reporting is smaller than a set of cyclic shift values for PRACH preamble generation.

In one example, the gNBs may exchange configured values for new/additional PRACH cyclic shifts, such as configured values for parameters $v_{CSI}$ and $N_{CS\_CSI}$ that were previously described. Such information exchange can be over the Xn of F1 interface. For example, a first gNB/cell can provide such assistance information to a second gNB/cell, such as a neighboring cell. The second gNB can consider the information when configuring such new/additional PRACH cyclic shift parameters for UEs in the second cell, for example, by avoiding those parameter values, or by selecting/configuration parameter values that reduce the inter-cell PRACH collision probability.

FIG. 20 illustrates the method 2000 describing a flowchart for CSI reporting in a PRACH transmission using new/additional cyclic shifts for the PRACH preamble.

In step 2010, a UE (such as the UE 116) receives a configuration for multiple new/additional cyclic shifts for PRACH preamble generation. In step 2020, the UE receives a configuration for a mapping between the multiple new/additional cyclic shifts and a set of CSI report values. For example, the set of CSI report values can include indications for CQI values from an MCS table, or indications of RSRP ranges, and the like.

In step 2030, the UE performs CSI measurement and determines a CSI report value. For example, CSI measurement can be based on an SSB associated with a PRACH transmission, or on a NZP CSI-RS configured for CSI measurements, RA beam management, or associated with PRACH transmission.

In step 2040, the UE determines a new/additional cyclic shift from the multiple new/additional cyclic shifts that maps to the determined CSI report value based on the configured mapping. In step 2050, the UE transmits a PRACH preamble that is generated based on the determined new/additional cyclic shift.

It is noted that various embodiments and examples above can be applied with new/additional root sequences instead of or in addition to new/additional cyclic shift values.

Although FIG. 20 illustrates the method 2000 various changes may be made to FIG. 20. For example, while the method 2000 of FIG. 20 is shown as a series of steps, various steps could overlap, occur in parallel, occur in a different order, or occur multiple times. In another example, steps may be omitted or replaced by other steps. For example, steps of the method 2000 can be executed in a different order.

The following embodiments of the present disclosure, denoted as E-11, describe CSI reports on PRACH using (phase) modulation applied to PRACH sequence/preamble. This is described in following examples and embodiments such as those of FIGS. 21-23.

Figure 21:
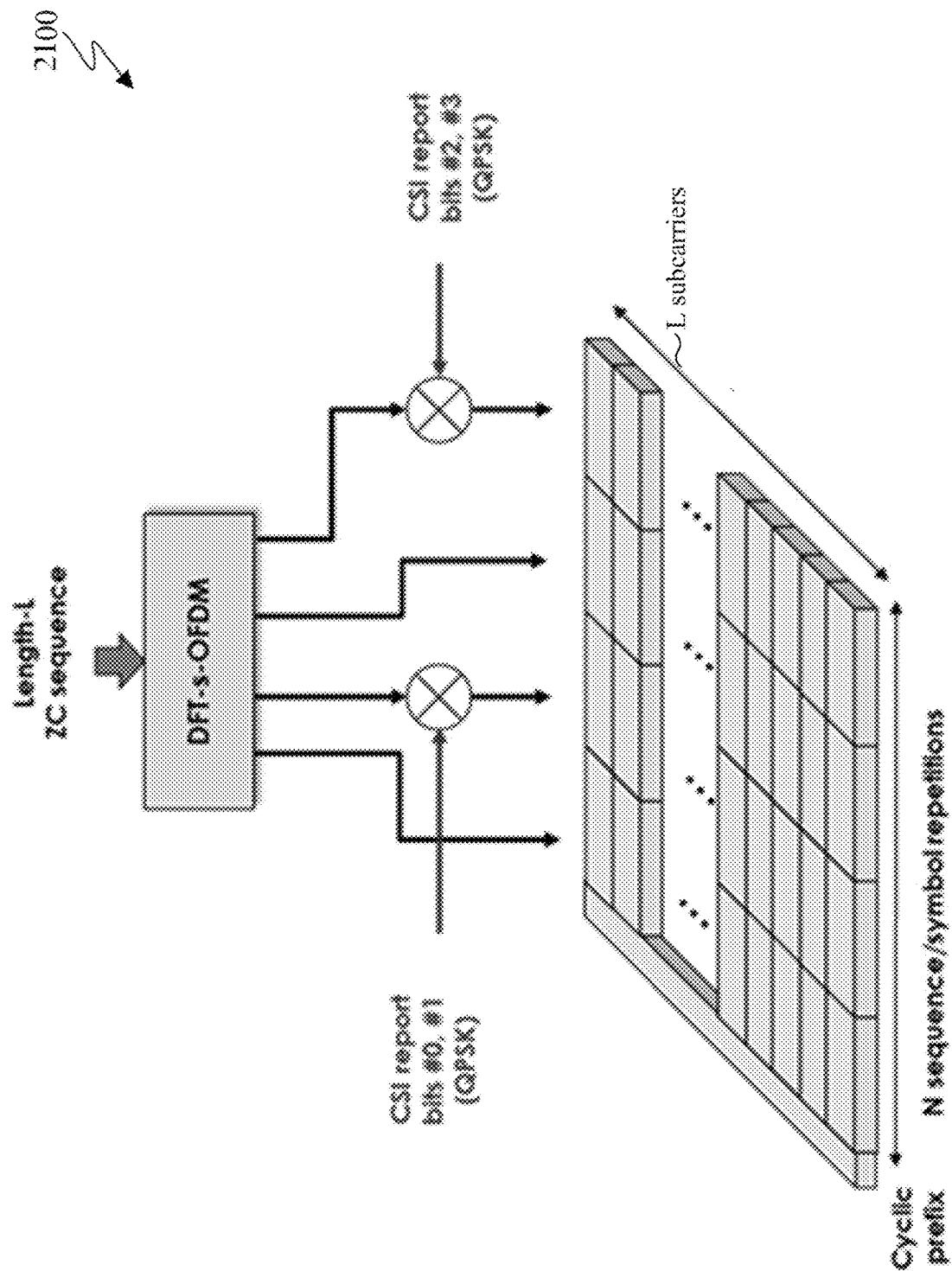
FIG. 21 illustrates an example diagram describing an operation for CSI reporting on PRACH using phase modulation for a subset of PRACH sequence repetitions with a PRACH preamble according to embodiments of present disclosure.
Figure 22:
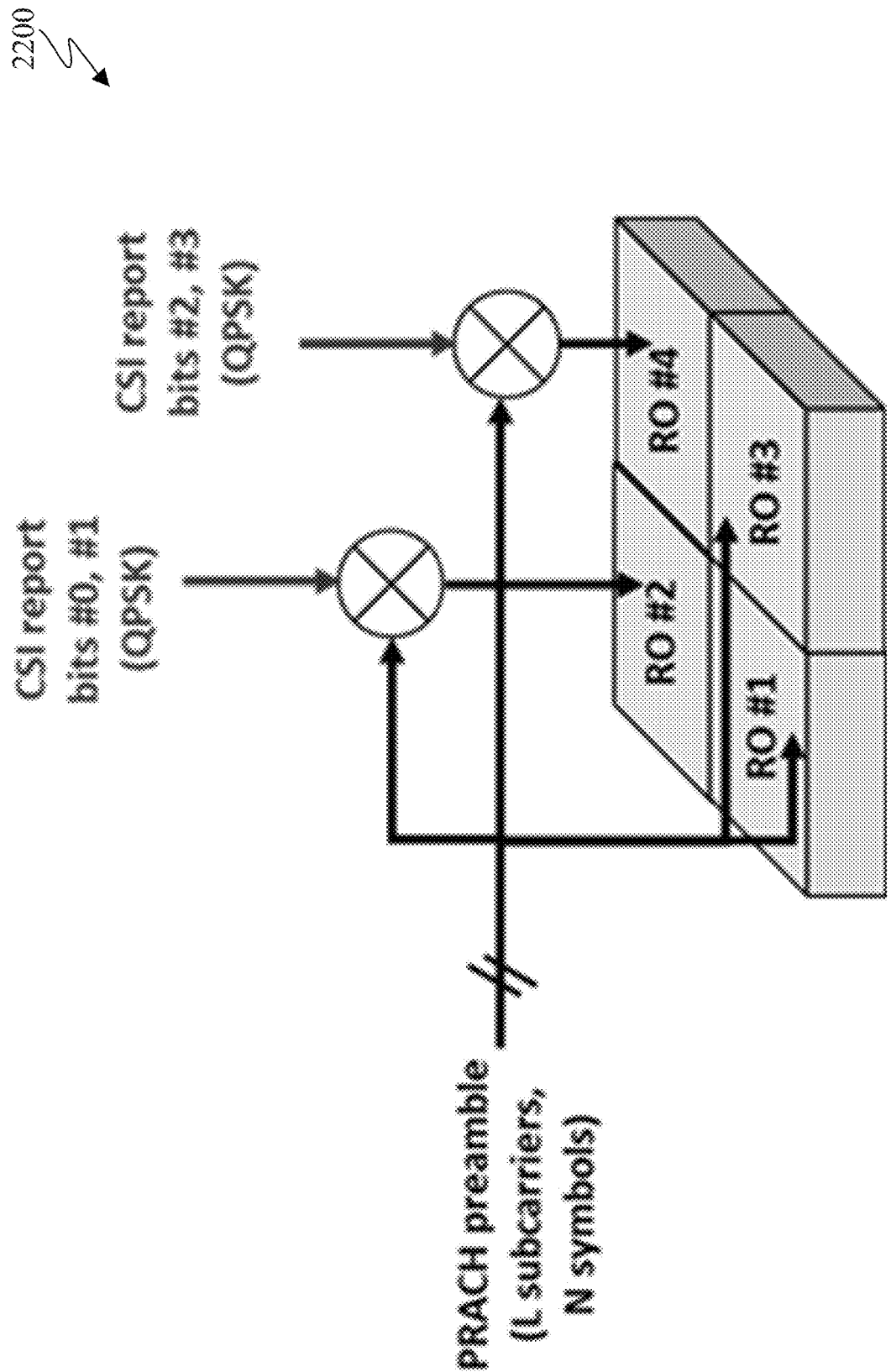
FIG. 22 illustrates an example diagram describing an operation for CSI reporting on PRACH using phase modulation for a subset of PRACH preamble repetitions in a number of random access channel (RACH) occasions (RO) according to embodiments of present disclosure.
Figure 23:
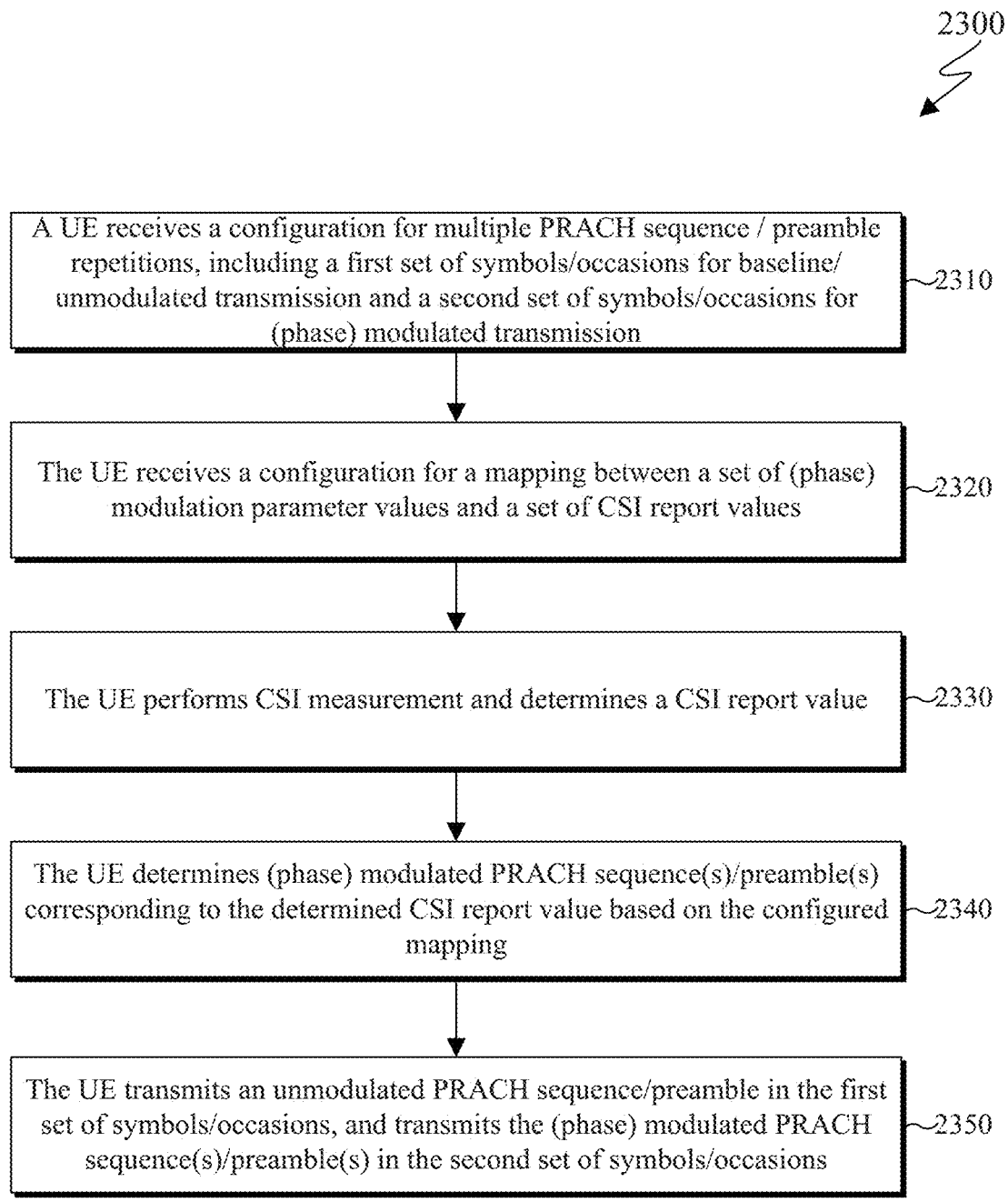
FIG. 23 illustrates an example method for CSI reporting in a PRACH transmission using phase modulation of PRACH sequences or preambles according to embodiments of present disclosure.

FIG. 21 illustrates an example diagram 2100 describing an operation for CSI reporting on PRACH using phase modulation for a subset of PRACH sequence repetitions with a PRACH preamble according to embodiments of present disclosure. FIG. 22 illustrates an example diagram 2200 describing an operation for CSI reporting on PRACH using phase modulation for a subset of PRACH preamble repetitions in a number of RO according to embodiments of present disclosure. FIG. 23 illustrates an example method 2300 for CSI reporting in a PRACH transmission using phase modulation of PRACH sequences or preambles according to embodiments of present disclosure. The steps of the method 2300 can be performed by any of the UEs 111-116 of FIG. 1, such as the UE 116 of FIG. 3. The method 2300 is for illustration only and other embodiments can be used without departing from the scope of the present disclosure.

In certain embodiments, a UE (such as the UE 116) indicates a CSI value in a PRACH transmission by phase modulation of the CSI report on the PRACH preamble sequence. The UE can be configured, for example by a SIB, with a set of modulation parameter values, such as phase rotation values, to apply to some part(s) or the entire PRACH preamble sequence. Accordingly, the UE can indicate a first CSI report value by not applying a modulation or by applying a first value of the modulation parameter, such as a first phase rotation value, to the PRACH preamble sequence, or indicate a second CSI report value by applying a second value of the modulation parameter, such as a second phase rotation value.

The modulation applied to the PRACH preamble sequence can be phase modulation and a modulation parameter can be different phase rotations in a binary phase shift keying (BPSK) or QPSK modulation.

In a first realization, a modulation can be applied to parts of the PRACH preamble sequence. For example, for indication of 2-12 bits of CSI report, the UE can be configured with a multiple BPSK or QPSK modulations for sequence repetitions within a PRACH preamble. For example, for a PRACH preamble that is generated by N=2, 4, 6, or 12 sequence repetitions, such as one corresponding to an N OFDM symbol PRACH preamble, the UE can be configured to apply a phase rotation corresponding to the CSI report value on a number M out of the N sequence repetitions/symbols. The UE does not modulate the remaining (N-M) sequence repetitions/symbols so that they can be used as a demodulation reference signal (DM-RS) by the gNB receiver. When all M sequence repetitions do not provide a same modulation symbol, a selection of M relates to a number of CSI report bits that can be provided by the PRACH. The selection of N relates to the DMRS resources provided for channel estimation for the CSI report demodulation. For example, a selection of M=N/2 can lead to half of the PRACH sequence repetitions within a PRACH preamble to be used for CSI report modulation and the remaining half of the PRACH sequence repetitions to be used as DMRS.

Accordingly, for a PRACH preamble that is generated by N=2, 4, 6, or 12 sequence repetitions, and with a selection of M=N/2 of sequence repetitions as DMRS, a UE can convey 1,2,3, or 4 bits of CSI report using BPSK modulation, or convey 2, 4, 6, or 12 bits of CSI report using QPSK modulation.

The set of locations for DMRS sequences within the N PRACH preamble sequence repetitions can be configured by higher layers or can be specified in the system operation, wherein location refers to a symbol index or a repetition index for the corresponding sequence repetition with no (phase) modulation for CSI report indication. In one example, the set of locations for DMRS can be consecutive, such as a number of first M=N/2 of sequence repetitions/symbols can be without (phase) modulation and serve as DMRS.

In another example, the set of locations can be alternating, wherein every other repetition/symbol from the N sequence repetitions/symbols can be unmodulated and serve as DMRS, starting from the first repetition or from the second repetition of the N sequence repetitions.

In one example, a gNB can determine a PRACH preamble sequence based on a configured set of locations for the unmodulated PRACH sequence repetitions serving as DMRS, and then determine a CSI report indicated by the UE based on a phase demodulation/detection of the remaining PRACH sequences. The gNB can apply multiple hypothesis testing to detect the PRACH preamble and/or the modulated CSI report value.

The diagram 2100 of FIG. 21 describes an example operation for CSI reporting on PRACH using phase modulation for a subset of PRACH sequence repetitions within a PRACH preamble.

The UE generates a length-L sequence, such as a ZC sequence, applies a DFT transform to obtain a corresponding sequence in the frequency domain, and applies OFDM to generate a PRACH sequence with L subcarriers. The UE generates the PRACH preamble sequence with N=4 repetitions of the sequence in N=4 OFDM symbols. The UE transmits/repeats the resulting sequence in a subset of symbols (such as in a first and a third symbol), while for the remaining symbols (such as a second and a fourth symbol), the UE applies a phase rotation to the sequence based on a QPSK modulation of a 4-bit CSI report value. For example, bits #0 and #1 of the CSI report value determine a QPSK-based phase rotation for the PRACH sequence in the second symbol, and bits #2 and #3 of the CSI report value determine a QPSK-based phase rotation for the PRACH sequence in the fourth symbol. The PRACH sequence transmissions repeated in the first and third symbols act as DMRS for CSI report demodulation.

In a second realization, the UE can indicate a CSI report value using (phase) modulation on PRACH preamble repetitions, wherein a (phase) modulation is applied to the entire PRACH preamble instead of symbols of the PRACH preamble as in the first realization. The UE can be configured by higher layers a number R of PRACH preamble repetitions in a corresponding set of R RACH occasion (ROs). The UE can be configured for repetitions of a PRACH preamble transmission in a set of M ROs in a same slot or in different slots and the UE can apply modulation, such as phase rotation, corresponding to a CSI report value to the PRACH preamble in a remaining set of (R-M) ROs. The set of M PRACH repetitions without modulation can serve as DMRS for demodulation of the remaining set of (R-M) PRACH repetitions with phase modulation that provide the CSI report. For example, for R=4 PRACH repetitions, if the UE transmits M=2 PRACH repetitions using a PRACH preamble without phase modulation/rotation and applies BPSK or QPSK modulation to the other (R-M)=2 PRACH repetitions, the UE can indicate 2 or 4 bits for a CSI report value.

For PRACH preamble repetition in multiple ROs, similar to the case of sequence repetition within a PRACH preamble as described in the first realization, the set of ROs or repetition indices where a UE applies phase modulation can be configured by higher layers or be specified in the system operation. For example, the UE can be configured with M consecutive unmodulated PRACH preamble repetitions, followed by (R-M) consecutive phase modulated PRACH preamble repetitions. In another example, the set of modulated and unmodulated PRACH preamble repetitions can be alternating.

For detection purposes, the gNB can determine an unmodulated PRACH preamble based on a configured set of ROs or repetition indices for unmodulated PRACH preamble repetitions that serve as DMRS, and then determine a CSI report indicated by the UE based on a phase demodulation/detection for the remaining PRACH preamble repetitions. The gNB can use cross-slot/joint channel estimation methods, if necessary.

The diagram 2200 of FIG. 22 illustrates an example operation for CSI reporting on PRACH using phase modulation for a subset of PRACH preamble repetitions in a number of ROs.

The UE transmits a PRACH preamble with R=4 repetitions in R=4 ROs, wherein horizontal and vertical axes correspond to time and frequency, respectively. Every RO pair is FDMed. The two RO pairs can be in a same slot or different slots. In one example, all repetitions/ROs can correspond to a same SSB or CSI-RS. The UE repeats transmission of the same PRACH preamble with L subcarriers and N symbols, that is the UE transmit N sequence repetitions within a PRACH preamble, in a subset of R RO repetitions, such as RO #1 and RO #3, while for the remaining RO repetitions, the UE applies a phase rotation to the PRACH preamble based on a QPSK modulation of a 4-bit CSI report value. For example, bits #0 and #1 of the CSI report value determine a QPSK-based phase rotation for the second PRACH preamble repetition in the second RO, and bits #2 and #3 of the CSI report value determine a QPSK-based phase rotation for the fourth PRACH preamble repetition in the fourth RO. For example, same 2 bits of a CSI report, such as an NZP CSI RS resource index and/or an RSRP range, can apply for both second and fourth PRACH preamble repetitions. The PRACH preamble transmission repeated in the first and third ROs serves as DMRS for the CSI report demodulation.

In one example, with PRACH preamble repetition in multiple ROs, the repeated preamble can have a different sequence, wherein the sequence can be used to indicate a CSI report value such as an MCS or RSRP range, or it can be mapped to different time/frequency resources based on the CSI report value/MCS/RSRP range.

In one example, for the case of 1-bit CSI report, the UE can be configured with a BPSK modulation for the entire PRACH preamble. Accordingly, the UE applies zero/no phase rotation for a first CSI report value, such as a worst CQI or MCS or RSRP range and applies a 180-degree phase rotation to the entire PRACH preamble for a second CSI report value, such as a best CQI or MCS or RSRP range. Therefore, only one PRACH repetition can be sufficient. Such operation can be beneficial in terms of gNB complexity for PRACH detection as well as for reduced PRACH overhead. Differential BPSK can also be used to avoid use of repetitions for DMRS.

FIG. 23 illustrates the method 2300 describing a flowchart for CSI reporting in a PRACH transmission using phase modulation of PRACH sequences or preambles.

In step 2310, a UE (such as the UE 116) receives a configuration for multiple PRACH sequence/preamble repetitions, including a first set of symbols/occasions for an unmodulated transmission and a second set of symbols/occasions for (phase) modulated transmission. PRACH sequence repetition can refer to repetition of a PRACH sequence in a number of symbols within a PRACH preamble. PRACH preamble repetition can refer to repetition of a PRACH preamble in a number of RACH occasions (ROs).

In step 2320, the UE receives a configuration for a mapping between a set of (phase) modulation parameter values and a set of CSI report values. For example, the set of (phase) modulation parameter values can include a set of phase rotations corresponding to a BPSK or a QPSK modulation. For example, the set of CSI report values can include indications for CQI values from an MCS table, or indications of RSRP ranges, or an NZP CSI-RS resource index, and the like.

In step 2330, the UE performs CSI measurement and determines a CSI report value. For example, CSI measurement can be based on an SSB associated with a PRACH transmission, or on a NZP CSI-RS configured for CSI measurements, RA beam management, or associated with PRACH transmission.

In step 2340, the UE determines (phase) modulated PRACH sequence(s)/preamble(s) corresponding to the determined CSI report value based on the configured mapping. In step 2350, the UE transmits a baseline PRACH sequence/preamble in the first set of symbols/occasions and transmits the (phase) modulated PRACH sequence(s)/preamble(s) in the second set of symbols/occasions.

Although FIG. 23 illustrates the method 2300 various changes may be made to FIG. 23. For example, while the method 2300 of FIG. 23 is shown as a series of steps, various steps could overlap, occur in parallel, occur in a different order, or occur multiple times. In another example, steps may be omitted or replaced by other steps. For example, steps of the method 2300 can be executed in a different order.

The following embodiments of the present disclosure, denoted as E-12, describe CSI reports on PRACH using MsgA (or MsgA-like) PUSCH. This is described in following examples and embodiments such as those of FIG. 24.

Figure 24:
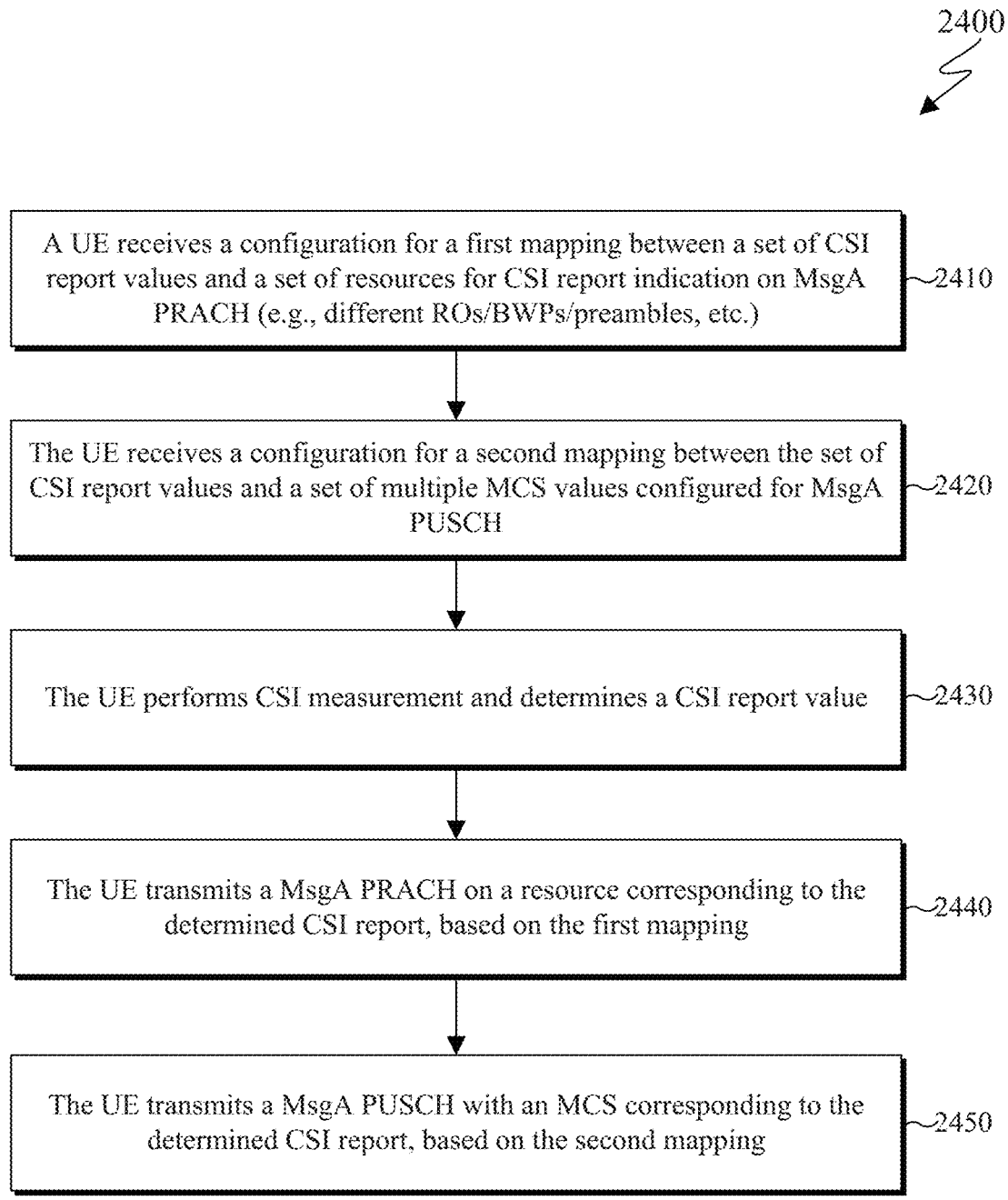
FIG. 24 illustrates an example method for CSI report on MsgA PRACH followed by link adaptation of MsgA PUSCH according to embodiments of present disclosure.

FIG. 24 illustrates an example method 2400 for CSI report on MsgA PRACH followed by link adaptation of MsgA PUSCH according to embodiments of present disclosure.

The steps of the method 2400 can be performed by any of the UEs 111-116 of FIG. 1, such as the UE 116 of FIG. 3. The method 2400 is for illustration only and other embodiments can be used without departing from the scope of the present disclosure.

In certain embodiments, a UE (such as the UE 116) indicates a CSI value in a first step of a random access procedure by explicit indication of CSI report value in a PUSCH transmission, that follows a PRACH transmission. The UE includes the CSI report as a payload of the PUSCH transmission, that can include explicit DMRS for demodulation. A PUSCH can include a MsgA PUSCH in a 2-step RACH, or a MsgA-like PUSCH corresponding to the PRACH transmission in a 4-step RACH. The CSI report can be multiplexed in resource elements of the PUSCH or can be provided through a MAC control element.

In one realization, in a 2-step RACH, the UE can include a CSI report in a MsgA PUSCH. For example, the UE can multiplex a CSI report on a MsgA PUSCH payload such as a payload for contention resolution purposes (e.g., contention resolution UE identity or C-RNTI).

In another realization, in a 4-step RACH, the UE can be configured with time/frequency resources for a PUSCH transmission, adjacent to an RO or following with a predetermined gap from an RO. The PUSCH payload includes at least a CSI report. Such PUSCH transmission may not include a payload for contention resolution purposes such as a contention resolution UE identity or a C-RNTI.

In one example, the UE is provided offset values that determine a number or location(s)/index(es) of resource blocks (RBs) where the UE multiplexes a CSI report value, wherein the RBs are used for a PUSCH transmission, such as a MsgA PUSCH for 2-step RACH or a MsgA-like PUSCH for 4-step RACH. Such offset values can be provided to the UE by specifications of the system operation or by higher layer configuration or a by a PDCCH order/DCI format initiating the RA procedure. In one example, the UE assigns a highest priority to the CSI report value when multiplexing the CSI report on the PUSCH transmission, compared to any other uplink/downlink control information including any MAC CE(s), except possibly for a MAC CE related to contention resolution purposes.

In yet another realization, system specifications or higher layers such as SIB can configure a PUCCH that can be triggered and transmitted after a PRACH transmission. The PUCCH transmission can include a few bits such as 2-6 bits of information such as CSI report value or CQI/MCS value, RSRP/SINR range, or a SSBRI or CRI, and the like. Such method can be applicable to both 2-step RACH or 4-step RACH.

Depending on a time/frequency resource configuration for the PUSCH, the UE can include a relatively large number of bits for CSI report. In one example, a PUSCH can include, in addition to a CSI report, other channel estimation or beam management information, such as a preferred beam, for example, a preferred or alternative SSB resource indicator (SSBRI) or CSI resource indicator (CRI). In one example, control information such as CSI report value in the PUSCH can be on the first few symbols of the PUSCH. In another example, the UE can indicate an MCS or a number of repetitions for the data part of the PUSCH in the first few symbols of the PUSCH.

For the case of 2-step RACH, enhancement for link adaptation of MsgA PUSCH can also be considered. For example, the UE can be configured with two or more MCS values for MsgA PUSCH, wherein the MCS values map to two or more CSI report values. The mapping can be such that each CSI report value maps to a different MCS value for the MsgA PUSCH, or one MCS value can be mapped to multiple CSI report values. Based on CSI measurements, the UE can indicate a CSI report on a MsgA PRACH using any of the methods described in various embodiments of the present disclosure, such as using different time/frequency groups for ROs, different BWPs, different preamble groups, new/additional PRACH preamble cyclic shifts, or using explicit CSI indication as considered in the above, and the like. Then, for MsgA PUSCH transmission, the UE selects an MCS value corresponding to the CSI report value based on the configured mapping. In one example, the UE can multiplex on the PUSCH payload, assistance/control information to indicate the MCS value that the UE has determined/selected for MsgA PUSCH. Such assistance/control information can help decouple the gNB demodulation of MsgA PUSCH from gNB detection of corresponding MsgA PRACH.

In one example, when a UE selects an MCS value for a MsgA PUSCH and needs to report the MCS value to the gNB, the UE is provided offset values that determine a number or location(s)/index(es) of RBs where the RBs correspond to a MsgA PUSCH transmission where the UE multiplexes the information/index of the selected MCS value. Such offset values can be provided to the UE by specifications of system operation or by higher layer configuration or a by a PDCCH order/DCI format initiating the PRACH procedure. In one example, the UE assigns a highest priority to the MCS selection report when multiplexing the MCS selection report on the PUSCH transmission, compared to any other uplink/downlink control information including any MAC CE(s), except possibly for a MAC CE related to contention resolution purposes.

FIG. 24 illustrates the method 2400 describing a flowchart for CSI report on MsgA PRACH followed by link adaptation of MsgA PUSCH.

In step 2410, a UE (such as the UE 116) receives a configuration for a first mapping between a set of CSI report values and a set of resources for CSI report indication on MsgA PRACH, such as different ROs/BWPs/preambles. In step 2420, the UE receives a configuration for a second mapping between the set of CSI report values and a set of multiple MCS values configured for MsgA PUSCH. In step 2430, the UE performs CSI measurements and determines a CSI report value. In step 2440, the UE transmits a MsgA PRACH on a resource corresponding to the determined CSI report, based on the first mapping. In step 2450, the UE transmits a MsgA PUSCH with an MCS corresponding to the determined CSI report, based on the second mapping.

Although FIG. 24 illustrates the method 2400 various changes may be made to FIG. 24. For example, while the method 2400 of FIG. 24 is shown as a series of steps, various steps could overlap, occur in parallel, occur in a different order, or occur multiple times. In another example, steps may be omitted or replaced by other steps. For example, steps of the method 2400 can be executed in a different order.

As described above, the present disclosure can be applicable to NR specifications Rel-17/18 and beyond to provide enhancements for initial and random access procedure for single-panel or multi-panel UEs in FR2 when communicating with multiple TRPs or multiple cells.

For example, the present disclosure provides enhancements for initial and random access by supporting two/multiple concurrent RA procedures. The two concurrent procedures can correspond to a same PRACH trigger or different PRACH triggers, and are mainly targeted for multi-panel UEs, while the proposed enhances also work for single-panel UEs although with some modifications and restrictions. The concurrent RA procedures can be initiated at the same time or at different times. In addition, the concurrent RA procedures can continue until successful completion of at least one the RA procedures, or at least until successful reception of one RAR. Configuration of RA procedure parameters including PRACH transmission and RAR monitoring can be UE-panel-specific, including panel-specific power control that considers MPE issues at the UE panels, or can TRP-specific. In addition, multiple concurrent RA procedure enables the UE to acquire panels-specific or TRP-specific TA values to be used for future UL transmissions. In addition, multiple concurrent RA procedures allows a spatial domain diversity for transmission of multiple Msg3/MsgA PUSCH transmission and Msg4 monitoring that increases the likelihood of successful contention resolution for the UE, although "intra-UE" contention resolution aspects need to be considered as well so that the gNB can identify and link the multiple RA procedures to a same UE. In some cases, the UE provides assistance information to help coordination of TRPs involved in two concurrent RA procedures.

The present disclosure presents methods for multiple concurrent RA procedures, including for initial access, to multiple TRPs or cells, wherein the multiple concurrent RA procedures can be associated with multiple UE antenna panels. In particular, a UE can perform two concurrent initial access procedures to make RRC connection to two cells. Various embodiments consider TRP-specific PRACH configuration based on TRP-specific system information or TRP-specific RRC configuration. Several embodiments consider TRP-specific configurations for other UE operations, in addition to the RA procedure. Some embodiments propose TRP-specific power control as well as methods for power scaling or dropping of overlapping UL transmissions to multiple TRPs, such as when two PRACH transmissions to two TRPs overlap in time, or when a PRACH transmission to one TRP overlaps with a PUSCH/PUCCH/SRS transmission to another TRP. Methods are presented to enhance PDCCH order to include TRP-specific information such as TRP indication, UE panel indication, TCI state indication for RAR PDCCH/PDCCH reception or for Msg3/MsgA PUSCH transmission corresponding to different TRPs or panels. In addition, an "extended" PDCCH order is considered to initiate two concurrent RA procedures using a single DCI format. Enhancements are presented for a BI provided in a RAR, so that the UE is provided with assistance information about the PRACH congestion level at different TRPs to assist with load distribution among TRPs.

The present disclosure can also provide improved link adaptation and coverage enhancement for initial/random access procedure for a UE using (very) early CSI reporting on PRACH. Such an approach can improve the reliability and coverage of all transmissions and receptions following PRACH, especially broadcast Msg2 PDCCH/PDSCH as well as more effective scheduling of Msg3 PUSCH.

The present disclosure enables an improved operation of 3GPP 5G NR system by coverage enhancement in higher frequency bands such as the ones above 6 GHz, including FR2 (including FR2-1 or FR2-2), FR3, and the like. Additionally, the present disclosure enables an improved operation of 3GPP 5G NR system for multi-panel UEs in FR2. The embodiments, however, are generic and can also apply to other frequency bands including various frequency bands in different frequency ranges (FR) such as FR1, FR2, FR3, and FR4 (including FR2-1 or FR2-2), e.g., mid frequency bands, such as 1-7 GHz, and high/millimeter frequency bands, such as 24-100 GHz and beyond. In addition, the embodiments are generic and can apply to various use cases and settings as well, such as single-panel UEs and multi-panel UEs, eMBB, URLLC and IIoT, mMTC and IoT, sidelink/V2X, operation in NR-U, NTN, aerial systems such as drones, operation with RedCap UEs, private or NPN, and the like.

The present disclosure relates to a pre-5G or 5G or beyond 5G communication system to be provided for supporting one or more of: higher data rates, lower latency, higher reliability, improved coverage, and massive connectivity, and the like. Various embodiments apply to UEs operating with other RATs and/or standards, such as different releases/generations of 3GPP standards (including beyond 5G, 5G Advanced, 6G, and the like), IEEE standards (such as 802.16 WiMAX and 802.11 Wi-Fi and the like), and so forth.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
receiving first information for a first timing advance (TA) value corresponding to a first transmission configuration indication (TCI) state associated with one of:
first control resource sets (CORESETs) having a first CORESET pool index on a cell, or
a first cell;
receiving a physical downlink control channel (PDCCH) in a CORESET from the first CORESETs or from the first cell, wherein:
the PDCCH provides a downlink control information (DCI) format that triggers transmission of a first physical random access channel (PRACH), and
an indication in the DCI format is for one of:
a second CORESET pool index, or
a second cell;
transmitting the first PRACH; and
receiving, in response to the first PRACH, a random access response (RAR), wherein the RAR includes information for a second TA value corresponding to a second TCI state associated with one of:
second CORESETs having the second CORESET pool index on the cell, or
the second cell.

2. The method of claim 1, further comprising transmitting:
a first channel or signal with a first spatial filter corresponding to the first TCI state based on the first TA value, and
a second channel or signal with a second spatial filter corresponding to the second TCI state based on the second TA value.

3. The method of claim 1, wherein:
the first TCI state is associated with the first CORESETs that are further associated with a first timing advance group (TAG), and
the second TCI state is associated with the second CORESETs that are further associated with a second TAG.

4. The method of claim 1, further comprising:
receiving:
a first group of downlink reference signals (DL RSs) associated with the first CORESETs, and
a second group of DL RSs associated with the second CORESETs, wherein:
the indication in the DCI format is for an index of a DL RS from the second group of DL RSs, and
the DL RSs include synchronization signal and physical broadcast channel (SS/PBCH) blocks of the cell.

5. The method of claim 1, wherein the first-indication in the DCI format is for a physical cell identity (PCI) associated with the second cell.

6. The method of claim 1, further comprising:
determining parameters for transmission of a second PRACH on the second cell;
receiving information for transmission of a first channel or signal on the first cell;
determining that the second PRACH transmission:
would overlap in time with the first channel or signal transmission, or
would have a gap in time with the first channel or signal transmission that is smaller than a threshold; and
transmitting only one of:
the second PRACH, and
the first channel or signal.

7. The method of claim 1, wherein a pathloss reference for the first PRACH transmission is a downlink reference signal (DL RS) associated with the second TCI state.

8. A user equipment (UE) comprising:
a transceiver configured to:
receive first information for a first timing advance (TA) value corresponding to a first transmission configuration indication (TCI) state associated with one of:
first control resource sets (CORESETs) having a first CORESET pool index on a cell, or
a first cell;
receive a physical downlink control channel (PDCCH) in a CORESET from the first CORESETs or from the first cell, wherein:
the PDCCH provides a downlink control information (DCI) format that triggers transmission of a first physical random access channel (PRACH), and
an indication in the DCI format is for one of:
a second CORESET pool index, or
a second cell;
transmit the first PRACH; and
receive, in response to the first PRACH, a random access response (RAR); and a processor operably coupled with the transceiver, the processor configured to identify, in the RAR, information for a second TA value corresponding to a second TCI state associated with one of:

second CORESETs having the second CORESET pool index on the cell, or the second cell.

9. The UE of claim 8, wherein the transceiver is further configured to transmit:

a first channel or signal with a first spatial filter corresponding to the first TCI state based on the first TA value, and a second channel or signal with a second spatial filter corresponding to the second TCI state based on the second TA value.

10. The UE of claim 8, wherein:

the first TCI state is associated with the first CORESETs that are further associated with a first timing advance group (TAG), and the second TCI state is associated with the second CORESETs that are further associated with a second TAG.

11. The UE of claim 8, wherein:

the transceiver is further configured to receive:

a first group of downlink reference signals (DL RSs) associated with the first CORESETs, and a second group of DL RSs associated with the second CORESETs, the indication in the DCI format is for an index of a DL RS from the second group of DL RSs, and the DL RSs include synchronization signal and physical broadcast channel (SS/PBCH) blocks of the cell.

12. The UE of claim 8, wherein the first-indication in the DCI format is for a physical cell identity (PCI) associated with the second cell.

13. The UE of claim 8, wherein:

the processor is further configured to determine parameters for transmission of a second PRACH on the second cell;

the transceiver is further configured to receive information for transmission of a first channel or signal on the first cell;

the processor is further configured to determine that the second PRACH transmission:

would overlap in time with the first channel or signal transmission, or would have a gap in time with the first channel or signal transmission that is smaller than a threshold; and the transceiver is further configured to transmit only one of:

the second PRACH, and the first channel or signal.

14. The UE of claim 8, wherein a pathloss reference for the first PRACH transmission is a downlink reference signal (DL RS) associated with the second TCI state.

15. A base station comprising:

a transceiver configured to;

transmit first information for a first timing advance (TA) value corresponding to a first transmission configuration indication (TCI) state associated with one of:

first control resource sets (CORESETs) having a first CORESET pool index on a cell, or a first cell;

transmit a physical downlink control channel (PDCCH) in a CORESET from the first CORESETs or from the first cell, wherein:

the PDCCH provides a downlink control information (DCI) format that triggers a first physical random access channel (PRACH), and an indication in the DCI format is for one of:

a second CORESET pool index, or a second cell;

receive the first PRACH; and transmit, in response to the first PRACH, a random access response (RAR) including information for a second TA value; and a processor operably coupled with the transceiver, the processor configured to identify the second TA value for reception of a second channel or signal with a second spatial filter corresponding to a second TCI state associated with one of:

second CORESETs having the second CORESET pool index on the cell, or the second cell.

16. The base station of claim 15, wherein:

the first TCI state is associated with the first CORESETs that are further associated with a first timing advance group (TAG), and the second TCI state is associated with the second CORESETs that are further associated with a second TAG.

17. The base station of claim 15, wherein:

the transceiver is further configured to transmit:

a first group of downlink reference signals (DL RSs) associated with the first CORESETs, and a second group of DL RSs associated with the second CORESETs, the first indication in the DCI format is for an index of a DL RS from the second group of DL RSs, and the DL RSs include synchronization signal and physical broadcast channel (SS/PBCH) blocks of the cell.

18. The base station of claim 15, wherein the first indication in the DCI format is for a physical cell identity (PCI) associated with the second cell.

19. The base station of claim 15, wherein:

the processor is further configured to determine parameters for reception of a second PRACH;

the transceiver is further configured to transmit information for a first channel or signal on the first cell;

the processor is further configured to determine that the second PRACH reception:

would overlap in time with the first channel or signal reception, or would have a gap in time with the first channel or signal reception that is smaller than a threshold; and the transceiver is further configured to receive only one of:

the second PRACH, and the first channel or signal.

20. The base station of claim 15, wherein the transceiver is further configured to receive:

a first channel or signal with a first spatial filter corresponding to the first TCI state based on the first TA value, and a second channel or signal with a second spatial filter corresponding to the second TCI state based on the second TA value.

* * * * *